United States Patent
Hoffmann et al.

(10) Patent No.: US 11,009,836 B2
(45) Date of Patent: May 18, 2021

(54) APPARATUS AND METHOD FOR OPTIMIZING QUANTIFIABLE BEHAVIOR IN CONFIGURABLE DEVICES AND SYSTEMS

(71) Applicant: University of Chicago, Chicago, IL (US)

(72) Inventors: Henry Hoffmann, Chicago, IL (US); John Lafferty, Evanston, IL (US); Nikita Mishra, Chicago, IL (US)

(73) Assignee: University of Chicago, Chicago, IL (US)

( * ) Notice: Subject to any disclaimer, the term of this patent is extended or adjusted under 35 U.S.C. 154(b) by 874 days.

(21) Appl. No.: 15/457,743

(22) Filed: Mar. 13, 2017

(65) Prior Publication Data
US 2017/0261949 A1 Sep. 14, 2017

Related U.S. Application Data

(60) Provisional application No. 62/307,210, filed on Mar. 11, 2016.

(51) Int. Cl.
*G05B 13/02* (2006.01)
*G06N 7/00* (2006.01)

(52) U.S. Cl.
CPC ......... *G05B 13/0265* (2013.01); *G06N 7/005* (2013.01)

(58) Field of Classification Search
CPC .............. G05B 13/0265; G06N 7/005
See application file for complete search history.

(56) References Cited

PUBLICATIONS

Mlshra, "A Probabilistic Graphical Model-based Approach for Minimizing Energy Under Performance Constraints", 2015 (Year: 2015).*
Imes, "Minimizing Energy Under Performance Constraints on Embedded Platforms", 2014 (Year: 2014).*
Imes2, "POET: A Portable Approach to Minimizing Energy Under Soft Real-time Constraints",IEEE, 2015 (Year: 2015).*
Hoffman, "JouleGuard: Energy Guarantees for Approximate Applications", 2015 (Year: 2015).*

(Continued)

*Primary Examiner* — Michael J Huntley
*Assistant Examiner* — Van C Mang
(74) *Attorney, Agent, or Firm* — Oblon, McClelland, Maier & Neustadt, L.L.P.

(57) ABSTRACT

An apparatus and method are provided to perform constrained optimization of a constrained property of an apparatus, which is complex due to having several components, and these components are configurable in real-time. The optimization is achieved by detecting values of the constrained property and a plurality of other properties of the apparatus when the apparatus is configured in a first subset of the plurality of configurations. A model is learned using the detected values of the constrained property. The model represents the constrained property and can also represent other properties as a function of the configurations. The model can also include estimated uncertainties of the constrained property in the model. Then, using the d model and the estimated uncertainties, the optimal configuration can be selected to minimize an error value (e.g., the difference between a desired value and an observed value of the at least one constrained property).

20 Claims, 45 Drawing Sheets

(56) References Cited

PUBLICATIONS

Wen, "Energy-Optimal Mobile Application Execution: Taming Resource-Poor Mobile Devices with Cloud Clones", IEEE, 2012 (Year: 2012).*
Chun "CloneCloud: Elastic Execution between Mobile Device and Cloud", Acm, 2011 (Year: 2011).*
Curtis-Maury, "Prediction Models for Multi-dimensional Power-Performance Optimization on Many Cores", 2015 (Year: 2008).*
Shen, "Battery Aware Stochastic QoS Boosting in Mobile Computing Devices", 2014 (Year: 2014).*
Namboodiri, "To Cloud or Not to Cloud: A Mobile Device Perspective on Energy Consumption of Applications", IEEE, 2012 (Year: 2012).*
Jurdak, "Adaptive GPS Duty Cycling and Radio Ranging for Energy-efficient Localization", 2010 (Year: 2010).*
Kim "Power-Rate-Distortion Modeling for Energy Minimization of Portable Video Encoding Devices", 2011 (Year: 2011).*
Pelikan, "Multiobjective hBOA, Clustering, and Scalability", 2005, pp. 663-670 (Year: 2005).*
Ji, "Energy-Efficient Bandwidth Allocation for Multiuser Scalable Video Streaming over WLAN", pp. 14, 2007 (Year: 2007).*
Hoffman, "CoAdapt: Predictable Behavior for Accuracy-Aware Applications Running on Power-Aware Systems", pp. 223-232 (Year: 2014).*
Storlie, "Modeling and Predicting Power Consumption of High Performance Computing Jobs", 2015 (Year: 2015).*
Minyoung Kim, et al., "xTune: A Formal Methodology for Cross-Layer Tuning of Mobile Embedded Systems" ACM Transactions on Embedded Computing Systems, vol. 11, No. 4, Article 73, Dec. 2012, pp. 73:1-73:23.
Engin Ipek, et al., "Self-Optimizing Memory Controllers: A Reinforcement Learning Approach" Intl. Symp. on Computer Architecture (ISCA), Jun. 2008, 12 pages.
Krishna Kant, et al., "Willow: A Control System for Energy and Thermal Adaptive Computing" IEEE, International Parallel & Distributed Processing Symposium, 2011, pp. 36-47.
Jian Li, et al., "Dynamic Power-Performance Adaptation of Parallel Computation on Chip Multiprocessors" IEEE, The 12th International Symposium on High-Performance Computer Architecture, 2006, pp. 77-87.
Jee Choi, et al., "Algorithmic Time, Energy, and Power on Candidate HPC Compute Building Blocks" IEEE, 28th International Parallel & Distributed Processing Symposium, 2014, pp. 447-457.
Petre Dini, et al., "Internet, GRID, Self-Adaptability and Beyond: Are We Ready?" IEEE, The 15th International Workshop on Database and Expert Systems Applications (DEXA'04), 2004, 7 Pages.
Connor Imes, et al., "POET: A Portable Approach to Minimizing Energy Under Soft Real-time Constraints" IEEE, Real-Time and Embedded Technology and Applications Symposium (RTAS), 2015, pp. 75-86.
Hui Cheng, et al., "SYS-EDF: A System-Wide Energy-Efficient Scheduling Algorithm for Hard Real-Time Systems" Int. J. Embedded Systems, vol. 4, No. 2, 2009, pp. 141-151.
Tibor Horvath, et al., "Dynamic Voltage Scaling in Multitier Web Servers with End-to-End Delay Control" IEEE, Transactions on Computers, vol. 56, No. 4, Apr. 2007, pp. 444-458.
Henry Hoffmann, et al., "A Generalized Software Framework for Accurate and Efficient Management of Performance Goals" IEEE, The International Conference on Embedded Software (EMSOFT), 2013, 10 Pages.
Henry Hoffmann, et al., "Dynamic Knobs for Responsive Power-Aware Computing" ASPLOS'11, The Sixteenth International Conference on Architectural Support for Programming Languages and Operating Systems, 2011, pp. 199-212.
Henry Hoffmann, et al., "Self-Aware Computing in the Angstrom Processor" DAC'12, The 49th Annual Design Automation Conference, 2012, pp. 259-264.
Henry Hoffmann, et al., "Application Heartbeats: A Generic Interface for Specifying Program Performance and Goals in Autonomous Computing Environments" ICAC'10, Proceedings of the 7th International Conference on Autonomic Computing, 2010, pp. 79-88.
Liang He, et al., "Exploring Adaptive Reconfiguration to Optimize Energy Efficiency in Large-Scale Battery Systems" IEEE, 34th Real-Time Systems Symposium, 2013, pp. 118-127.
Henry Hoffmann, et al., "CoAdapt: Predictable Behavior for Accuracy-Aware Applications Running on Power-Aware Systems" IEEE, 26th Euromicro Conference on Real-Time Systems, 2014, pp. 223-232.
Henry Hoffmann, et al., Selecting Spatiotemporal Patterns for Development of Parallel Applications IEEE, Transactions on Parallel and Distributed Systems, vol. 23, No. 10, Oct. 2012, pp. 1970-1982.
Henry Hoffmann, "Racing and Pacing to Idle: An Evaluation of Heuristics for Energy-Aware Resource Allocation" HotPower '13, Proceedings of the Workshop on Power-Aware Computing and Systems, 2013, 5 Pages.
Rong Ge, et al., "Effects of Dynamic Voltage and Frequency Scaling on a K20 GPU" IEEE, 42nd International Conference on Parallel Processing, 2013, pp. 826-833.
Fangzhe Chang, et al., "Automatic Configuration and Run-Time Adaptation of Distributed Applications" Technical Report Automatic Configuration and Run-Time Adaptation of Distributed Applications, 1999, pp. 1-18.
Etienne Le Sueur, et al., "Slow Down or Sleep, that is the Question" Usenix technical conference, 2011, pp. 1-6.
Christophe Dubach, et al., "A Predictive Model for Dynamic Microarchitectural Adaptivity Control" IEEE/ACM 43rd Annual International Symposium on Microarchitecture, 2010, pp. 485-496.
Aaron Carroll, et al., "Mobile Multicores: Use Them or Waste Them" HotPower '13, The Workshop on Power-Aware Computing and Systems, 2013, pp. 1-5.
David H. K. Kim, et al., "Racing and Pacing to Idle: Theoretical and Empirical Analysis of Energy Optimization Heuristics" IEEE, 3rd International Conference on Cyber-Physical Systems, Networks, and Applications, 2015, pp. 78-85.
Connor Imes, et al., "Bard: A Unified Framework for Managing Soft Timing and Power Constraints" IEEE, International Conference on Embedded Computer Systems: Architectures, Modeling and Simulation (SAMOS), 2016, pp. 31-38.
Luciano Bertini, et al., "Statistical QoS Guarantee and Energy-Efficiency in Web Server Clusters" IEEE, The 19th Euromicro Conference on Real-Time Systems (ECRTS'07), 2007, 10 Pages.
Enrico Bini, et al., "Minimizing CPU Energy in Real-Time Systems with Discrete Speed Management" ACM Transactions on Computational Logic, vol. V, No. N, Dec. 2008, pp. 1-22.
Benjamin C. Lee, et al., "Efficiency Trends and Limits from Comprehensive Microarchitectural Adaptivity" ASPLOS'08, The 13th International Conference on Architectural Support for Programming Languages and Operating Systems, 2008, pp. 36-47.
Benjamin C. Lee, et al., "Accurate and Efficient Regression Modeling for Microarchitectural Performance and Power Prediction" ASPLOS'06, The 12th International Conference on Architectural Support for Programming Languages and Operating Systems, 2006, pp. 185-194.
Benjamin C. Lee, et al., "CPR: Composable Performance Regression for Scalable Multiprocessor Models" The 41st annual IEEE/ACM International Symposium on Microarchitecture, 2008, pp. 270-281.
Antonio Filieri, et al., "Automated Design of Self-Adaptive Software with Control-Theoretical Formal Guarantees" ICSE'14, The 36th International Conference on Software Engineering, 2014, pp. 299-310.
Akbar Sharifi, et al., "METE: Meeting End-to-End QoS in Multicores through System-Wide Resource Management" SIGMETRICS'11, 2011, pp. 13-24.
Youngmin Shin, et al., "28nm High-K Metal Gate Heterogeneous Quad-core CPUs for High-performance and Energy-Efficient Mobile Application Processor" IEEE International, 2013, pp. 198-201.
Baoxian Zhao, et al., "Energy Management under General Task-Level Reliability Constraints" IEEE, 18th Real Time and Embedded Technology and Applications Symposium, 2012, pp. 285-294.

(56) References Cited

PUBLICATIONS

Ronghua Zhang, et al., "ControlWare: A Middleware Architecture for Feedback Control of Software Performance" IEEE, ICDCS'02, The 22nd International Conference on Distributed Computing Systems, 2002, 10 Pages.

Chuan-Yue Yang, et al., "System-Level Energy-Efficiency for Real-Time Tasks" (ISORC'07) IEEE, International Symposium on Object and Component-Oriented Real-Time Distributed Computing, 2007, 8 Pages.

Yuhao Zhu, et al., "High-Performance and Energy-Efficient Mobile Web Browsing on Big/Little Systems" IEEE, The 19th International Symposium on High Performance Computer Architecture (HPCA), 2013, 12 Pages.

Qiang Wu, et al., "Formal Online Methods for Voltage/Frequency Control in Multiple Clock Domain Microprocessors" ASPLOS'04, The 11th international Conference on Architectural Support for Programming Languages and Operating Systems, 2004, pp. 248-259.

Xiao Zhang, et al., "A Flexible Framework for Throttling-Enabled Multicore Management (TEMM)" The 41st International Conference on Parallel Processing, 2012, pp. 389-398.

Wonyoung Kim, et al., "System Level Analysis of Fast, Per-Core DVFS using On-Chip Switching Regulators" IEEE, The 14th International Symposium on High Performance Computer Architecture, 2008, pp. 123-134.

Meng Wang, et al., "Real-Time Loop Scheduling with Leakage Energy Minimization for Embedded VLIW DSP Processors" IEEE, The 13th IEEE International Conference on Embedded and Real-Time Computing Systems and Applications (RTCSA 2007), 2007, 8 Pages.

Xin Sui, et al., "Tuning Variable-Fidelity Approximate Programs" University of Texas at Austin, 2014, 7 Pages.

Qilu Sun, et al., "LPV Model and Its Application in Web Server Performance Control" IEEE, The International Conference on Computer Science and Software Engineering, 2008, pp. 486-489.

Srinath Sridharan, et al., "Holistic Run-time Parallelism Management for Time and Energy Efficiency" ICS'13, The 27th international ACM conference on International conference on supercomputing, 2013, 12 Pages.

Jacob Sorber, et al., "Eon: A Language and Runtime System for Perpetual Systems" SenSys'07, The 5th international Conference on Embedded Networked Sensor Systems, 2007, pp. 161-174.

David C. Snowdon, et al., "Koala: A Platform for OS-Level Power Management" Eurosys'09, The 4th ACM European conference on Computer systems, 2009, pp. 289-302.

Youngmin Shin, et al., "28nm High-κ Metal-Gate Heterogeneous Quad-Core CPUs for High-Performance and Energy-Efficient Mobile Application Processor" ISSCC 2013, IEEE International Solid-State Circuits Conference, Feb. 19, 2013, 3 Pages.

Vivek Sharma, et a., "Power-Aware QoS Management in Web Servers" IEEE, International Real-Time Systems Symposium (RTSS'03), 2003, pp. 1-10.

Muhammad Husni Santriaji, et al., "GRAPE: Minimizing Energy for GPU Applications with Performance Requirements" IEEE, The 49th Annual IEEE/ACM International Symposium on Microarchitecture (MICRO), 2016, 13 Pages.

Efi Rotem, et al. "Power Management Architecture of the 2nd Generation Intel® Core™ Microarchitecture, Formerly Codenamed Sandy Bridge" Hot chips, Aug. 2011, pp. 1-33 and cover page.

Ramya Raghavendra, et al., "No "Power"Struggles: Coordinated Multi-level Power Management for the Data Center" ASPLOS'08, The 13th International Conference on Architectural Support for Programming Languages and Operating Systems, 2008, 13 Pages.

Ragunathan Rajkumar, et al., "A Resource Allocation Model for QoS Management" The 18th IEEE Real-Time Systems symposium, 1997, 10 Pages.

Peter D. Düben, et al., "On the Use of Inexact, Pruned Hardware in Atmospheric Modelling" Philosophical Transactions of The Royal Society A, 2014, pp. 1-16.

Nikita Mishra, et al., "A Probabilistic Graphical Model-Based Approach for Minimizing Energy Under Performance Constraints" ASPLOS'15, The 20th International Conference on Architectural Support for Programming Languages and Operating Systems, 2015, pp. 267-281.

Akihiko Miyoshi, et al., "Critical Power Slope: Understanding the Runtime Effects of Frequency Scaling" ICS'02, The 16th international conference on Supercomputing, 2002, pp. 35-44.

David Meisner, et al., "Power Management of Online Data-Intensive Services" ISCA'11, The 38th ACM International Symposium on Computer Architecture, 2011, pp. 319-330.

Michal Sojka, et al., "Modular Software Architecture for Flexible Reservation Mechanisms on Heterogeneous Resources" Journal of Systems Architecture, vol. 57, 2011, pp. 366-382.

Martina Maggio, et al., "Power Optimization in Embedded Systems Via Feedback Control of Resource Allocation" IEEE, Transactions on Control Systems Technology, vol. 21, No. 1, Jan. 2013, pp. 239-246.

Majid Shoushtari, et al., "Exploiting Partially-Forgetful Memories for Approximate Computing" IEEE, Embedded Systems Letters, vol. 7, No. 1, Mar. 2015, pp. 19-22.

Martina Maggio, et al., "A Game-Theoretic Resource Manager for RT Applications" The 25th Euromicro Conference on Real-Time Systems, 2013, pp. 57-66.

Kai Shen, et al., "Power Containers: An OS Facility for Fine-Grained Power and Energy Management on Multicore Servers" ASPLOS'13, The 18th International Conference on Architectural Support for Programming Languages and Operating Systems, 2013, 12 Pages.

Ankit Sethia, et al., "Equalizer: Dynamic Tuning of GPU Resources for Efficient Execution" The 47th Annual IEEE/ACM International Symposium on Microarchitecture, 2014, 12 Pages.

Adrian Sampson, et al., "EnerJ: Approximate Data Types for Safe and General Low-Power Computation" PLDI'11, The 32nd ACM SIGPLAN Conference on Programming Language Design and Implementation, 2011, 11 Pages.

Saowanee Saewong, et al., "Practical Voltage-Scaling for Fixed-Priority RT-Systems" The 9th IEEE Real-Time and Embedded Technology and Applications Symposium, 2003. pp. 1-22.

Seokwoo Song, et al., "Energy-Efficient Scheduling for Memory-Intensive GPGPU Workloads" EDAA, Conference on Design, Automation & Test in Europe, 2014, 6 Pages.

Song Liu, et al., "Flikker: Saving DRAM Refresh-Power through Critical Data Partitioning" ASPLOS'11, The 16th International Conference on Architectural Support for Programming Languages and Operating Systems, 2011, pp. 213-224.

Arjun Roy, et al., "Energy Management in Mobile Devices with the Cinder Operating System" The European Conference on Computer Systems (EuroSys 2011), 2011, pp. 1-15.

Timothy G. Rogers, et al., "Cache-Conscious Wavefront Scheduling" The 45th Annual IEEE/ACM International Symposium on Microarchitecture, 2012, pp. 1-12.

Martin Rinard, et al., "Patterns and Statistical Analysis for Understanding Reduced Resource Computing" OOPSLA '10, The ACM International Conference on Object Oriented Programming Systems Languages and Applications, 2010, 16 Pages.

Martin Rinard, "Probabilistic Accuracy Bounds for Fault-Tolerant Computations that Discard Tasks" ICS06, The 20th Annual International Conference on Supercomputing, 2006, 11 Pages.

Raghavendra Pradyumna Pothukuchi, et al., "Using Multiple Input, Multiple Output Formal Control to Maximize Resource Efficiency in Architectures" ACM/IEEE 43rd Annual International Symposium on Computer Architecture (ISCA), 2016, 13 Pages.

Dmitry Ponomarev, et al., "Reducing Power Requirements of Instruction Scheduling Through Dynamic Allocation of Multiple Datapath Resources" The International Symposium on Microarchitecture, Dec. 2001, 12 Pages.

Padmanabhan Pillai, et al., "Real-Time Dynamic Voltage Scaling for Low-Power Embedded Operating Systems" SOSP '01, The 18th ACM Symposium on Operating Systems Principles, 2001, 14 Pages.

(56) References Cited

PUBLICATIONS

Paula Petrica, et al., "Flicker: A Dynamically Adaptive Architecture for Power Limited Multicore Systems" ISCA '13, The 40th Annual International Symposium on Computer Architecture, 2013, 11 Pages.

Vinicius Petrucci, et al., "Lucky Scheduling for Energy-Efficient Heterogeneous Multi-Core Systems" HotPower'12, 2012, 5 Pages.

Trevor Pering, et al., "The Simulation and Evaluation of Dynamic Voltage Scaling Algorithms" ISLPED 98, International Symposium on Low Power Electronics and Design, 1998, pp. 76-81.

Krishna V. Palem, "Energy Aware Algorithm Design via Probabilistic Computing: From Algorithms and Models to Moore's Law and Novel (Semiconductor)Devices" CASES'03, The International Conference on Compilers, Architecture and Synthesis for Embedded Systems, 2003, pp. 113-116.

Adam J. Oliner, et al., "Carat: Collaborative Energy Diagnosis for Mobile Devices" SenSys'13, The 11th ACM Conference on Embedded Networked Sensor Systems, 2013, 14 Pages.

Veynu Narasiman, et al., "Improving GPU Performance Via Large Warps and Two-Level Warp Scheduling" MICRO'11, The 44th Annual IEEE/ACM International Symposium on Microarchitecture, 2011, 10 Pages.

Carl N. Morris, "Parametric Empirical Bayes Inference: Theory and Applications" Journal of the American Statistical Association, vol. 78, No. 381, Mar. 1983, pp. 47-55 and cover page.

Xinxin Mei, et al., "A Measurement Study of GPU DVFS on Energy Conservation" HotPower '13, the Workshop on Power-Aware Computing and Systems, 2013, 5 Pages.

Martina Maggio, et al., "Comparison of Decision-Making Strategies for Self-Optimization in Autonomic Computing Systems" ACM Transactions on Autonomous and Adaptive Systems, vol. 7, No. 4, Dec. 2012, pp. 36:1-36:32.

Chenyang Lu, et al., "Feedback Control Architecture and Design Methodology for Service Delay Guarantees in Web Servers" IEEE, Transactions on Parallel and Distributed Systems, vol. 17, No. 9, Sep. 2006, pp. 1014-1027.

Cong Liu, et al., "PASS: Power-Aware Scheduling of Mixed Applications with Deadline Constraints on Clusters" The 17th Int'l Conf. Computer Communications and Networks (ICCCN), Aug. 2008, 6 Pages.

Hai Li, et al., "Deterministic Clock Gating for Microprocessor Power Reduction" HPCA '03, The 9th International Symposium on High-Performance Computer Architecture, 2003, 10 Pages.

Jian (Denny) Lin, et al., "Real-Energy: A New Framework and a Case Study to Evaluate Power-Aware Real-Time Scheduling Algorithms" ISLPED'10, ACM/IEEE International Symposium on Low-Power Electronics and Design, 2010, pp. 153-158.

Baochun Li, et al., "A Control-Based Middleware Framework for Quality-of-Service Adaptations" IEEE, Journal on Selected Areas in Communications, vol. 17, No. 9, Sep. 1999, pp. 1632 -1650.

Nam Sung Kim, et al., "Leakage Current: Moore's Law Meets Static Power" IEEE, Computer Society, Dec. 2003, pp. 68-74 and cover page.

Troy Dale Kelley, "Developing a Psychologically Inspired Cognitive Architecture for Robotic Control: The Symbolic and Subsymbolic Robotic Intelligence Control System (SS-RICS)" International Journal of Advanced Robotic Systems, vol. 3, No. 3, 2006, pp. 219-222.

Onur Kayiran, et al., "Neither More Nor Less: Optimizing Thread-level Parallelism for GPGPUs" PACT'13, The 22nd International Conference on Parallel Architectures and Compilation Techniques, 2013, pp. 1-13.

Melanie Kambadur, et al., "Energy Exchanges: Internal Power Oversight for Applications" Department of Computer Science, Columbia University, 2014, pp. 1-11.

Melanie Kambadur, et al., "Trading Functionality for Power within Applications" Columbia University, Mar. 28, 2014, pp. 1-2.

Evangelia Kalyvianaki, et al., "Adaptive Resource Provisioning for Virtualized Servers Using Kalman Filters" ACM Transactions on Autonomous and Adaptive Systems, vol. 9, No. 2, Article 10, Jun. 2014, pp. 10:1-10:35.

Evangelia Kalyvianaki, et al., "Self-Adaptive and Self-Configured CPU Resource Provisioning for Virtualized Servers Using Kalman Filters" ICAC'09, The 6th International Conference on Autonomic Computing, 2009, pp. 117-126.

Sandy Irani, et al., "Algorithms for Power Savings" SODA'03, The 14th Annual ACM-SIAM Symposium on Discrete Algorithms, 2003, 10 Pages.

Krishna V. Palem, et al., "Ten Years of Building Broken Chips: The Physics and Engineering of Inexact Computing" ACM Transactions on Embedded Computing Systems, vol. 12, No. 2s, Article 87, May 2013, pp. 87:1-87:23.

Y. Jiao, et al., "Power and Performance Characterization of Computational Kernels on the GPU" IEEE/ACM Int'l Conference on & Int'l Conference on Cyber, Physical and Social Computing (CPSCom), 2010, pp. 1-8.

Connor Imes, et al., "Minimizing Energy Under Performance Constraints on Embedded Platforms" The 4th Embedded Operating Systems Workshop (EWiLi'14), 2014, 6 Pages.

Sunpyo Hong, et al., "An Integrated GPU Power and Performance Model" ISCA'10, The 37th Annual International Symposium on Computer Architecture, 2010, pp. 280-289.

Henry Hoffmann, "JouleGuard: Energy Guarantees for Approximate Applications" SOSP'15, The 25th Symposium on Operating Systems Principles, 2015, 17 Pages.

Henry Hoffmann, et al., "PCP: A Generalized Approach to Optimizing Performance Under Power Constraints through Resource Management" USENIX Association, 11th International Conference on Autonomic Computing (ICAC'14), 2014, pp. 241-247 and cover page.

Jin Heo, et al., "AdaptGuard: Guarding Adaptive Systems from Instability" ICAC'09, The 6th international Conference on Autonomic Computing, 2009, 10 Pages.

Joseph L. Hellerstein, et al., "Feedback Control of Computing Systems" IEEE Press, John Wiley & Sons, 2004, Preface pp. XV-XX and cover pages.

Henry Hoffmann, et al., "SEEC: A General and Extensible Framework for Self-Aware Computing" Computer Science and Artificial Intelligence Laboratory Technical Report, MIT-CSAIL-TR-2011-046, Nov. 7, 2011, pp. 1-13 and cover page.

Henry Hoffmann, et al., "Using Code Perforation to Improve Performance, Reduce Energy Consumption, and Respond to Failures" Computer Science and Artificial Intelligence Laboratory Technical Report, MIT-CSAIL-TR-2009-042, Sep. 3, 2009, 20 Pages.

Michael Garland, et al., "Understanding Throughput-Oriented Architectures" Communications of the ACM, vol. 53 No. 11, Nov. 2010, pp. 58-66.

Ashvin Goel, et al., "SWiFT: A Feedback Control and Dynamic Reconfiguration Toolkit" The 2nd USENIX Windows NT Symposium, 1998, 1 Page.

Shelby Funk, et al., "A Global Optimal Scheduling Algorithm for Multiprocessor Low-Power Platforms" RTNS'12, The 20th International Conference on Real-Time and Network Systems, 2012, pp. 71-80.

Yong Fu, et al., "Feedback Thermal Control of Real-Time Systems on Multicore Processors" EMSOFT'12, The 10th ACM International Conference on Embedded Software, 2012, 10 Pages.

Vincent W. Freeh, et al., "Analyzing the Energy-Time Tradeoff in High-Performance Computing Applications" IEEE Transactions on Parallel and Distributed Systems, 2007, pp. 1-24.

Jason Flinn, et al., "Energy-Aware Adaptation for Mobile Applications" 17th ACM Symposium on Operating Systems Principles (SOSP '99), vol. 34, No. 5, Dec. 1999, pp. 48-63.

Jason Flinn, et al., "Managing Battery Lifetime with Energy-Aware Adaptation" ACM Transactions on Computer Systems, vol. 22, No. 2, May 2004, pp. 137-179.

Antonio Filieri, et al., "Automated Multi-Objective Control for Self-Adaptive Software Design" ESEC/FSE'15, The 2015 10th Joint Meeting on Foundations of Software Engineering, 2015, pp. 13-24.

Hadi Esmaeilzadeh, et al., "Neural Acceleration for General-Purpose Approximate Programs" The 45th Annual IEEE/ACM International Symposium on Microarchitecture, 2012, 12 Pages.

(56) References Cited

PUBLICATIONS

Bradley Efron, et al., "Data Analysis Using Stein's Estimator and its Generalizations" Journal of the American Statistical Association, vol. 70, No. 350, Jun. 1975, pp. 311-319 and cover page.

Hadi Esmaeilzadeh, et al., "Architecture Support for Disciplined Approximate Programming" The 17th International Conference on Architectural Support for Programming Languages and Operating Systems (ASPLOS'12), 2012, pp. 1-12.

Qingyuan Deng, et al., "CoScale: Coordinating CPU and Memory System DVFS in Server Systems" The 45th Annual IEEE/ACM International Symposium on Microarchitecture, 2012, 12 Pages.

Zhihui Du, et al., "Energy-Efficient Scheduling for Best-Effort Interactive Services to Achieve High Response Quality" IEEE 27th International Symposium on Parallel and Distributed Processing, 2013, 12 Pages.

Ryan Cochran, et al., "Pack & Cap: Adaptive DVFS and Thread Packing Under Power Caps" MICRO'11, the 44th Annual IEEE/ACM International Symposium on Microarchitecture, 2011, pp. 175-185.

Jian Chen, et al., "Modeling Program Resource Demand Using Inherent Program Characteristics" SIGMETRICS'11, The ACM SIGMETRICS Joint International Conference on Measurement and Modeling of Computer Systems, 2011, 12 Pages.

Jian Chen, et al., "Predictive Coordination of Multiple On-Chip Resources for Chip Multiprocessors" ICS'11, The International Conference on Supercomputing, 2011, 10 Pages.

Ho-Leung Chan, et al., "Optimizing Throughput and Energy in Online Deadline Scheduling" ACM Transactions on Algorithms, vol. 6, No. 1, Article 10, Dec. 2009, pp. 10:1-10:22.

Michael Carbin, et al., "Verifying Quantitative Reliability for Programs That Execute on Unreliable Hardware" OOPSLA '13, The 2013 ACM SIGPLAN International Conference on Object Oriented Programming Systems Languages & Applications, 2013, 20 Pages.

Michael Carbin, et al., "Proving Acceptability Properties of Relaxed Nondeterministic Approximate Programs" PLDI'12, The 33rd ACM SIGPLAN Conference on Programming Language Design and Implementation, 2012, 12 Pages.

Liyu Cao, et al., "Analysis of the Kalman Filter Based Estimation Algorithm: an Orthogonal Decomposition Approach" Elsevier, Automatica, vol. 40, 2004, pp. 5-19.

Qing Cao, et al., "Virtual Battery: An Energy Reserve Abstraction for Embedded Sensor Networks" IEEE, Real-Time Systems Symposium, 2008, pp. 123-133.

Chenyang Lu, et al., "Feedback Control Architecture and Design Methodology for Service Delay Guarantees in Web Servers" IEEE Transactions on Parallel and Distributed Systems, 2001, pp. 1-30.

Ramazan Bitirgen, et al., "Coordinated Management of Multiple Interacting Resources in Chip Multiprocessors: A Machine Learning Approach" 41st IEEE/ACM International Symposium on Microarchitecture, 2008, pp. 318-329.

Nikhil Bansal, et al., "Average Rate Speed Scaling" Algorithmica, vol. 60, 2011, pp. 877-889.

Nikhil Bansal, et al., "Speed Scaling with an Arbitrary Power Function" SODA '09, Proceedings of the 20th Annual ACM-SIAM Symposium on Discrete Algorithms, 2009, pp. 693-701.

Woongki Baek, et al., "Green: A Framework for Supporting Energy-Conscious Programming using Controlled Approximation" PLDI'10, The 31st ACM SIGPLAN Conference on Programming Language Design and Implementation, 2010, pp. 198-209.

Hakan Aydin, et al., "Dynamic and Aggressive Scheduling Techniques for Power-Aware Real-Time Systems" (RTSS 2001), 22nd IEEE Real-Time Systems Symposium, 2001, pp. 95-105.

Muhammad Ali Awan, et al., "Race-to-Halt Energy Saving Strategies" Elsevier, Journal of Systems Architecture, No. 60, 2014, pp. 796-815.

Avinash Lingamneni, et al., "Designing Energy-Efficient Arithmetic Operators Using Inexact Computing" Journal of Low Power Electronics, vol. 9, No. 1, 2013, pp. 1-13.

Jason Ansel, et al., "Language and Compiler Support for Auto-Tuning Variable-Accuracy Algorithms" (CGO 2011) International Symposium on Code Generation and Optimization, 2011, 12 Pages.

Jason Ansel, et al., "SiblingRivalry: Online Autotuning Through Local Competitions" CASES '12 (2012), The 2012 International Conference on Compilers, Architectures and Synthesis for Embedded Systems, 2012, pp. 1-10 and cover page.

Susanne Albers, et al., "Race to Idle: New Algorithms for Speed Scaling with a Sleep State" ACM Transactions on Algorithms, vol. 10, No. 2, Article 9, Feb. 2014, pp. 9:1-9:31.

Hrishikesh Amur, et al., "Towards Optimal Power Management: Estimation of Performance Degradation due to DVFS on Modern Processors" CERCS Technical Reports, 2010, 5 Pages.

Susanne Albers, et al., "Algorithms for Dynamic Speed Scaling" (STACS'11), 28th Symposium on Theoretical Aspects of Computer Science, 2011, pp. 1-11.

Nevine AbouGhazaleh, et al., "Integrated CPU and L2 Cache Voltage Scaling using Machine Learning" LCTES'07, The 2007 ACM SIGPLAN/SIGBED Conference on Languages, Compilers, and Tools for Embedded Systems, 2007, 9 Pages.

Yuki Abe, et al., "Power and Performance Analysis of GPU-Accelerated Systems" HotPower'12, The 2012 USENIX conference on Power-Aware Computing and Systems, 2012, pp. 1-5.

Kai Yu, et al., "Learning Gaussian Processes from Multiple Tasks" ICML'05, The 22nd International Conference on Machine Learning, 2005, 8 Pages.

Heechul Yun, et al., "System-wide Energy Optimization for Multiple DVS Components and Real-time Tasks" ECRTS 2010, 22nd Euromicro Conference on Real-Time Systems, 2010, pp. 1-10.

Frances Yao, et al., "A Scheduling Model for Reduced CPU Energy" FOCS,95, IEEE, 36th Annual Foundations of Computer Science, 1995, pp. 374-382.

Joshua J. Yi, et al., "A Statistically Rigorous Approach for Improving Simulation Methodology" HPCA'03, The 9th International Symposium on High-Performance Computer Architecture, 2003, 11 Pages.

Xiaodong Li, et al., "Cross-Component Energy Management: Joint Adaptation of Processor and Memory" ACM Transactions on Architecture and Code Optimization, vol. 4, No. 3, Article 14, Sep. 2007, pp. 14/1-14/31.

Yildiz Sinangil, et al., "A Self-Aware Processor SoC using Energy Monitors Integrated into Power Converters for Self-Adaptation" Symposium on VLSI Circuits Digest of Technical Papers, 2014, 2 Pages.

C. F. Jeff Wu, "On the Convergence Properties of the EM Algorithm" The Annals of Statistics, vol. 11, No. 1, 1983, pp. 95-103.

Gene Wu, et al., "GPGPU Performance and Power Estimation Using Machine Learning" IEEE, 21st International Symposium on High Performance Computer Architecture (HPCA), 2015, 13 Pages.

Jonathan A. Winter, et al., "Scalable Thread Scheduling and Global Power Management for Heterogeneous Many-Core Architectures" PACT'10, The 19th International Conference on Parallel Architectures and Compilation Techniques, 2010, pp. 29-39.

Greg Welch, et al., "An Introduction to the Kalman Filter" UNC-Chapel Hill, Department of Computer Science, TR 95-041, Jul. 24, 2006, pp. 1-16.

Mark Weiser, et al., "Scheduling for Reduced CPU Energy" OSDI '94, The 1st USENIX conference on Operating Systems Design and Implementation, 1994, pp. 1-11.

Changyun Wei, et al., "An Agent-Based Cognitive Robot Architecture" ProMAS 2012, Programming Multi-Agent Systems, 2013, pp. 54-71.

Weidan Wu, et al., "Inferred Models for Dynamic and Sparse Hardware-Software Spaces" 45th Annual IEEE/ACM International Symposium on Microarchitecture, 2012, pp. 1-12.

Wanghong Yuan, et al., "Energy-Efficient Soft Real-Time CPU Scheduling for Mobile Multimedia Systems" SOSP'03, The 19th ACM Symposium on Operating Systems Principles, 2003, 15 Pages.

Vibhore Vardhan, et al., "GRACE-2: Integrating Fine-Grained Application Adaptation with Global Adaptation for Saving Energy" International Journal Embedded Systems, vol. 4, No. 2, 2009, pp. 1-17.

(56) References Cited

PUBLICATIONS

Akshat Verma, et al., "Server Workload Analysis for Power Minimization Using Consolidation" USENIX'09, The 2009 Conference on USENIX Annual Technical Conference, 2009, 14 Pages.
Narendran Thiagarajan, et al., "Who Killed My Battery: Analyzing Mobile Browser Energy Consumption" WWW 2012—Session: Mobile Web Performance, Apr. 16-20, 2012, pp. 41-50.
Nikita Mishra, et al., "Big Data for LITTLE Cores Combining Learning and Control for Mobile Energy Efficiency" ASPLOS, 2016, pp. 1-14.
David C. Steere, et al., "A Feedback-Driven Proportion Allocator for Real-Rate Scheduling" USENIX, The 3rd Symposium on Operating Systems Design and Implementation, 1999, 15 Pages.
M. Aater Suleman, et al., "Feedback-Directed Pipeline Parallelism" PACT'10, The 19th international conference on Parallel architectures and compilation techniques, 2010, 10 Pages.
Stelios Sidiroglou, et al., "Managing Performance vs. Accuracy Trade-offs With Loop Perforation" ESEC/FSE'11, The 19th ACM SIGSOFT Symposium and The 13th European Conference on Foundations of Software Engineering, 2011, 11 Pages.
Alex Shye, et al., "Into the Wild: Studying Real User Activity Patterns to Guide Power Optimizations for Mobile Architectures" MICRO'09, 42nd Annual IEEE/ACM International Symposium on Microarchitecture, 2009, 11 Pages.

\* cited by examiner

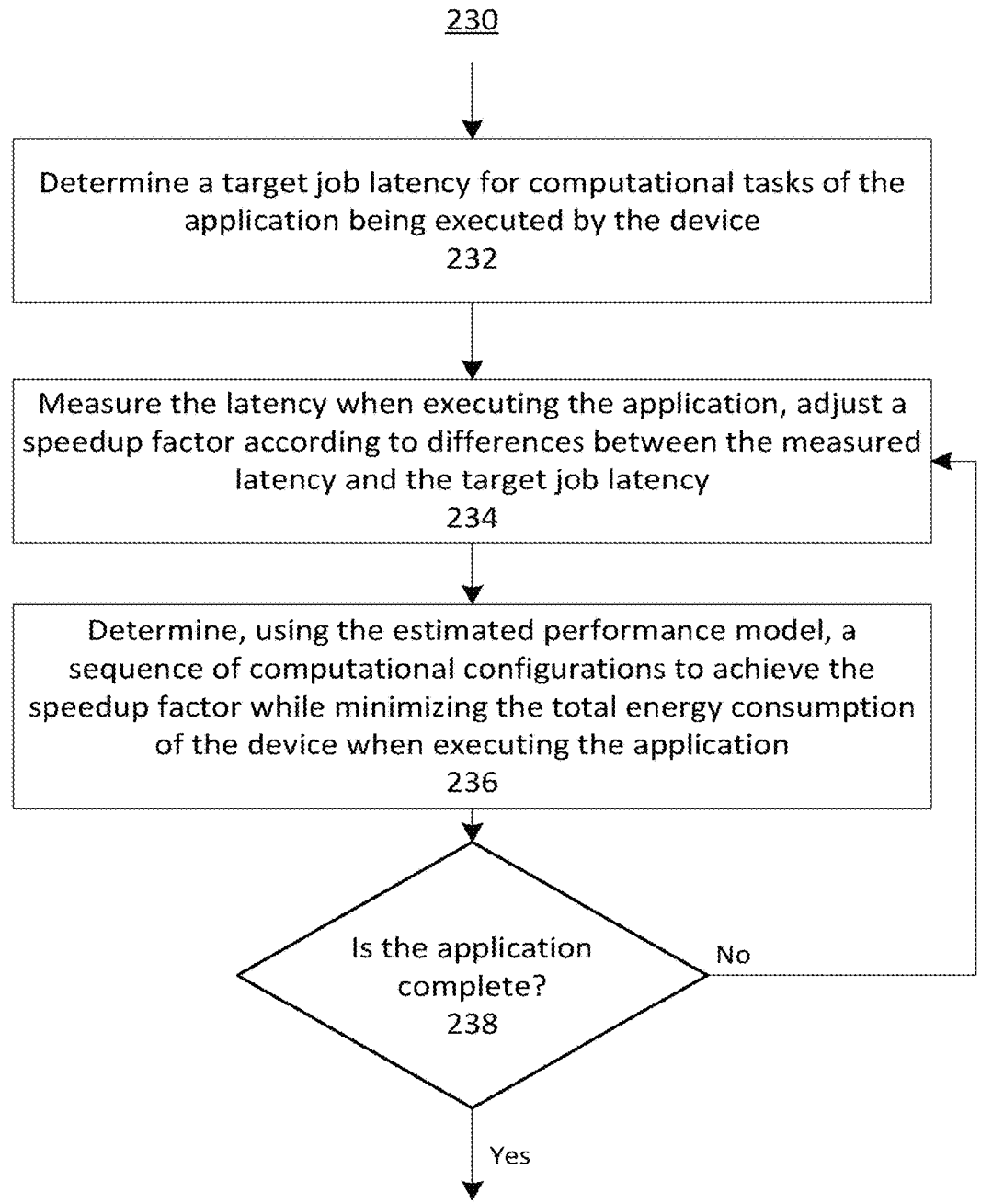

FIG. 3

Small data set of performance data

| Loop Variable | Normalized performance | Normalized consumption | | Loop Variable | Clock rate | # of additional cores |
|---|---|---|---|---|---|---|
| #id | speedup | powerup | | #id | frequency | cores |
| 0 | 1 | 1 | | 0 | 2500000 | 0 |
| 1 | 1.20 | 1.09 | | 1 | 3000000 | 0 |
| 2 | 1.40 | 1.16 | | 2 | 3500000 | 0 |
| 3 | 1.60 | 1.30 | | 3 | 4000000 | 0 |
| 4 | 2.12 | 1.35 | | 4 | 2500000 | 1 |
| 5 | 2.53 | 1.50 | | 5 | 3000000 | 1 |
| 6 | 2.88 | 1.64 | | 6 | 3500000 | 1 |
| 7 | 3.18 | 1.69 | | 7 | 2500000 | 2 |

APPARATUS AND METHOD FOR OPTIMIZING QUANTIFIABLE BEHAVIOR IN CONFIGURABLE DEVICES AND SYSTEMS

CROSS REFERENCE TO RELATED PAPERS

This application is based upon and claims the benefit of priority to provisional U.S. Application No. 62/307,210, filed Mar. 11, 2016, the entire contents of which are incorporated herein by reference.

This invention was made with government support under Grant No. CCF1439156 awarded by the National Science Foundation, and Grant No. DE-AC02-06CH11357 awarded by the Department of Energy. The government has certain rights in the invention.

FIELD

This disclosure relates to a method and apparatus for selecting a computational configuration of an electronic device executing an application in order to improve energy consumption and computational production, and, more particularly to optimizing energy consumption and computational production using a performance model that is based on similarities between a small number of computational configurations of the device executing the application using and a database of other devices, applications, and computational configurations.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Energy consumption plays an important role for the full range of computing systems spectrum from small mobile computing devices such as smartphones and wearable technology, in which energy consumption determines the battery life of the mobile device, and extending to the other end of the spectrum including supercomputers, in which energy consumption affects costs and cooling requirements. Power management is especially important in mobile computing and personal wireless devices such as smartphones and smart wearable technology. As processors have become smaller and more powerful and as computer memory has increased in density and capacity, battery technology has not kept pace. For example, from 1990 to 2000 disk capacity increased by a factor of 1000, CPU speed increased by a factor of 400, available RAM increased by a factor of 100, wireless bandwidth increased by a factor of twelve, but the energy density of battery increased by only a factor of three.

The absence of large improvements in battery technology increases the importance of efficiently using energy from the batteries. Even fixed computing devices benefit significantly from improved efficiency. Thus, energy conservation and power management have become two of the most important challenges in modern computing systems, including general purpose computers and mobile devices.

In 2015, data centers consume approximately 2% of all US electricity, and data centers increase consumption at a rate of 15% annually. Thus, data centers are projected to consume 8% of U.S. power by 2020. Improved operation techniques in data center are needed to make it more economically and ecologically sustainable and scalable. High power also means high temperature, which has many other adverse side effects such as decrease of system reliability, Energy conservation is also important to battery operated mobile computing devices such as smartphones. Insufficient battery life has is a primary factor in consumer dissatisfaction with modern mobile devices. While mobile computing have become increasing integrated and indispensable in everyday lives for communication, sensing, controlling and entertainment, the increasing complexity of hardware and applications in the mobile devices greatly outpaces the development of battery technology. For example, the improvements from Samsung Galaxy S to Samsung Galaxy S3 correspond to a 5.9 factor increase in CPU performance increases, but the battery capacity only increased by a factor of 1.4.

In certain situations, a goal of power management for a battery powered mobile computing device is to minimize the likelihood that the battery depletes before the device can be recharged while simultaneously providing a high quality of service. Various aspects of the computational configuration can be adjusted and tuned to achieve these competing objectives. Further, the optimal configuration for one combination of mobile device and application being executed on the mobile device may not be optimal for another combination of device and application.

Thus, the optimal computational configuration can depend on the architecture of the mobile device and the application being executed on the mobile device. Generally, a computational device will be configurable over a configuration space, including: the number and combination of cores, clockspeed, hyperthreading, and memory controllers, for example. Thus, optimizing the computational configuration can be represented as a constrained optimization problem, with the exact form of the optimization depending on the specified goals of the optimization. For example, the goal may be to guarantee the battery is not exhausted within a predefined window while maintaining a minimum quality of service. Alternatively, the goal may be to complete the most computational tasks before the battery is exhausted.

Generally, finding the optimal computational configuration depends on applying an accurate model of the computational performance and energy consumption of the device executing the application. However, obtaining a model can be challenging because, generally, the model will be device dependent, with different devices having different performance and consumption characteristics. Further, the model will be application dependent. For example, some applications will being more conducive to parallel execution on multiple cores, while others will require significant communication overhead and become less efficient when executed on multiple cores.

Certain rules of thumb or heuristics have been developed as being nearly optimally efficient for a limited number of device-application combinations. Two such heuristics are the race-to-idle and never-idle heuristics. The computational task can be defined as executing an application within a predefined time window. According to the race-to-idle heuristic, all of the computational resources are allocated to the application and once the application is finished the system goes to idle for the remaining duration of the predefined time window. This strategy incurs almost no runtime overhead, but may be suboptimal in terms of energy, since maximum resource allocation is not always the best solution to the energy minimization equation. In the never-idle heuristic the device is configured to work at a constant rate while allocating only enough resources to complete the application coincidently with the end of the predefined time window. Depending on the device a never-idle computational configuration might be closer to optimal than a race-to-idle configuration, whereas another device might be the opposite.

Thus, on the one hand, these heuristics cannot be consistently relied on for the optimal configuration. However, on the other hand, measuring the performance and consumption of a device-application combination for each possible computational configuration to develop a comprehensive model can be a time and energy consuming process. Ideally, a reliable model of computational performance and power consumption could be obtained for a device-application combination without comprehensive testing every time a new application or combination of applications is run on the device. To this end, described herein is a method and apparatus for simultaneously optimizing computational performance and energy consumption by using a model of the device performance based on less than comprehensive testing of computational configurations of the device.

DESCRIPTION OF THE DRAWINGS

A more complete understanding of this disclosure is provided by reference to the following detailed description when considered in connection with the accompanying drawings, wherein:

FIG. 2D shows a flow diagram of an example of a control process to control the configuration of the device using the performance model of the device when executing the application, according to one implementation;

FIG. 3 shows a schematic diagram of a performance model the device when executing the application, according to one implementation;

SUMMARY OF THE INVENTION

Figure 1A:
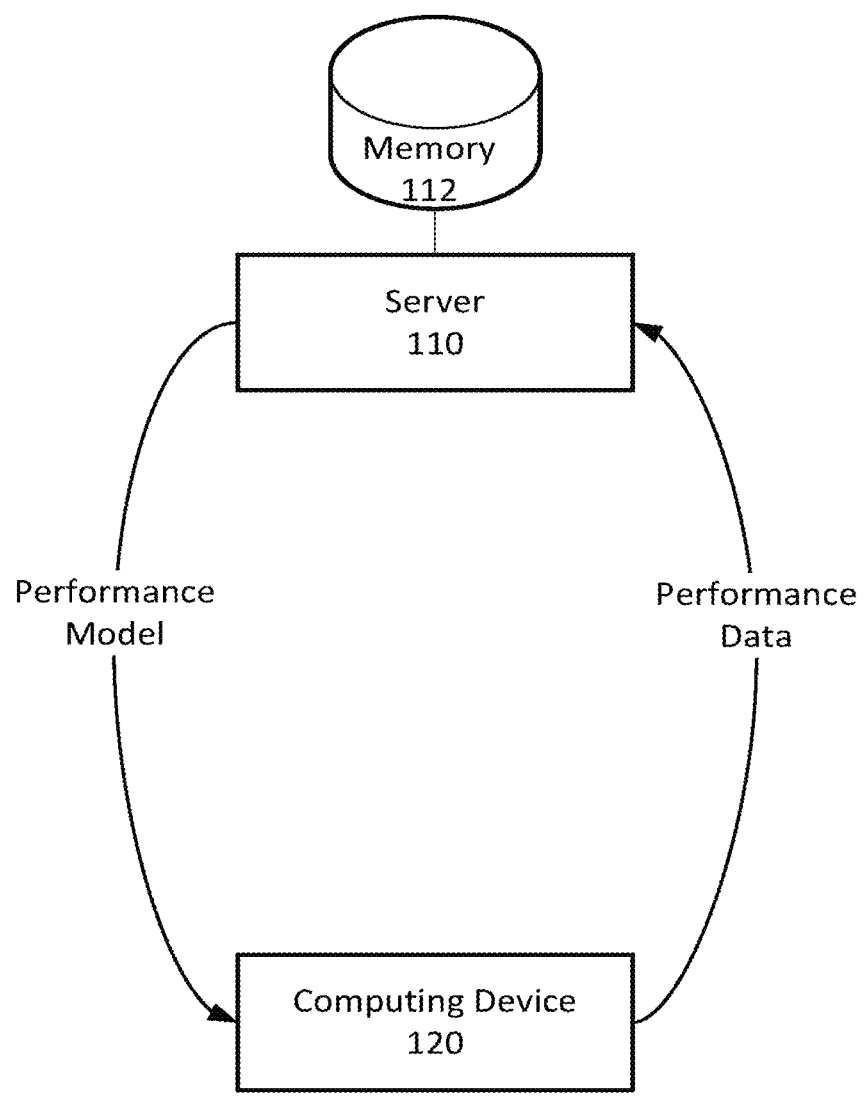
FIG. 1A shows a schematic diagram of a server communicating with a device, according to one implementation.

In one aspect, the present disclosure provides:

(1) a server, including (i) a receiver configured to receive performance data of a device configured to execute an application in a plurality of computational configurations, the performance data including a first plurality of computational configurations with corresponding power-consumption rates and corresponding performance measures of the device when executing the application; (ii) a memory to store other performance data that includes a second plurality of computational configurations, power-consumption rates, and performance measures of a plurality of other devices when executing a plurality of applications; and (iii) processing circuitry configured to (a) compare the received performance data of the device to the stored other performance data, (b) determine a performance model of the device based on the comparison between the received performance data of the device and the stored other performance data, the performance model including an estimate of respective power-consumption rates and respective performance measures of the device when executing the application for a third plurality of computational configurations of the device; and (c) a transmitter configured to transmit to the device the determined performance model of the device, wherein (d) the transmitted performance model of the device enables the device to optimize a combination of a performance measure and power consumption according to predefined optimization criteria.

(2) The server according to (1), wherein the processing circuitry is further configured to determine the performance model, wherein the performance measures of the received performance data are computational-performance rates, the performance measures of the stored other performance data are computational-performance rates, and the performance measures of the performance model are computational-performance rates.

(3) The server according to (1) or (2), wherein the processing circuitry is further configured to determine the performance model, wherein the performance model represents hash table of a power-consumption rates and performance measures of an energy-frontier plurality of computational configurations corresponding to a convex hull of a power-consumption/performance tradeoff space.

(4) The server according to any of (1)-(3), wherein the processing circuitry is further configured to compare the received performance data of the device to the stored other performance data, wherein the device is one of a mobile communication device, a wireless user equipment, a smart phone, wearable technology, and a tablet computer, an embedded processor.

(5) The server according to any of (1)-(4), wherein the processing circuitry is further configured to compare the received performance data of the device to the stored other performance data, wherein the device is one of an aircraft motor, an embedded processor in heavy machinery, and a controller of a dynamic system.

(6) The server according to any of (1)-(5), wherein the processing circuitry is further configured to (i) compare the received performance data of the device to the stored other performance data to generate an estimate of the respective power-consumption rates and the respective performance measures corresponding to all computational configurations of the device, wherein (ii) the estimate of respective power-consumption rates and respective performance measures corresponding to all computational configurations of the device represents a mean and a measure of variance for each power-consumption rate and each performance measure of each computational configuration of all computational configurations of the device, and (iii) the performance model includes a subset of all computational configurations of the device corresponding to a convex hull of a tradeoff space between the power-consumption rates and the performance measures determined using the estimate of the respective power-consumption rates and the respective performance measures corresponding to all computational configurations of the device.

(7) The server according to any of (1)-(6), wherein the memory is further configured to store the received performance data of the device.

(8) The server according to any of (1)-(7), wherein the processing circuitry is further configured to compare the performance data of the device to the other performance data using a Bayesian network.

(9) The server according to any of (1)-(8), wherein the processing circuitry is further configured to (i) compare the received performance data of the device to the stored other performance data using an expectation maximization method to determine a combination of the plurality of other devices and the plurality of applications that is similar, in terms of performance and power use, to the device when executing the application, and (ii) determine the performance model of the device, using the expectation maximization method.

(10) The server according to any of (1)-(9), wherein the processing circuitry is further configured to (i) compare the received performance data of the device to the stored other performance data using an hierarchical Bayesian model to determine a combination of the plurality of other devices and the plurality of applications that is similar, in terms of performance and power use, to the device when executing the application, and (ii) determine the performance model of the device, using the hierarchical Bayesian model.

(11) The server according to any of (1)-(10), wherein the processing circuitry is further configured to compare the received performance data of the device to the stored other performance data using one of a support vector machine, a principal component analysis based method, a probabilistic graph method, an artificial neural network, a machine learning method, a pattern recognition method, a deep learning method, a clustering method, a genetic algorithm, and a classifier learning method to determine the performance model of the device.

(12) A device configured to execute an application in a plurality of computational configurations, the device including (i) an interface configured to (a) transmit, to a server, performance data of the device, the performance data including, for a first plurality of computational configuration of the plurality of computational configurations, corresponding power-consumption rates and corresponding performance measures of the device when executing the application, (b) receive, from the server, a performance model that includes an estimate of respective power-consumption rates and respective performance measures of the device when executing the application for a second plurality of computational configurations of the device; and (ii) processing circuitry configured to (a) determine, using the performance model, a sequence of computational configurations of the device to perform predefined computational tasks of the application to optimize a combination of a performance measure and power consumption of the device according to predefined optimization criteria, and (b) execute the application according to the determined sequence.

(13) The device according to (12), wherein the processing circuitry is further configured to determine the sequence of computational configurations of the device to perform the predefined computational tasks of the application, wherein the predefined optimization criteria to be optimized to complete the predefined computational tasks within a predefined time period while minimizing power consumption of the device during the predefined time period.

(14) The device according to 12 or 13, wherein the processing circuitry is further configured to determine the sequence of computational configurations of the device to perform the predefined computational tasks of the application, wherein the predefined optimization criteria to be optimized is to maximize a ratio between the performance measure and the power consumption of the device, wherein the performance measure is a computational performance rate, and when an estimate of a completion time of the application indicates that the application will not be executed within a predefined time, using an approximate computing method to accelerate completion of the application in order to complete the application by a predefined time.

(15) The device according to any of (12)-(14), wherein the processing circuitry is further configured to determine the sequence of computational configurations of the device to perform the predefined computational tasks of the application, wherein the predefined optimization criteria to be optimized is to maximize a ratio between the performance measure and the power consumption of the device, wherein the performance measure is a computational-performance rate, and when a calculation indicates that a maximum of ratio of the computational-performance rate to the power-consumption rate is less than a predefined threshold, using an approximate computing method to increase the ratio of the computational-performance rate to the power-consumption rate.

(16) The device according to any of (12)-(15), wherein the processing circuitry is further configured to (i) determine the predefined time period to be inversely proportional to a speedup factor, and (ii) adjust the speedup factor to minimize a difference between a desired latency of the respective computational tasks and a measured latency of the respective computational tasks.

(17) The device according to any of (12)-(15), wherein the processing circuitry is further configured to (i) update the performance model of the device executing the application according to repeated measurements of the power consumption rate and the computational performance rate using various computational configurations, (ii) update the selection of the computational configuration of the device according to the updated performance model, (iii) update the estimate of a completion time of the application according to the updated performance model and the updated computational configuration of the device, and (iv) update the approximate computing method according to an updated estimate of the completion time of the application, the updated computational configuration, and the updated the performance model.

(18) The device according to any of (12)-(17), wherein the processing circuitry is further configured to adjust the sequence of computational configurations of the device to perform predefined computational tasks of the application, using one of a control method including proportional, integral, and derivative feedback, a state-space control method, a multiple-input multiple-output control method, and a single-input single-output control method.

(19) A system, including (i) a device that includes (a) processing circuitry configured to: execute an application, change a computational configuration of the processing circuitry, measure power-consumption rates of the processing circuitry executing the application, and measure performance measures of the processing circuitry when executing the application, (b) a transmitter configured to transmit performance data of the device executing the application, the performance data including respective computational configurations of a first plurality of computational configurations of the device with the corresponding power-consumption rates and the corresponding performance measures of the device when executing the application, and (c) a receiver configured to receive a performance model that estimates respective power-consumption rates and the performance measures of the device executing the application, for a second plurality of computational configurations of the device, and (ii) a server that includes (a) a memory to store other performance data that includes computational configurations, power-consumption rates, and performance measures of a plurality of other devices when executing a plurality of applications, (b) a receiver configured to receive the transmitted performance data of the device, (c) a transmitter configured to transmit the performance model of the device, and (d) processing circuitry configured to: compare the received performance data of the device to the stored other performance data, and determine a performance model of the device based on the comparison between the received performance data of the device and the stored other performance data, the performance model including an estimate of the respective power-consumption rates and the respective performance measures of the device when executing the application for the second plurality of computational configurations of the device.

(20) The system according to claim 19, wherein the performance measures measured by the device includes a computational-performance rates that include a ratio of a number of computational tasks performed by the processing circuitry executing the application within a predefined time interval.

(21) A system, including: (i) an apparatus having at least one constrained property and a plurality of other properties to be optimized, the apparatus including (a) a plurality of components, which are configurable in real-time, such that the apparatus can be configured in a plurality of configurations, and (b) circuitry configured to detect the at least one constrained property when the apparatus is configured in a first subset of the plurality of configurations; (ii) learning circuitry configured to (a) determine, using the detected at least one constrained property, a model representing the at least one constrained property when the apparatus is in the plurality of configurations, and (b) estimate an uncertainty of the determined at least one constrained property; and (iii) control circuitry configured to (a) select a configuration of the plurality of configurations to minimize an error value that is a difference between a desired value of the at least one constrained property and an observed value of the at least one constrained property by using the determined model and the estimated uncertainty.

(22) The system according to (21), wherein the learning circuitry is further configured to encode the determined model as a hash table to provide rapid lookup of optimal configurations of the apparatus corresponding to respective values of the at least one constrained property, according to the determined model.

(23) The system according to (21) or (22), wherein the learning circuitry is further configured to determine the model using a hierarchical Bayesian method to compare the detected values of the at least one constrained property corresponding to the first subset of the plurality of configurations to a database of other apparatuses also having the at least one constrained property.

(24) The system according to any of (21)-(23), wherein the apparatus is a mobile computing device executing an application, the plurality of configurations include computational configurations of the mobile computing device, and the learning circuitry is included on a server, which is remotely accessed by the mobile computing device.

(25) An apparatus having at least one constrained property, the apparatus comprising: (i) a plurality of components, which are configurable in real-time to configure the apparatus in respective configurations of a plurality of configurations; (ii) detection circuitry configured to detect values of the at least one constrained property when the apparatus is configured in a first subset of the plurality of configurations; (iii) transmitting circuitry configured to transmit the detected values of the at least one constrained property and the corresponding first subset of the plurality of configurations to a model learning apparatus; (iv) receiving circuitry configured to (a) receive a model representing respective values of the at least one constrained property corresponding to the plurality of configurations, and (b) receive an uncertainty of the model; and (v) control circuitry configured to select, using the received model and the uncertainty of the model, a configuration of the plurality of configurations to minimize an error value that is a difference between a desired value of the at least one constrained property and an observed value of the at least one constrained property by using the determined model and the estimated uncertainty.

(26) A method of optimizing at least one constrained property of an apparatus having a plurality of components, which are configurable in real-time, the method comprising: (i) detecting values of the at least one constrained property and a plurality of other properties of the apparatus when the apparatus is configured in a first subset of the plurality of configurations; (ii) learning, using the detected values of the at least one constrained property, a model representing the at least one constrained property and the plurality of other properties when the apparatus is in the plurality of configurations; (iii) estimating an uncertainty of the determined at least one constrained property value of the model; and (iv) selecting, using the determined model and the estimated uncertainty, a configuration of the plurality of configurations to minimize an error value that is a difference between a desired value of the at least one constrained property and an observed value of the at least one constrained property.

(27) A non-transitory computer readable storage medium including executable instruction, wherein the instructions, when executed by circuitry, cause the circuitry to perform the method according to (26).

DETAILED DESCRIPTION

Optimizing a computational configuration of a computational device to achieve desired power-consumption and computational-performance goals can depend on having a reliable model of the performance and consumption of the device. Relying on a poor model could result in predicting a theoretically optimal configuration that is actually far from optimal. However, extensive empirical testing to measure the performance and consumption of the device configured in multiple computational configurations while executing the desired application also has drawbacks due to the significant resources in time and energy devoted to developing a comprehensive model for each combination of device and application. The model of performance and consumption can be different for each combination of device and application because different devices can have different performance and consumption characteristics and different applications can also have different performance and consumption characteristics. In many situations, measuring performance and consumption for all computational configurations is impracticable every time a device executes a new application or a new combination of applications. Accordingly, it is desirable to derive a reliable model of the performance and consumption for the device when executing an application while performing empirical testing using less than all of the computational configurations of the device when executing the application. Herein, the word performance is used as a short hand for "computational performance," and the word consumption is used as a short hand for "power consumption."

The methods described herein are more general than the primary example provided herein, which optimizes the computational configuration for computational performance subject to constraints on energy and/or power consumption. This primary example is non-limiting, and the methods described herein apply generally to constrained optimization problems in complex and dynamic environments.

As would be understood by a person of ordinary skill in the art, "constraints" refer to quantifiable goals that must be met for correct operation. Examples include, but are not limited to: performance, throughput, latency, energy, power, accuracy, security, reliability, resilience, cost, space, size, weight. Further, "optimization" subject to constraints refers to the fact that although some goals are non-negotiable, i.e. they absolutely must be respected, while other goals should be minimized or maximized. For example, computer servers must meet power constraints while maximizing throughput. As another example, self-driving cars must meet speed constraints while minimizing energy (or fuel). The term "complexity" refers to the fact that in many systems there are multiple mechanisms that can be tuned to meet the constraints and the optimization goals. The interaction of these mechanisms can be difficult to model—often leading to non-linear, non-convex optimization spaces and/or tradeoff spaces having multiple local minima—making it extremely difficult to ensure constraints are respected while other behavior is optimized. For example, the interaction between the number of active cores in a multicore and the speed of those cores creates non-linear, non-convex optimization problems. The term "dynamic" refers to the fact that unpredictable changes occur during system operation, yet the constraints must still be satisfied while other behavior is optimized. For example, when using a mobile device for a video call, the software must handle transitions from low motion (e.g. sitting still) to high motion (e.g. walking around a house or waving to the other party).

Many problems exhibit the combination of challenges presented by constrained optimization problems in complex and dynamic environments that are addressed by the methods described herein. The methods described herein use the general approach of combining machine learning (ML) and control theory (CT) to meet constraints optimally in complex and dynamic environments. In general, machine learning models the complex interactions of the available mechanisms, while control theory ensures the constraints are met despite dynamic changes. Machine learning enables the generation of a reasonably accurate model of the system without exhaustively exploring the parameter space. Having generating a model of the system, control theory can be applied to account for errors in the model and to adapt to dynamic changes of the system and/or changing goals. The methods described herein allow practical implementations in addition to formal analytical guarantees. ML and CT are broad fields that encompass a number of different individual techniques.

The exemplary implementations described herein use a non-limiting ML technique called hierarchical Bayesian models, but other ML techniques can also be used, as would be understood by a person of ordinary skill in the art. For example, the ML techniques that can be used in the methods described herein include: matrix completion methods, multi-tasking algorithms, transfer learning based algorithms, regression algorithms, Bandit-based learning methods, and genetic and evolutionary algorithms, for example. Matrix completion methods can include: low rank matrix completion with noise, high rank matrix completion, collaborative filtering, recommender systems (e.g., the Netflix™ algorithm), matrix completion with side information, Bayesian matrix completion, and nonparametric matrix completion, for example. Regression algorithms can include: random forest algorithms, polynomial regression, and gradient boosting, for example. Bandit-based learning can include: multiarmed bandit learners, and multiarmed bandit learners with correlated arms, for example.

The exemplary implementations described herein use the non-limiting CT example of a proportional-integral (PI) control. However, other classes of controllers can be used, as would be understood by a person of ordinary skill in the art. For example, the controller can use: proportional control, integral control, proportional integral control, proportional integral derivative control, state-space control, stochastic control, adaptive control, optimal control, model predictive control, switching control, gain scheduling, self-tuning regulators, minimum variance control, and fuzzy control.

The non-limiting exemplary implementations described herein focus primarily on combinations of hierarchical Bayesian learning with adaptive proportional integral control with an independent optimization module. However, these non-limiting exemplary implementations are instantiations of the more general concept contemplated herein, which is sufficiently general to apply to many more combinations of the above approaches. For example, the methods described herein can be applied to: maximizing throughput for compute servers while respecting constraints on power consumption; ensuring that a mobile device can last for the duration of a plane trip; balancing tradeoffs between quality, energy, and security for mobile video calls; minimizing cost while providing reliable performance for cloud customers; minimizing energy while ensuring user satisfaction for mobile applications; managing tradeoffs between sensor usage and reliability in self-driving cars; maximizing throughput for minimal cost in industrial assembly lines; and automatic configuration of high-end televisions to minimize energy consumption while meeting user quality requirements.

More particularly, the methods described herein can be applied to many devices and systems in addition to the exemplary networked mobile communication devices (e.g., smartphones and tablet PCs) described herein. For example, the methods can be used to optimize any system which has one or more constraints, and the may be particularly beneficial when it is used to optimize a system comprising dynamics or time-dependent variables that are unpredictable or difficult to model. Moreover, the methods described herein may be particularly beneficial for optimizing systems that are too complicated for linear regressions or other analytical models to capture the dependence on the system's parameters. Exemplary systems include jet airplane turbines for which it may be desirable to minimize fuel consumption while maintaining power output by varying some or all of the turbine's control parameters in the face of unpredictably varying inputs such as humidity, pressure, and other environmental conditions, for example. Other exemplary systems include building HVAC systems for which it may be desirable to minimize power consumption, while maintaining temperature and humidity conditions throughout many different regions of the building or buildings by varying air handling controls, such as air flow rates, temperatures, cooling/heating power, and other parameters while occupants of the building are opening or closing windows and/or entering and entering rooms in unpredictable ways, for example. Additionally, network bandwidth optimization can be another exemplary system applying the methods described herein. For example, in network bandwidth optimization, data throughput from multiple sources to multiple destinations across a network can be maximized while latency is constrained and in which data packets can take any one of multiple routes across the network and the arrival of the new data packets into the network is unpredictable. A further exemplary system in which the methods described herein can be applied is internal combustion engines for which fuel consumption is minimized while, for example, power output is held constant and the valve timing and other engine parameters are varied as engine inputs such as air and fuel quality vary. Additional constrained optimization problems to which the present invention may be applied arise in power generation systems, warehouse distribution systems, and manufacturing facilities, for example.

Now an exemplary implementation of a smart home is provided, illustrating the methods described herein. The methods described herein combining machine learning together with feedback and control can be used to manage a "smart home." For example, a home could be configured with shades that automatically adjust and light fixtures that adjust brightness. A homeowner might have a constraint on brightness and would like to meet this constraint while minimizing electricity cost.

This example has all the requisite properties described above. That is, (1) there is a quantifiable constraint in terms of light, (2) there is an objective function to be optimized (i.e., electricity cost), and (3) there are multiple configurable parameters (i.e., shades and lights). The combination of shades and lights give us a complex tradeoff space. Raising and lowering the shades have one-time costs. The lights continuously consume electricity. In addition, there are system dynamics as changes in weather and time of day create different conditions.

Such a smart home could learn from other smart homes to build models of the relationship between shades, electric lights, and brightness. That learned model could then be passed to a controller that operates within the home to adjust the relative usage of shades and electric lights to ensure the homeowner is always in a sufficiently bright room while the use of electric lights is minimized. This example maps directly into the example of meeting a performance constraint used throughout the document. Here the configurable parameters are the shades and lights (analogous to cores and clockspeeds in a computer). The constraint is brightness (analogous to computer performance). The objective to be optimized is cost (analogous to energy). The learner would measure the brightness and cost of different configurations, perhaps combine those measurements with other measurements from other smart homes, and produce a model that maps configuration to brightness and cost. This same model could be stored in a brightness hash table (analogous to the performance hash table). The controller computes the error between the current brightness and the desired brightness, computes a brightup (analogous to speedup) and then uses the brightness hash table to select a minimal cost configuration that delivers the desired brightup.

Altering the example slightly, the homeowner may be more concerned about electricity costs. In this case, the constraint is the amount of money the home owner is willing to spend on lighting. The objective is to achieve the brightest conditions. The learner would produce almost the same model as the previous paragraph, but now it would store it in a cost hash table—because it is controlling costs. In this example the controller measures the rate of spending on lighting and computes an error between the desired spending rate and the budget (monthly budgets are trivially converted to rates by dividing by time) to compute a costup (analogous, again, to speedup). The controller then looks in the cost hash table to find the brightest configuration that meets the desired budget, adjusting to maintain the correct power consumption despite weather and time changes. Such a system could even adapt to changing prices in electricity.

As would be understood by a person of ordinary skill in the art, the applicable mathematical formulation is almost identical to the example provided hereafter of meeting a computer program's latency constraint with minimal energy. Similar to the computational latency example to be discussed, the learner maps configurations into quantifiable behavior. Tradeoffs are stored in a hash table using a similar scheme to FIG. 25. The controller similarly measures a difference between a constraint and the actual behavior and then selects the configuration that optimizes the constraint.

Returning to the example of optimizing computational performance under energy and/or power constraints, there is a tension between gathering sufficient empirical data to estimate a reliable model whereby an optimal computational configuration can be approximated and limiting the resources devoted to gathering empirical data. Machine learning techniques represent a promising approach to addressing this estimation problem. Offline learning approaches collect profiling data for known applications and use that to predict optimal behavior for unseen applications. Online learning approaches use information collected while an application is running to quickly estimate the optimal configuration. Offline methods require minimal runtime overhead, but suffer because they estimate only trends and cannot adapt to particulars of the current application being executed on the device. Online methods customize to the current application, but cannot leverage experience from other applications. In a sense, offline methods are dependent on a rich training set that represents all possible behavior, while the online methods can be data limited and generate a statistically weak and less accurate model due to the small sample size.

In contrast to the offline and online methods, a hybrid method of estimating the performance-consumption model is described herein. The hybrid method is a machine learning method that combines the best of the offline and online methods (e.g., the hybrid method combines the statistical properties of both offline and online estimation). The hybrid method begins with a set of applications for which the consumption and performance have been measured previously (e.g., offline).

The hybrid method can use a graphical model to integrate a small number of measurements of the current application with knowledge of the previously observed applications to produce accurate estimations of the consumption and performance tradeoffs for the current application in all configurations. The hybrid method's strength is that it quickly matches the behavior of the current application to a subset of the previously observed applications. For example, if the hybrid method has previously seen an application that only scales to eight cores, it can use that information to quickly determine if the current application will be limited in its scaling.

The hybrid method can be performed on a computing device including a computer readable memory, such as a hard disk, that stores a database of consumption and performance data for the device when executing various applications. This standalone implementation of the hybrid method is then performed by the device comparing a small data set of consumption and performance measurements with the database of previously recorded measurements for other applications to estimate a model of the device when executing the current application. Using the estimated model, the device then determines the optimal computational configuration for executing the current application.

Alternatively, the hybrid method can be performed by a combination of a device and a server communicating with the device. The device can generate data for a small number of configurations for the device when executing the application, and send this small data set to the server. The server can compare the received small data set for the device with a database of the consumption and performance data stored on the server, and estimate the model of the device when executing the application. After receiving the estimated model from the server, the device can then apply the model to determining the optimal computational configuration for executing the application on the device. Thus, the hybrid method can be separated into subtasks that can be performed on either the device or on the server in communication with the device. One advantage of using a server to perform some of the subtasks is that the server might not be subject to the same size, memory and power constraints of the device. For example, the device can be a smartphone or wearable technology that has a small size with a limited battery and memory, whereas the server could be a large data center with access to significantly more power and memory. Further, the database of the server could include performance and consumption data collected from many different devices when executing many different applications. Accordingly, the comparison between the small data set and the database can be statistically richer due to the large sample size of data provided by the larger database contributed to by a large number of computational devices. Thus, each device accessing the server to obtain a model also can contribute to grow the database to the benefit of future users.

Figure 1B:
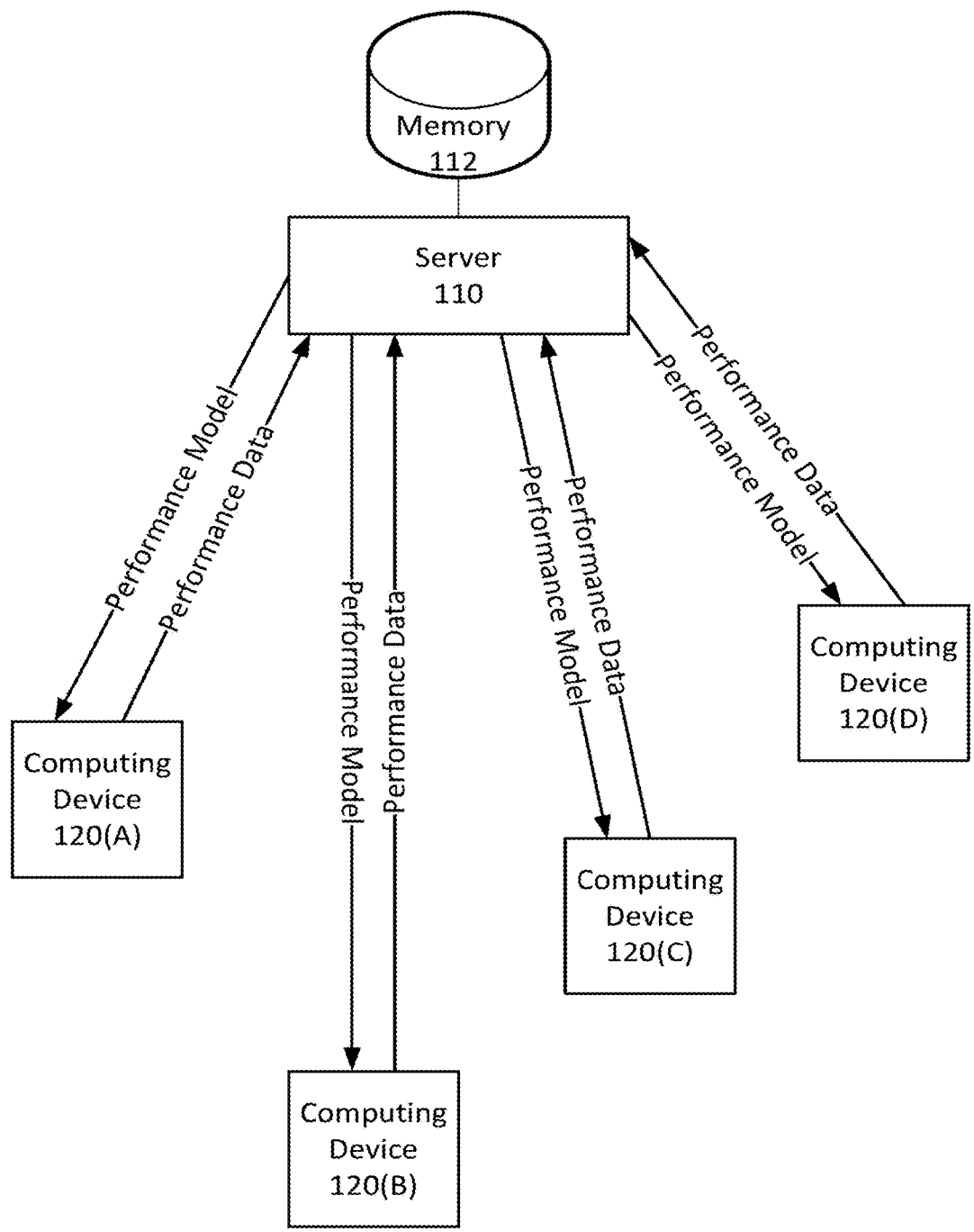
FIG. 1B shows a schematic diagram of a server communicating with several mobile devices, according to one implementation.

Referring now to the drawings, wherein like reference numerals designate identical or corresponding parts throughout the several views, FIG. 1 shows a schematic drawing of a device-server system. A computing device 120 executes a current application and sends performance data of the consumption and performance for a small set of computational configurations of the computing device 120 when executing the current application. The performance data is received by a server 110. The server 110 compares the small data set receiving from the computing device 120 with a database of performance data corresponding to various combinations of devices and other applications. Using these comparisons between the small data set and the database the server estimates a performance model, and sends the performance model to the computing device 120. The computing device 120 then applies the estimated performance model to optimizing the computational configuration of the computing device 120 for executing the current application. The computing device can update the performance data sent to the server 110 by measurements of the continued execution of the current application, and the server can update the performance model based on the updated performance data.

Figure 2A:
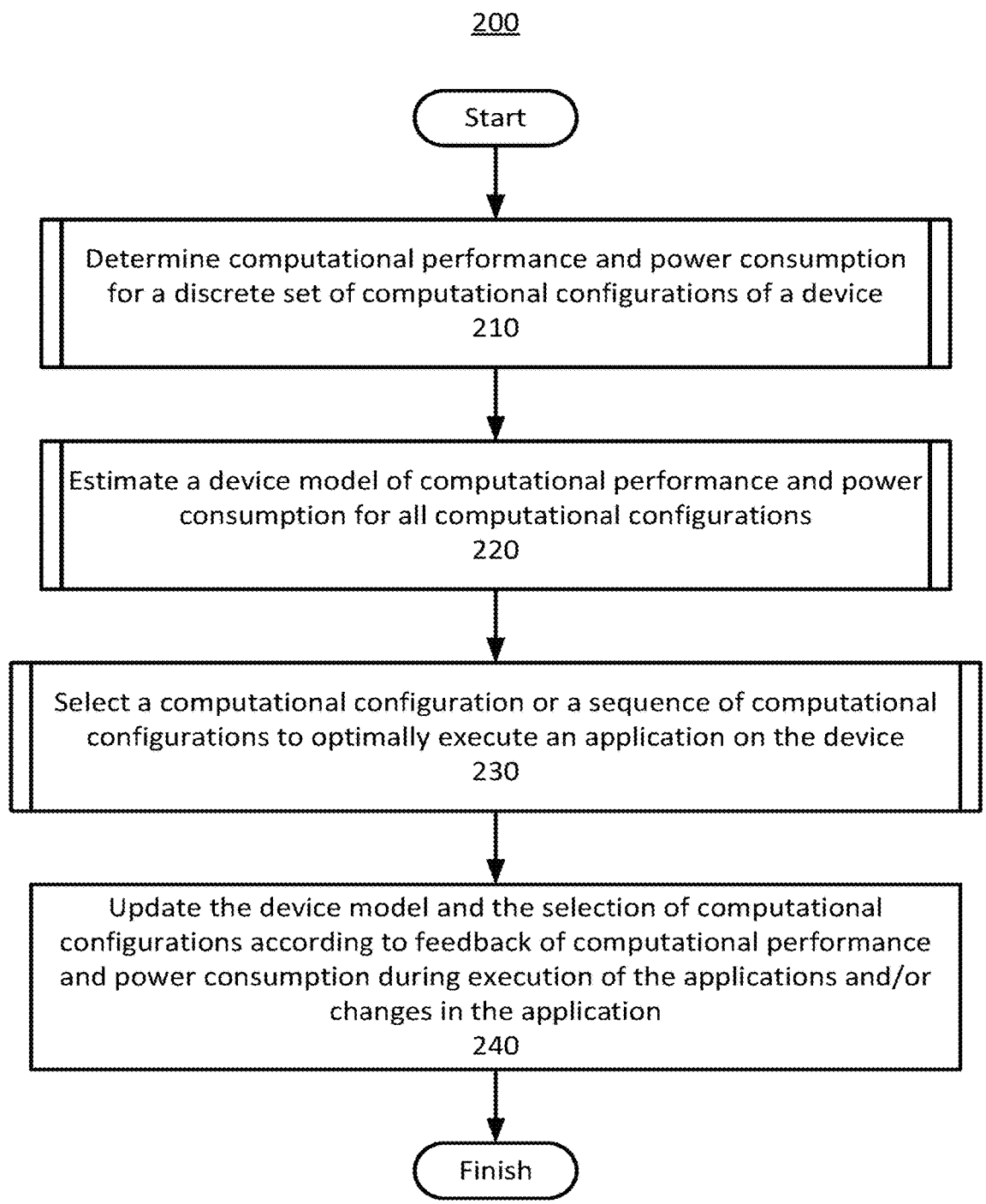
FIG. 2A shows a flow diagram of an example of a method to determine an energy efficient configuration of a device when executing an application, according to one implementation.

FIG. 2A shows a flow diagram of a method 200. In process 210 of method 200, the computational performance and power consumption of the computing device 120 are obtained for a discrete set of computational configurations of the computing device 120 when executing the current application.

In process 220 of method 200, the small data set representing performance and consumption measurements is used to estimate a performance model representing the computational performance and power consumption for all computational configurations of the computing device 120 when executing the current application. In certain implementations, the estimation is performed by the server 110. In certain other implementations, the estimation is performed by the computing device 120.

In process 230 of method 200, an optimal computational configuration is selected using the estimated performance model from process 120. The optimal computational configuration can be a single computational configuration of a sequence of computational configurations that optimally executes the current application on the device, according to predefined criteria. For example, the predefined criteria can be to minimize the total energy consumption subject to the constraint that the application be completed within a predefined time window. Alternatively, the predefined criteria can be to maximize computational accuracy subject to the constraint that no more than a predefined amount of energy be consumed within the predefined time window. The computational configuration of the computing device 120 can also be optimized according to other predefined criteria.

In step 240 of method 200, the performance model of the computing device 120 and the small data set used for the estimation of the performance model can be updated to improve the performance model and more accurately estimate the optimal configuration of the computing device 120. Further, if the computing device consumes power at a rate greater or less than the rate indicated by the performance model than the configuration can be updated to reflect these changes and to ensure compliance with the predefined optimization criteria. For example, if the predefined criteria includes a guarantee that no more than a predefined amount of energy be consumed within the predefined time window and a higher than expected amount of energy was consumed in the first part of the window than the energy consumption can be decreased throughout the remaining duration of the time window to ensure the predefined criteria are satisfied.

Figure 2B:
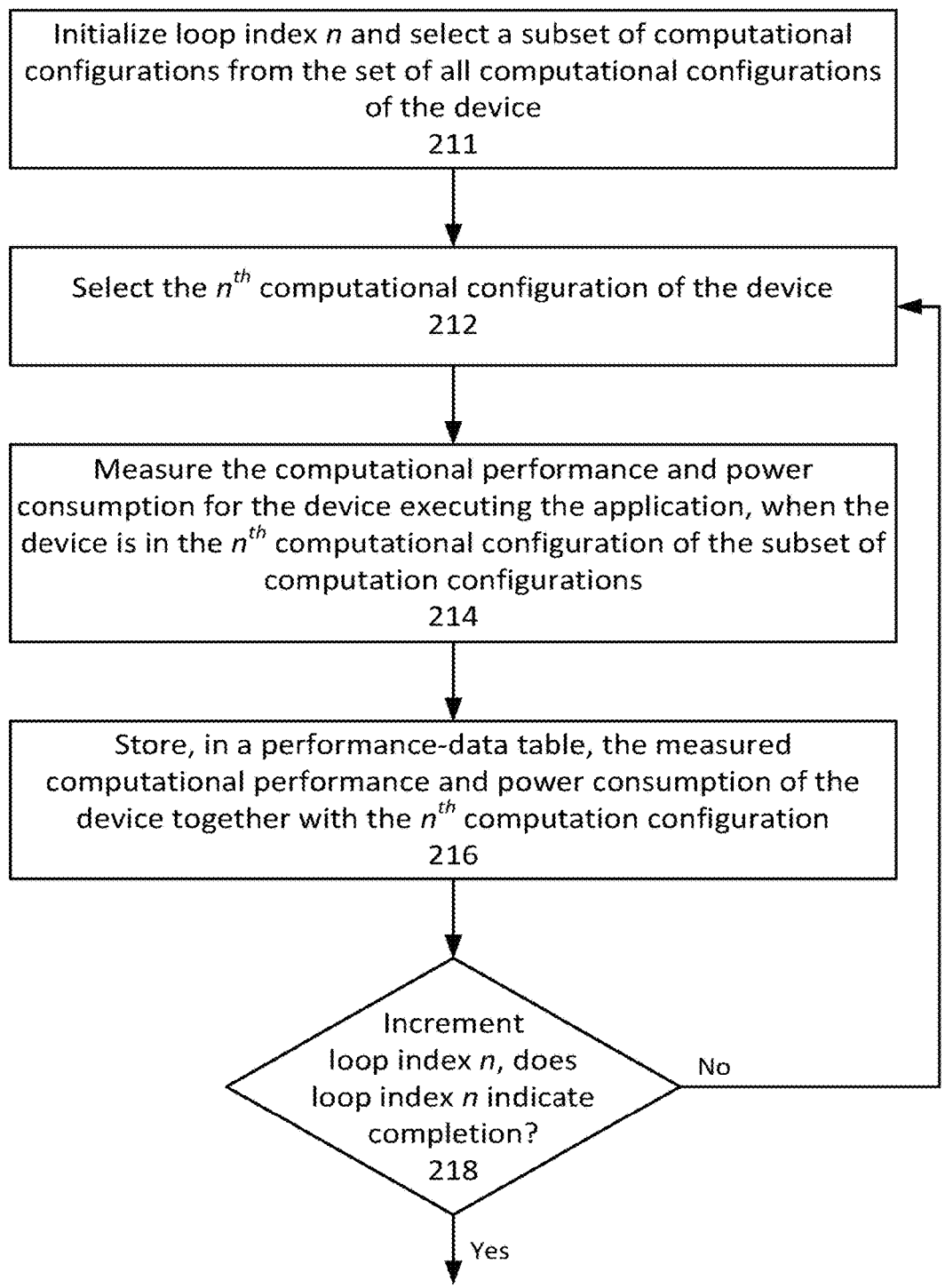
FIG. 2B shows a flow diagram of an example of a process to generate performance characteristics corresponding to some configurations of the device when executing the application, according to one implementation.

FIG. 2B shows a flow diagram of process 210. Step 212 of process 210 includes initializing a loop n and initializing a discrete subset of computation configurations selected from the set of all computational configurations of the device. This discrete subset of computation configurations corresponds to the small data set to be used for the comparison to the performance database and the estimation of the performance model in process 220.

In step 214 of process 210, the computational performance and power consumption of the computing device 120 when executing the current application is measured for the $n^{th}$ computational configuration of the subset initialized in step 212.

In step 216 of process 210, the measured computational performance and power consumption from step 214 is recorded in a table. Also the $n^{th}$ computational configuration of the subset is also recorded in the table. FIG. 3 shows an example of a table of eight configurations ranging from a clock rate of 250,000 to 400,000 and ranging from zero additional cores to 2 additional cores. The number of configurations, clockspeeds, and cores provided herein are non-limiting examples. The methods described herein can be used with any clockspeed and any number of cores. They also support other configurable parameters such as network bandwidth, memory bandwidth, cache partitions, etc. The computational performance can be recorded as a normalized speedup factor relative to a baseline configuration, and the power consumption can be recorded as a powerup factor indicating the relative increase in power consumed relative to the baseline configuration.

In step 218 of process 210, the loop index n is incremented and process 210 inquires whether all of the initialized discrete subset of computational configurations have been evaluated. If all of the computational configurations have been evaluated, then process 210 is complete. Otherwise process 210 proceeds from step 218 to step 212.

Figure 2C:
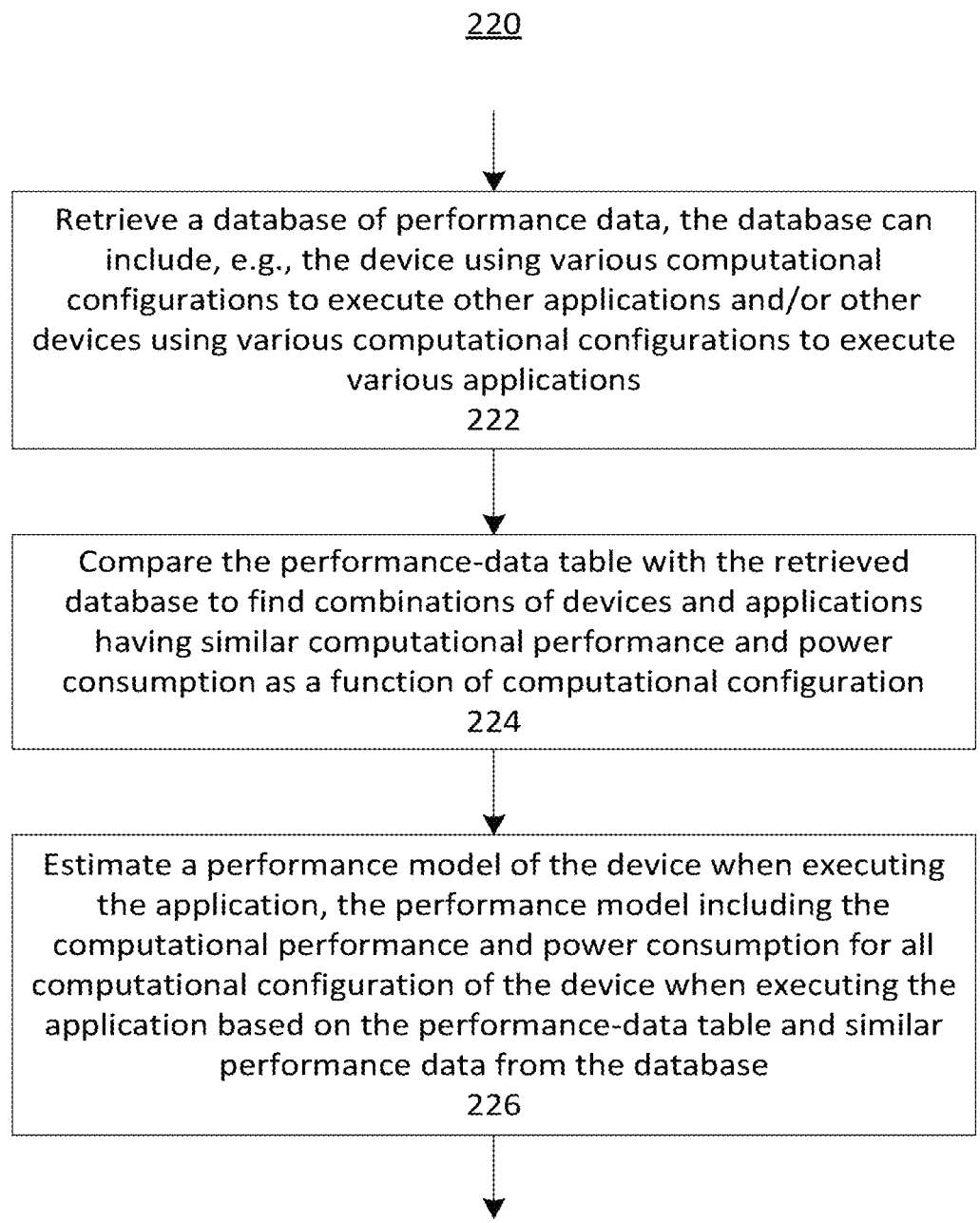
FIG. 2C shows a flow diagram of an example of a process to determine performance model of the configurations of the device when executing the application, the performance model being generated using a comparison between the generated performance characteristics and a database of performance characteristics of various other devices executing various other applications, according to one implementation.

FIG. 2C shows a flow diagram of process 220. In step 222 of process 220, a database of performance data is retrieved. The database can include performance data of the computing device 120 in addition to other computing devices contributing to the database. The database includes recorded measurements of the computational performance and power consumption of these devices for various computational configurations and executing various applications. The database is similar to the small data set corresponding to the discrete subset of computation configurations of process 210, except the database has more data and corresponds to several applications. Some of the data from the database will likely represent a similar power-performance tradeoff as the power-performance tradeoff represented by the small data set from computing device 120 executing the current application. However, the data from the database will also include data points for computational configurations not included in the small data set, and these additional data points in the database can be used to estimate the performance and consumption values for the computing device 120 executing the current application that have been omitted in the original small data set.

Accordingly, a complete model of the computing device 120 executing the current application can be estimated by comparing the small data set to the more complete data of the database and identifying those combinations of devices and applications having power-performance tradeoffs most similar to the power-performance tradeoffs of the computing device 120 executing the current application. The data of these similar combinations of devices and applications from the database can then be used to fill in the holes left in the small data set to generate a comprehensive model of the computing device 120 executing the current application.

In step 224 of process 220, the performance-data table obtained in process 210 is compared with the database retrieved in step 222 to find those combinations of devices and applications having similar computational performance and power consumption as a function of computational configuration.

In step 226 of process 220, a performance model of the device when executing the application is estimated. The performance model includes the computational performance and power consumption for all computational configurations of the device when executing the application based on the performance-data table and similar performance data from the database.

FIG. 2D shows a flow diagram of process 230. The process 230 in FIG. 2D seeks to optimize the computational configuration according to the predefined criteria of minimizing the total energy consumption under the constraint that the application is completed within a predefined time window. In step 232 of process 230, a target job latency is determined for computational tasks of the current application. The target job latency is the desired amount of time in which each of the computational tasks is to be completed. The target job latency can be obtained from a ratio between the computational tasks required to complete the application and the predefined time window. Further, the optimal solution to satisfy the predefined criteria can be a sequence of computational configurations. For example, the optimal configuration might be to allocate all computational resource to the application, completing the application as quickly as possible and then to idle throughout the remainder of the predefined time window. If a sequence of computational configurations are used, then the target job latency can vary between the various portions of the sequence.

In step 234 of process 230, the actual job latency is measured as the computing device 120 executes the application. When the actual job latency deviates from the target job latency, a speedup factor is adjusted according to differences between the measured latency and the target job latency.

In step 236 of process 230, the estimated performance model is used to determine the optimal computational configuration to achieve the speedup factor. Also, the estimated performance model is used to determine a sequence of computational configurations to achieve the speedup factor.

In step 238 of process 230, the process 230 continues to step 234 if the current application is still continuing. If the optimal configuration is a sequence of configurations, then process 230 will also include the step of updating the target job latency after the completion of each section of the sequence. If the application is complete then process 230 is also complete.

As the application is executing, the measured performance and consumption of the computing device 120 can be recorded and used to update the performance model of the computing device 120. The newly measured performance and consumption data of the computing device 120 can be added to the small data set to generate an augmented small data set. This augmented small data set can then be used in a process similar to process 220 to generate an updated model of the computing device 120 when executing the current application. This process of updating the model of the computing device 120 can be performed in parallel with process 230, and the updated model of the computing device 120 can be incorporated into process 230 after the updated model has been generated. This updating of the model of the computing device 120 is indicated as step 240 of method 200, and FIG. 2A shows step 240 as being performed after process 230. However, step 240 can also be performed simultaneously with process 230. Additionally, step 240 can be performed at periodic time intervals after starting process 230. In certain implementations, step 240 can be omitted.

Figure 2E:
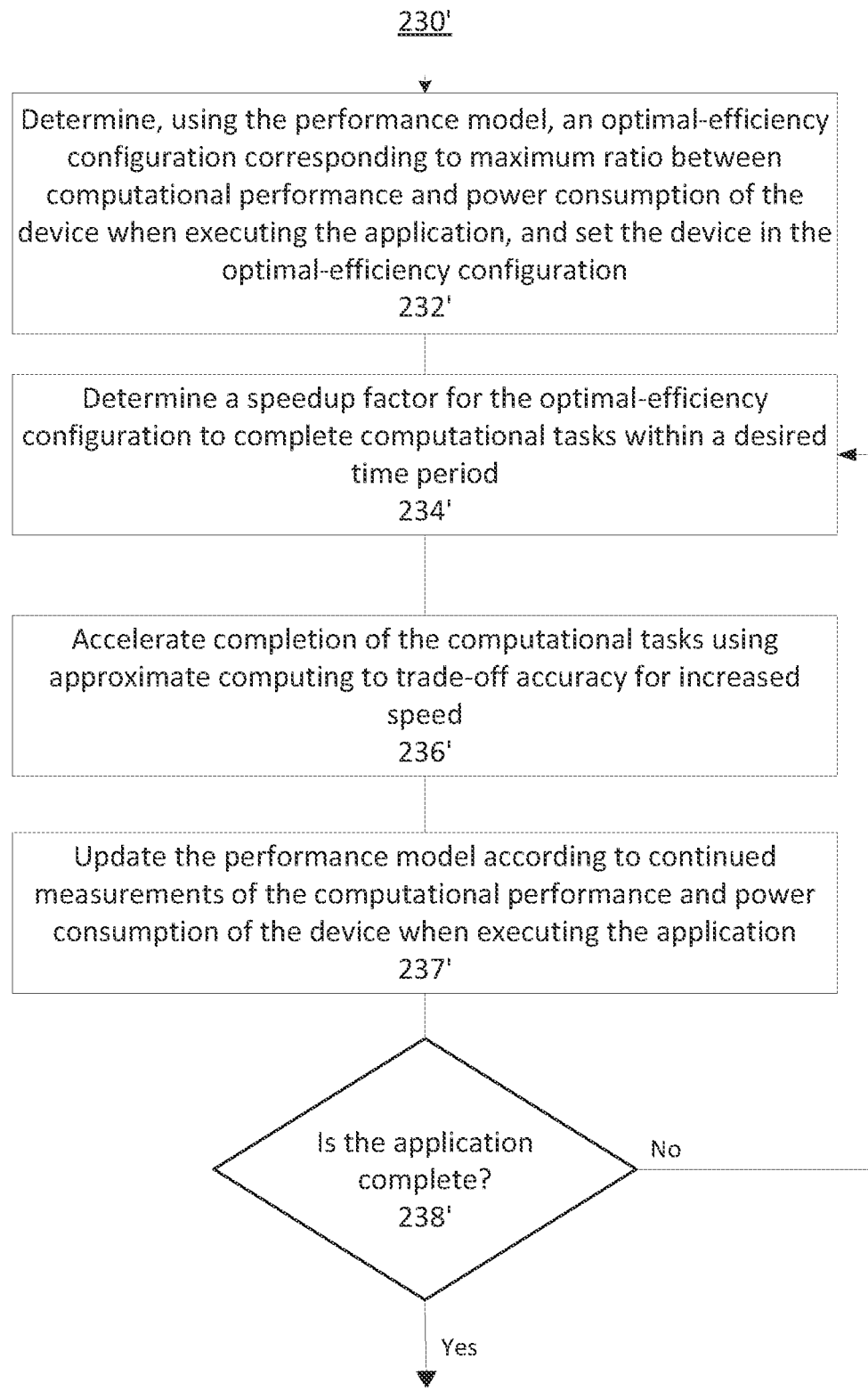
FIG. 2E shows a flow diagram of another example of a control process to control the configuration of the device using the performance model of the device when executing the application, according to one implementation.

FIG. 2E shows a flow diagram of process 230', which is an alternative to process 230. In contrast to process 230, process 230' solves the constrained optimization problem of maximizing computational accuracy and maximizing efficiency while providing guarantees that predefined computational tasks are completed within a predefined time period.

In step 232' of process 230', the performance model is used to determine an optimal-efficiency configuration corresponding to a maximum ratio between computational performance and power consumption of the device when executing the application, and set the device in the optimal-efficiency configuration.

In step 234' of process 230', a speedup factor is determined in order to operate in the optimal-efficiency configuration and also complete predefined computational tasks within a desired time period.

In step 236' of process 230', the completion of the computational tasks are accelerated by the speedup factor by using approximate computing to trade-off accuracy for increased speed.

In step 237' of process 230', the performance model of the computing device 120 is updated according to continued measurements of the computational performance and power consumption of the computing device 120 when executing the application. This updating of the performance model of the computing device 120 can either be performed according to step 240 or step 237' can be performed using another method described later herein.

Now a description of one implementation is provided as an illustrative example. This implementation uses probabilistic graphical models (PGMs) to perform the functions of comparing the small data set to the database and to estimate a performance model of the computing device 120. This illustrative example further presents an example of optimizing the computational configuration according to the predefined optimization criteria of minimizing the energy consumption of the current application subject to an additional performance constraint (e.g., the additional performance constraint can be that the work of the application be accomplished by a predefined deadline).

In this example, the following notation is used. The set of real numbers is denoted by $\mathbb{R}$. $\mathbb{R}^d$ denotes the set of d-dimensional vectors of real numbers; $\mathbb{R}^{d \times n}$ denotes the set of real d×n dimensional matrices. The vectors are denoted by lower-case and matrices with upper-case boldfaced letters. The transpose of a vector x (or matrix) is denoted by $x^T$ or just x'. $\|x\|_2$ is the $\mathcal{L}_2$ norm of vector x, i.e.

$$\text{i.e. } \|x\|_2 = \sqrt{\sum_{i=1}^{d} x^2[i]}.$$

$\|X\|_F$ is the Frobenius norm of matrix X, $$\text{i.e. } \|X\|_F = \sqrt{\sum_{i=1}^{d} \sum_{i=1}^{n} X^2[i][j]}.$$

Let $A \in \mathbb{R}^{d \times d}$ denote a d-dimensional square matrix. tr(A) is the trace of the matrix A and is given as, $$tr(A) = \sum_{i=1}^{d} A[i][j].$$

Further, diag (x) is a d-dimensional diagonal matrix B with the diagonal elements given as, B[i][i]=x[i] and off-diagonal elements being 0.

Now, a review the standard statistical notation used herein is provided below. Let x, y denote any random variables in $\mathbb{R}^d$. The notation x~$\mathcal{D}$ represents that x is drawn from the distribution $\mathcal{D}$. Similarly, the notation x, y~$\mathcal{D}$ represents that x and y are jointly drawn from the distribution $\mathcal{D}$, and finally x|y~$\mathcal{D}$ represents that x is drawn from the distribution after observing (or conditioned on) the random variable y. The following are the operators on x: E [x] expected value of x, var[x]: variance of x, Cov[x, y]: covariance of x and y. x̂ denotes the estimated value for the random variable x.

The energy optimization problem can be formalized by the predefined optimization criteria of minimizing the energy consumed while executing the current application according to predefined constraints. In the example considered here, these predefined constraints include completing the application by a predefined deadline. The computing device 120 can be configurable in various computational configurations, each configuration having application-specific computational performance characteristics and power consumption characteristics. The goal of the optimization is to select the configuration that finishes the work (e.g., completes execution of the application) by the deadline while minimizing the energy consumption.

Formally, this goal can be expressed generally as the computing device 120 accomplishing W work units in time T. The computing device 120 has a set of configurations (e.g., combinations of cores and clock speeds) denoted by $\mathcal{C}$. When each configuration c in the set of configurations $\mathcal{C}$ has an application-specific performance (or work rate) $r_c$ and power consumption $p_c$, then the energy minimization problem can be formulated as a linear program, which is given by $$\min_{t \geq 0} \sum_{c \in C} p_c t_c,$$

$$\text{subject to } \sum_{c \in C} r_c t_c = W, \text{ and}$$

$$\sum_{c \in C} t_c \leq T,$$

wherein $p_c$ is the power consumed when executing the application using the $c^{th}$ configuration; $r_c$ is the performance rate when running on $c^{th}$ configuration; W is the work to be performed by the application; $t_c$ is the time spent executing the application while configured in the $c^{th}$ configuration; and T is the total run time when executing the application. The linear program above finds the times $t_c$ during which the application is executed using the $c^{th}$ configuration so as to minimize the total energy consumption and ensure all work is completed by the deadline. The values $p_c$ and $r_c$ are central to solving this problem, and the values $p_c$ and $r_c$ are obtained from the performance model of the device. When $p_c$ and $r_c$ are known, the structure of this linear program enables the minimal energy schedule to be found using convex optimization techniques, for example.

This formulation is abstract so that it can be applied to many applications and systems. In one embodiment, this abstract formulation can be performed using a Kmeans application using a 16-core Linux x86 server with hyper-threading (allowing up to 32 cores to be allocated) as the computing device 120. The numbers of core counts provided herein are non-limiting examples. The methods described herein can be used with any core counts. Further, other learning techniques can be advantageous choices at different core counts, but the same techniques are applicable. Moreover, the configurable parameter need not be cores, but any allocatable resource.

The Kmeans application is a clustering algorithm used to analyze large data sets. The Kmeans application can be run with different performance demands and can be optimized in order to minimize energy for any given performance demand. To do so for Kmeans on the 32-core system, the performance and consumption is estimated as a function of the number of cores allocated to the application. Given this information, the most energy efficient number of cores can be selected according to the given performance demand.

For the Kmeans application the workload is the number of samples to cluster. The deadline T is the time by which the clustering is to be completed. The configurations represent assigning to the Kmeans application different resources. For example, the assigning of resources could be restricted to determining the number of cores assigned to execute the Kmeans application. Alternatively, the assigning of resources can include the assignment of cores, clock speed, memory controllers, and hyperthreads, depending on which characteristics of the computing device 120 are configurable. For the Kmeans application, each assignment of resources can result in a different rate of computation (points clustered per time) and power consumption. The computational rate can be defined in terms of the time required to execute a computational unit. The computational rate (or computational performance) is not necessarily defined in terms of the number of floating point operations performed, but can be defined in terms of computational tasks more closely tied to the goal of the application. For the Kmeans application the clustering of a predefined number of points is a logical computational unit. Other applications such as video playback, sorting, searching, etc. can also be subdivided into small computational task or computational units, and these computational units/tasks can form the basis of determining the computational rate (performance).

In addition to the consumption and performance depending on the current application dependent, the consumption and performance can also depend on the specific inputs used in the current application. For example, for the same configuration of the computing device 120, the Kmeans application can require more or less time to cluster the same number of points depending on the set of points. This variability arising from the inputs to a given application somewhat limits the predictive power of even the most accurate model. However, the variability due to the specific inputs can be small and can average out as the sample size becomes larger, making the variability due to input of secondary importance when the sample size of application input is large (e.g., clustering a large number of points in the Kmeans application). On the other hand, the relative differences among applications are of primary importance. For any new application the consumption-performance trade-offs will be unknown because a model of the consumption and performance has not yet been determined for all available configurations of the computing device 120. One way to gather the missing information would be execute the new application on each configuration in a brute force manner. However, as discussed earlier, there can be a very large number of configurations and the brute force approach might not be manageable. Alternatively, the application can be executed using a small subset of configurations and these measurements can be used to estimate the behavior of unmeasured configurations. Additionally, the data from other applications from the computing device 120 and/or other computing devices can also be used to estimate a performance model of the computing device 120 (e.g., a database, which has been collected offline).

Next, the size of the data set used with the database to determine the estimate of the performance model of the computing device 120 is considered. The phrase "performance model" refers to a complete table of power consumption and computational performance for all relevant computational configurations of the computing device 120. One simple method, the averaging method, of estimating a performance model of the computing device when it is executing the current application is to simply take a mean of $p_c$ (similarly for $r_c$) across all the applications. This averaging method can work well if the current application follows a general trend exhibited by all prior applications. This averaging method corresponds to the offline methods discussed above.

Another method, the regression method, of estimating can also be applied to estimating a performance model for the current application. In the regression method, consumption and performance data of the computing device 120 when executing the current application is obtained for a small subset of configurations (i.e., the small data set) Then, a multivariate polynomial regression can be performed on the small data set for the configuration parameters versus $p_c$ (or $r_c$) to predict consumption (or performance) in all other configurations. This regression method might not work well if there are local minima or maxima that are not captured by a small sample size of the small data set. This regression method corresponds to the online methods discussed above.

A better method is to compare the small data set with the database of other applications and devices to determine those combinations of applications and devices that are similar to the computing device 120 when executing the current application. Then use these similar combinations of applications and devices to estimate a performance model of the computing device 120 when executing the current application. The Probabilistic Graphical Model (PGM) method is one example of a method of estimating the performance model by comparing a small data set to a database.

Figure 4A:
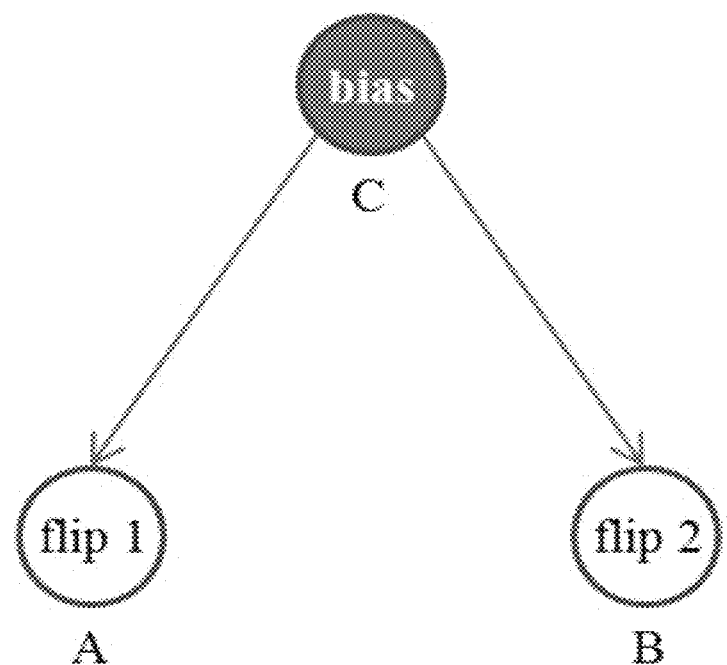
FIG. 4A shows a schematic diagram of an example of a simple directed graph with nodes A and B depending from an observed node C.
Figure 4B:
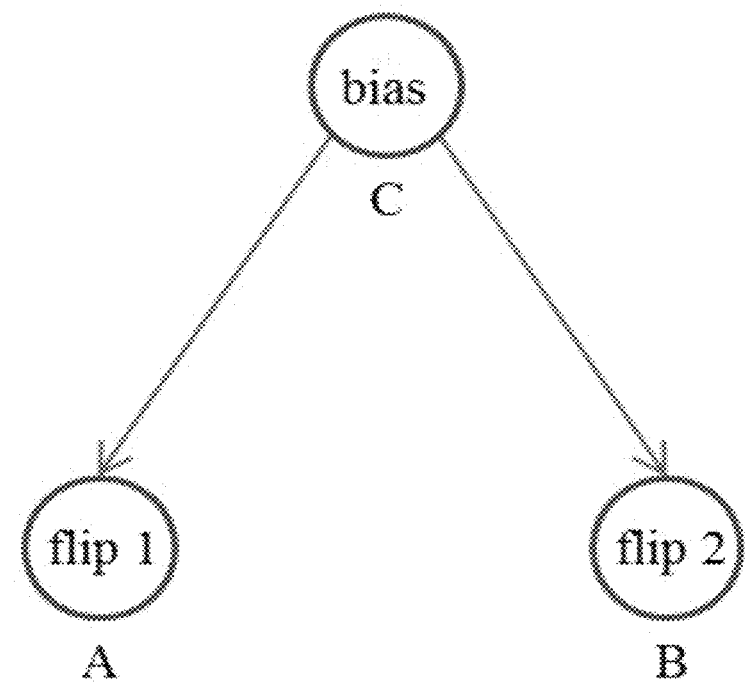
FIG. 4B shows a schematic diagram of an example of a simple directed graph with nodes A and B depending from an unobserved node C.

The PGM method can best be understood in the context of directed graphical models. Directed graphical models (or Bayesian networks) are a type of graphical model capturing dependence between random variables. Each node in these models denotes a random variable and the edges denote a conditional dependence among the connecting nodes. The nodes which have no edges connecting them are conditionally independent. By convention, shaded nodes denote an observed variable (i.e., a node whose value is known), whereas an unshaded node denotes an unobserved variable. FIGS. 4A and 4B show examples of directed graphical models. For example, in FIGS. 4A and 4B, nodes A and B can represent flips of a coin, and node C can represent the bias of the coin. In FIG. 4A, node A and node B (i.e., random variables A and B) are dependent on node C. In FIG. 4B, node C corresponds to an unobserved variable; therefore nodes A and B are not statistically independent because the bias is not observed. However, in FIGS. 4A, A and B are statistically independent because the bias is observed.

The dependence structure in Bayesian networks can be better understood by exploring the coin flipping example with a biased coin. Suppose A represents the outcome of the first coin flip, B represents that of the second coin flip and C represents the coin's bias. Suppose, the bias is P(Heads)= 0.7 and that this bias is known. Then both the flips are independent, irrespective of the first flip the second flip gives heads with probability 0.7. If the bias is unknown, however, then the value of B is conditionally dependent on A. Thus, knowing that A="Heads" increases belief that the bias is towards "Heads"—that C>0.5. Therefore, the probability that the second coin flip gives "Heads" (i.e., B="Heads") increases.

The PGM method exploits this conditional dependence in the presence of hidden, or unobserved, random variables. The PGM method estimates a model of the computational performance and power consumption of every system configuration as a random variable drawn from a Gaussian probability distribution with unknown mean and standard deviation. Therefore, previously observed applications in the database will condition estimates by the PGM method of the performance and consumption for new, unobserved applications.

Hierarchical Bayesian models, which are used in the PGM method, are slightly more complex than the Bayesian networks discussed above, usually with more than one layer of hidden nodes representing unobserved variables. The PGM method utilizes these hidden nodes to improve its estimates for a new application using prior observations from other applications. Knowing the performance-characteristics of one application can help in producing better predictors for other applications. Put in the context of the coin flip example above, learning about one biased coin flip conveys information about another coin flip. Similarly, learning about previous applications provides information about the Kmeans application, for example. The PGM method utilizes this conditional dependence in the problem of estimating computational performance and power consumption for a current application using data from previous applications.

Figure 5:
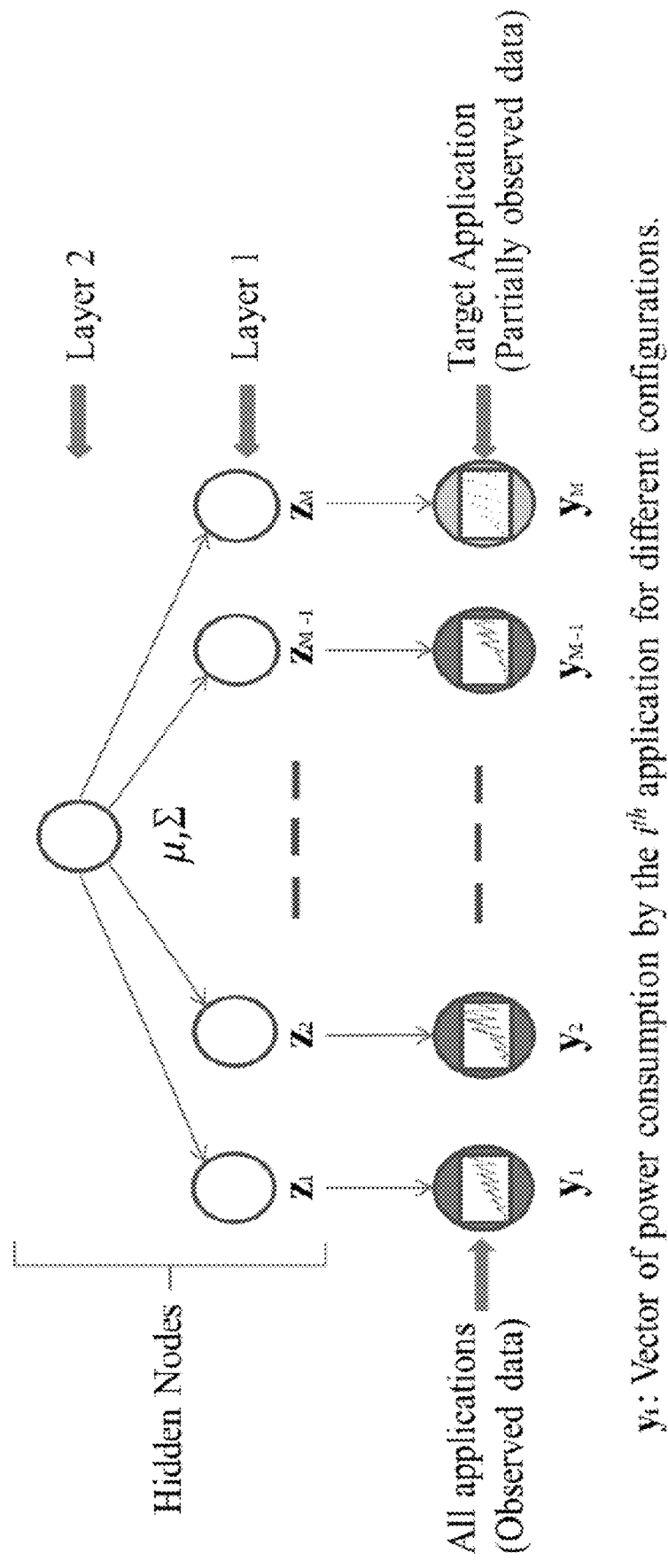
FIG. 5 shows a schematic diagram of a hierarchical Bayesian model (HBM), according to one implementation.

FIG. 5 shows a schematic diagram of a hierarchical Bayesian model that can be used for the PGM method. In FIG. 5, there are $n=|\mathcal{C}|$ configurations of the computing device 120. The target application (i.e., the current application) corresponding to subscript M is the new or unknown application for which a performance model is desired. For this target application a performance model is desired in order to minimize the energy consumed subject to a predefined constraint (e.g., completing the target application by the predefined deadline), as discussed above.

Additionally, the data of the database is indicated by the set of M-1 applications (subscripts 1 through M-1) whose performance and power are known (e.g., database values that have been measured offline). Each subscript corresponds to one combination of a device and an application. If the database includes measurements from only a single computing device (e.g., the computing device 120), then the combinations of devices and applications will correspond to a combination of the single device with different applications. The variable y is a placeholder for either p (power consumption) or r (computational performance).

Here the process of estimating the consumption as a function of configuration is discussed for the PGM method. A parallel/identical process can also used for estimating the computational performance. Further, the example described herein is for the case of a single device (i.e., the computing device 120) executing all of the applications 1 through M.

Let the vector $y_i \in \mathbb{R}^n$ represent the power consumption estimate of application i in all n configurations of the computing device 120 (e.g., the $c^{th}$ component of $y_i$ is the power for application i in configuration c (or $y_i[c]=p_c$)). Also, let $\{y_i\}_{i=1}^M$ be the shorthand for the power estimates for all applications. Without loss of generality, the first M-1 columns (i.e., $\{y_i\}_{i=1}^{M-1}$) represent the data for those applications whose power consumption is known (e.g., this data can be collected offline). The $M^{th}$ column, $y_M$ represents the power consumption for the new, unknown application. Only a small number of observations are obtained for this application. Specifically, for the $M^{th}$ application, the observed configurations belonging to the set $\Omega_M$ where $\Omega_M \ll n$ (i.e., there are only a very small number of observations for this application). The objective is to estimate the power consumption for the $M^{th}$ application for all computational configurations that have not been observed (i.e., are not in the set $\Omega_M$).

The hierarchical Bayesian model, shown in FIG. 5, is described in terms of statistical equations $$y_i|z_i \sim N(z_i, \sigma^2 I),$$

$$z_i|\mu,\Sigma \sim N(\mu,\Sigma),$$

$$\mu,\Sigma \sim N(\mu_0,\Sigma/\pi)IW(\Sigma|\nu,\Psi),$$

wherein $y_i \in \mathbb{R}^n$; $z_i \in \mathbb{R}^n$; $\mu_i \in \mathbb{R}^n$; and $\Sigma \in \mathbb{R}^{n \times n}$. These equations describe that the power (denoted by $y_i$) for each $i^{th}$ application is drawn from a multivariate-Gaussian distribution with mean $z_i$ and a diagonal covariance matrix $\sigma^2 I$. Similarly, $z_i$ is from a multivariate-Gaussian distribution with mean $\mu$ and covariance $\Sigma$. Further, $\mu$ and $\Sigma$ are jointly drawn from a normal-inverse-Wishart distribution with parameters $\mu_0$, $\pi$, $\Psi$, and $\nu$. The parameters for this model are $\mu$ and $\Sigma$ whereas, $\mu_0$, $\pi$, $\Psi$, and $\nu$ are the hyperparameters, which are set as $\mu_0=0$, $\pi=1$, $\Psi=I$, and $\nu=1$.

The first layer in the model as shown in FIG. 5 is the filtration layer and accounts for the measurement error for each application. Interestingly, even if there is only a single measurement of each configuration for each application, this layer plays a crucial role as it creates a shrinkage effect. The shrinkage effect penalizes large variations in the application and essentially helps in reducing the risk of the model for shrinkage effect and for shrinkage in hierarchical models. The second layer on the other hand binds the variable $z_i$ for each application and enforces that they are drawn from the same distribution with unknown mean and covariance. The normal-inverse-Wishart distribution is the hyper prior on $\mu$ and $\Sigma$ because this distribution is the conjugate prior for a multivariate Gaussian distribution.

Figure 6:
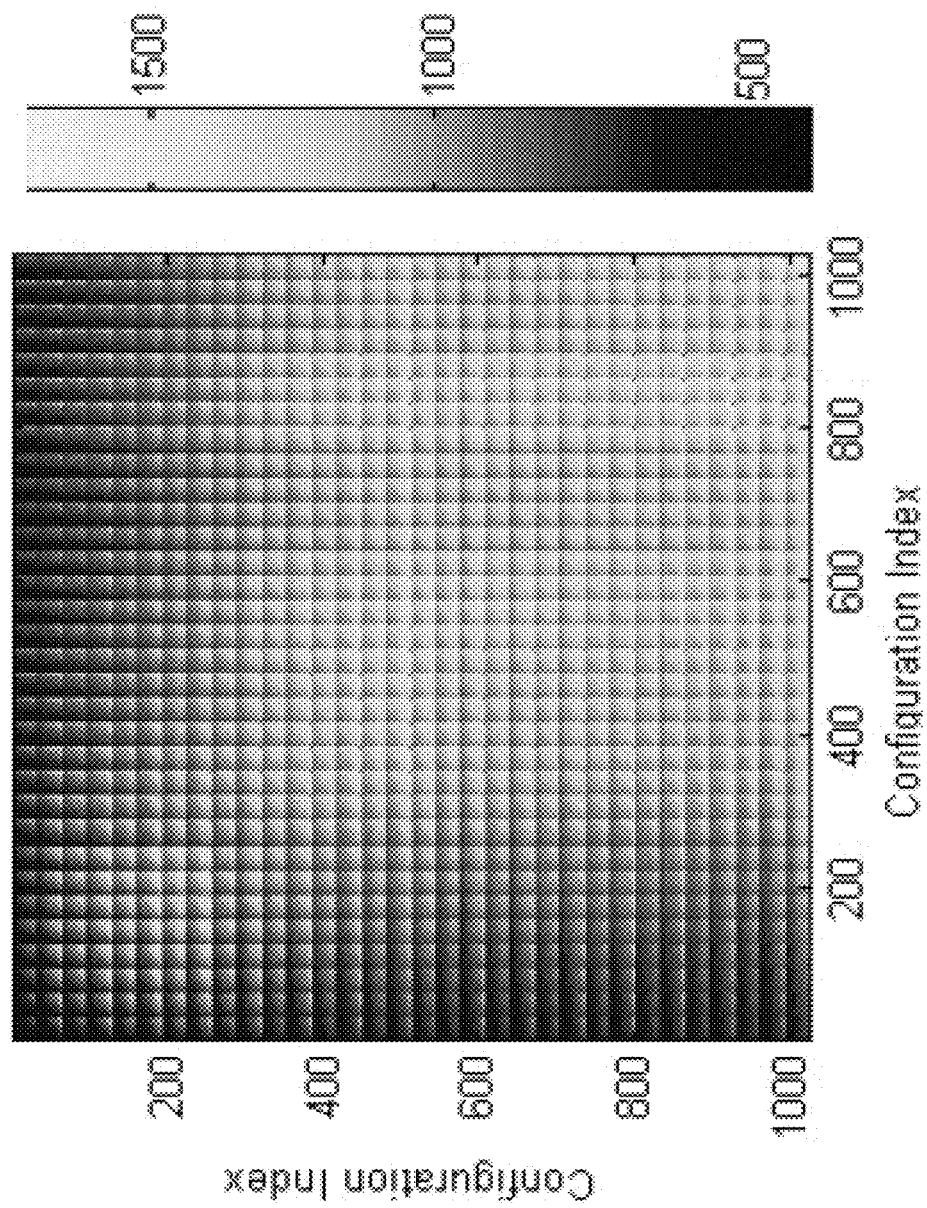
FIG. 6 shows an example of a plot of correlations among computational configurations.

If the mean $\mu$, the covariance $\Sigma$, and the noise $\sigma$ are known, then $y_i$ are conditionally independent given these parameters. However, since the mean $\mu$, the covariance $\Sigma$, and the noise $\sigma$ are unknown a dependence is introduced amongst all the $y_i$'s. This is a similar situation to the coin flipping example discussed above, in which the value of one coin flip influences our prediction about the other coin flip. $\Sigma$ captures the correlation between different configurations as shown in FIG. 6.

The variable $\theta=\{\mu, \Sigma, \sigma\}$ can be used to denote the unknown parameters $\mu$, $\Sigma$, and $\sigma$ in the model. $y_M$ is Gaussian given $\theta$. Thus, the estimation problem simplifies to estimating $\theta$. A maximum-likelihood estimator can be used to determine the set of values of the model parameters that maximizes the likelihood function (or the probability function of the observed outcomes given the configuration parameters). Thus, the maximum-likelihood estimates of configuration parameters are those values which most closely agree with the database.

For example, if $\varphi(y)$ is the set of the observations in vector y, then finding the maximum likelihood estimate of the parameter $\theta$ can be achieved by maximizing the probability of $y_M$ conditioned on $\varphi(y_i)_{i=1}^M$ and then using the expectation of $y_M$ given and $\theta$ as the estimator for $y_M$. Due to the presence of latent variables (layer 1 and layer 2 in FIG. 5), there is not a closed form solution for $\Pr(y_M|\{\varphi(y_i)\}_{i=1}^M, \theta)$. However, an iterative method, such as the Expectation- Maximization algorithm discussed next can be used to obtain a solution for $\Pr(y_M | \{\varphi(y_i)\}_{i=1}^M, \theta)$.

The Expectation-Maximization (EM) algorithm can be used to optimize over analytically intractable problems. The EM algorithm switches between two steps: an expectation step (E step) and a maximization step (M step) until convergence. During the E step, a function for the expectation of the log of the likelihood is found using the current estimate for the parameters. In the M step, the configuration parameters are computed to maximize the expected log-likelihood found in the E step. Then, in the next E step, these estimates of the configuration parameters are used to determine a distribution of the latent variables, as discussed in Kai Yu, Volker Tresp, and Anton Schwaighofer. "Learning gaussian processes from multiple tasks," Proceedings of the 22nd International Conference on Machine Learning, pages 1012-1019, ACM, (2005), incorporated herein by reference in its entirety.

As described earlier, $\Omega_i$ is the set of observed indices for the $i^{th}$ application. Let L denote the indicator matrix with $L(i, j)=1$ if $j \in \Omega_i$ and 0 otherwise. Stated differently, $L(i, j)=1$ if the $i^{th}$ application is observed in the $j^{th}$ configuration. $L_i$ is used as shorthand for $L(:, i)$. The expectation and covariance for $z_i$ given $\theta$ are given by $$\text{Cov}(z_i) = \left(\frac{\text{diag}(L_i)}{\sigma^2} + \sum\nolimits^{-1}\right)^{-1} \text{ and}$$

$$E(z_i) = \hat{C}_i\left(\frac{\text{diag}(L_i)y_i}{\sigma^2} + \sum\nolimits^{-1}\mu\right).$$

These two equations are the E step. $\hat{C}_i$ is shorthand for $\text{Cov}(z_i)$ and $\hat{z}_i$ denotes $E(z_i)$. Next, the log-likelihood is maximized with respect to $\theta$ and taking the derivative with respect to $\Sigma$, $\sigma$, and $\mu$ and setting the derivatives to 0 gives, $$\mu = \frac{1}{M+\pi}\sum_{i=1}^M \hat{z}_i,$$

$$\sum = \frac{1}{M+1}\left(\sum_{i=1}^M \hat{C}_i + (\hat{z}_i - \mu)(\hat{z}_i - \mu)'\right) + \pi\mu\mu' + I, \text{ and}$$

$$\sigma^2 = \frac{1}{\|L\|_F^2}\sum_{i=1}^M tr\left(\text{diag}(L_i)(\hat{C}_{i'} + (\hat{z}_i - y_i)(\hat{z}_i - y_i)')\right).$$

These three equations are the M step.

The PGM method iterates between the E step and the M step until convergence to obtain the estimated parameters $\theta$. Then, conditioned on those values of the parameters, the PGM method sets $y_M$ as $E(z_M|\theta)$ given by the above equations. The PGM method uses the same algorithm to estimate computational performance as well. After both the computational performance and the power consumption have been estimated for all configurations of the computing device 120 when executing the current application, then process 220 is complete and method 200 proceeds to step 230, in which the performance model estimated in process 220 is applied to determine the optimal configuration according to the predefined efficiency criteria.

Given computational performance and power consumption estimates, the energy minimization problem can be solved using convex optimization techniques. For example, process 230 can be performed by using the performance model to find the set of configurations that represent Pareto-optimal performance and consumption tradeoffs. Then an iterative method can be used to walk along the convex hull of this optimal tradeoff space until the performance goal is reached.

In one example, method 200 using the PGM method can be applied to executing the Kmeans application using a computing device 120 that is the 16-core Linux x86 server with hyperthreading, discussed above. In this example, there are 32 configurations (hence n=32). Further, the example includes 24 other applications not including the current (target) application (hence M=25). For these 24 other applications, data has been collected for all possible configurations of the 16-core Linux x86 server. The data of these other applications and configurations is denoted by $\{y_i\}_{i=1}^{M-1}$; $y_M$ denotes the power consumption data for Kmeans.

The core counts, hyperthreading, OS, and processor model described above are provided as non-limiting examples, and the methods described herein are not dependent upon these particular examples. Furthermore, the number of other applications used by the PGM method (or other learning technique used in another implementation) can vary. The specific learning technique in this example can produce better results when there are a greater number of other applications. Different learning techniques may produce better results for lower numbers of applications. It can be noted that, in certain implementations, the general approach of combining learning and control can work with fewer other applications, by simply applying a different specific learning technique to build the model that is passed pass to the controller. The application of the methods described herein in which the number of other applications is zero is denoted as the "online" method.

Referring to FIG. 5, the Kmeans application is the final node, labeled "Target Application," whereas the rest of the applications would be the remaining nodes in any order. The PGM method estimates $z_M$, the node above $y_M$ in FIG. 5, which is an unbiased estimator for $y_M$. The PGM method collects data for six different configurations (5, 10, . . . 30 cores). Hence, $\Omega_M = \{5, 10, \ldots 30\}$ and $y_M[j]$ is known if and only if $j \in \Omega_M$. Also, $L_i$ or $L(:,i)$ is an all one vector of length n if $i \neq M$ and $L(j,i)=1$ if $j \in \Omega_M$ and $L(j,i)=0$ otherwise.

In this example, the method 200 starts by initializing the parameter $\theta = (\mu, \Sigma, \sigma)$. Next the E-step equations are evaluated for each value of i to calculate the values of $\hat{z}_i$ and $\hat{C}_i$. Next the values of $\hat{z}_i$ are used to evaluate equations of the M-step. Then the results from the M-step are used as inputs to the E-step, and so forth until convergence. When the iteration between the E-step and M-step have converged, process 220 is complete.

Next method 200 proceeds to process 230, in which the estimate for $\hat{z}_M$ from process 220 is used as the performance model of the computing device 200 (i.e., $p_c = \hat{z}_M[c], \forall c \in \mathcal{C}$). Similarly, the PGM method is used to estimates the performance $r_c$. Using these estimate for $r_c$ and $p_p$ as the performance model in process 230 to determine the optimal configuration of the computing device 120 when executing the Kmeans application.

The PGM method does not assume any parametric function to describe how the power varies along the underlying configuration parameters, such as the number of cores, the memory controllers, and clockspeed. Thus, the PGM method is flexible and robust enough to adapt to and represent a much wider variety of applications than a method relying on prior assumption of how the computing configurations influence consumption and performance of the computing device. This absence of prior assumptions can also result in using greater computational resources to perform the method, increasing the value of performing the PGM method on a server with extensive power resources rather than on a mobile computing device with a limited battery. These greater computational resources are used to calculate the covariance matrix shown in FIG. 6 and to exploit the relationships expressed by the covariance matric to estimate, which can be computationally demanding tasks.

In addition to the PGM method, other methods can be used which assume that consumption and performance are convex functions of the computational configuration parameters. These other methods can use algorithms, such as the gradient descent method, to find the device model and the optimal computational configuration. In contrast to these other methods, the PGM method is robust to the existence local minima and maxima in the function mapping the computational configurations on to the power consumption and the function mapping the computational configurations on to the computational performance.

To illustrate the benefits of the method 200, method 200 is compared to three other method: the heuristic of race-to-idle method, an offline learning method, and an online learning method. The race-to-idle method simply allocates all resources (cores, clockspeed, etc.) to the Kmeans application and then idles the computing device 120 once the Kmeans application is complete. The offline methods builds a statistical model of performance and consumption for each configuration based on prior measurements of other applications. The online method approach uses polynomial regression to estimate the tradeoffs between performance and consumption for each configuration while the Kmeans application is being executed by the computing device 120.

Each of these three methods has their respective limitations. For example, the heuristic approach simply assumes that the most energy efficient configuration is when all the system resources are in use.

The offline approach uses the average behavior from the previously measured applications as the model for the Kmeans application, but this may be a poor model if the previous applications are dissimilar to the Kmeans application.

Using a large number of measurements, the online method can produce a reasonable model, but acquiring a large number of measurements might not be feasible.

Method 200 combines the best features of both the offline and online approaches. At runtime, method 200 changes core allocation (e.g., using process affinity masks), observes the consumption and performance as a function of the various core allocations, and combines this data with data from previously observed applications (i.e., a database) to obtain a most probable estimate for the consumption and performance for the unobserved configurations of the computing device 120.

Figure 7:
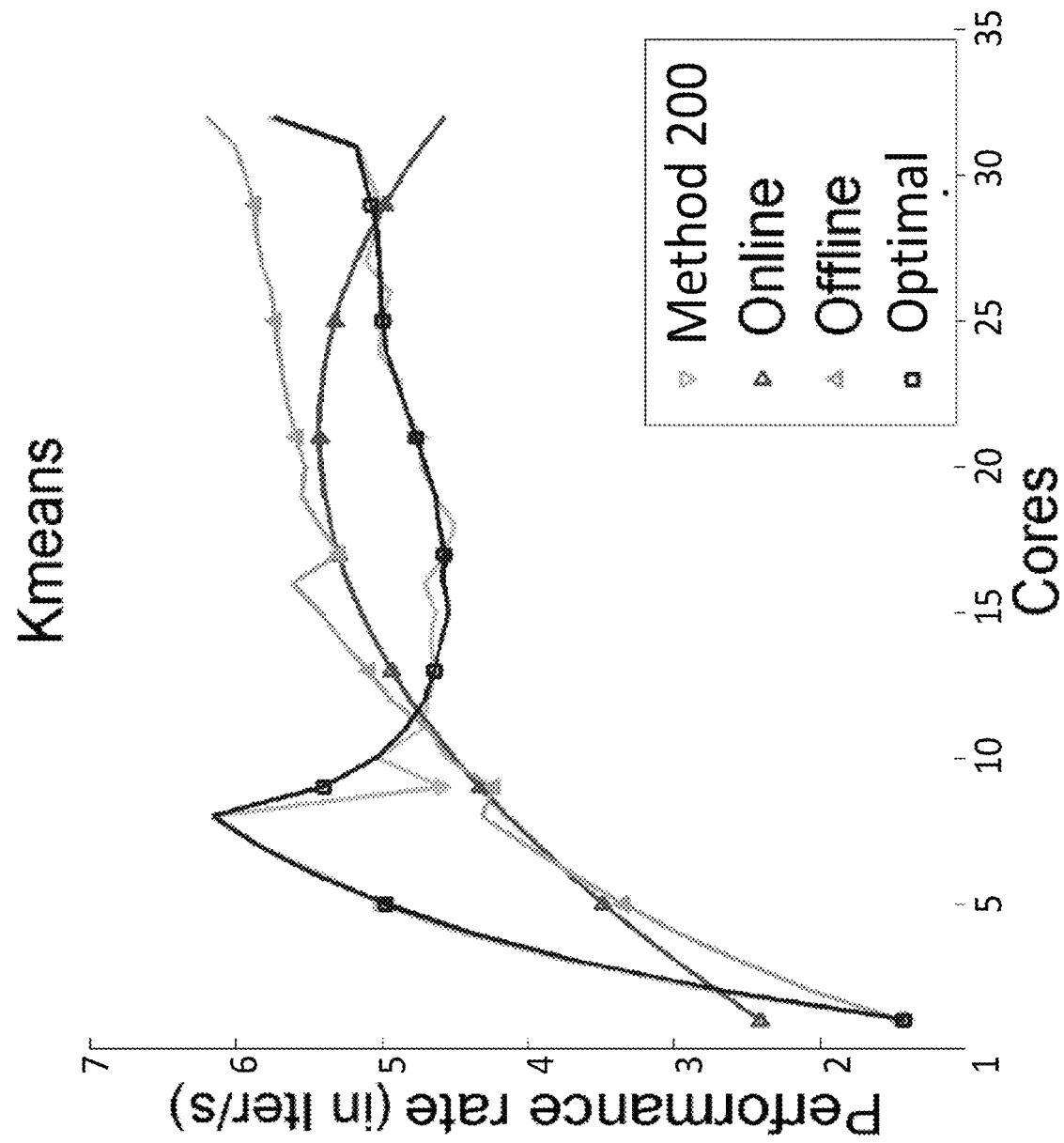
FIG. 7 shows an example of a plot of performance estimates for configuration-optimization methods as a function of the number of cores according to one implementation.
Figure 8:
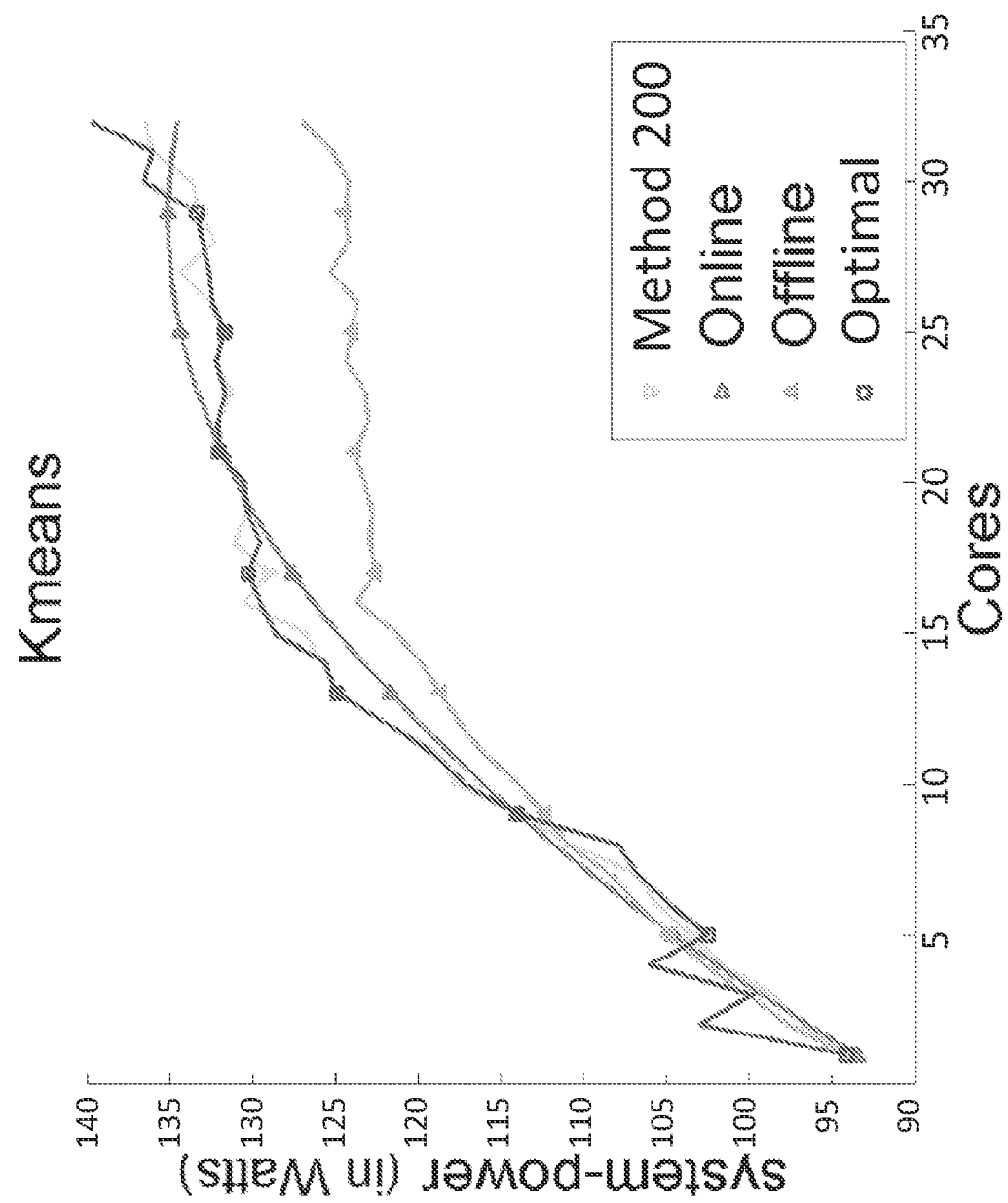
FIG. 8 shows an example of a plot of estimates of power consumption for the respective configuration-optimization methods as a function of the number of cores, according to one implementation.
Figure 9:
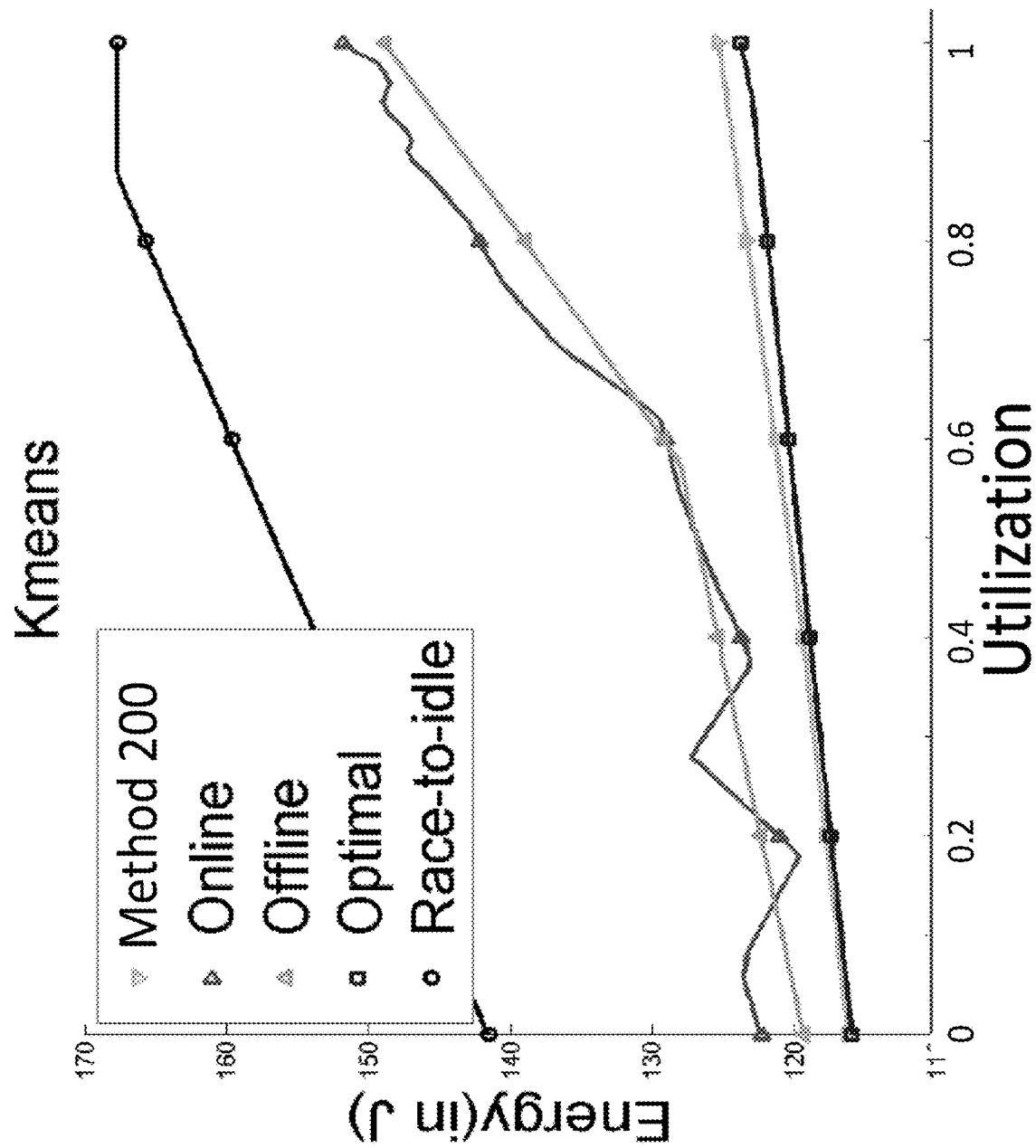
FIG. 9 shows an example of a plot of the energy of the minimal energy configuration for various system utilizations, according to one implementation.

FIGS. 7 and 8 show comparisons of method 200 relative to the optimal values (i.e., brute force method), the offline method, and the online method. FIG. 9 shows a comparison of method 200 relative to the race-to-idle method, optimal values (i.e., brute force method), the offline method, and the online method. FIG. 7 shows performance estimates for each method as a function of the number of cores. Similarly, FIG. 8 shows estimates of power consumption for each method as a function of the number of cores.

These runtime estimates are then used to determine the minimal energy configuration for various system utilizations, which are shown in FIG. 9. In certain implementations, the utilization can be measured by the ratio between the time in which the computational task can be performed when working at maximum capacity (e.g., the configuration using all resources to their full capacities) and the time provided for performing the computational task. For example, if working at maximum capacity the device 120 can achieve the task in one second, but two seconds are allotted to perform the task, then the utilization would be 0.5. In this non-limiting example, tests are performed across a full range of utilization. In another implementation, the utilization can be varied by maintaining the time constant while varying the amount of computational work. In this implementation, the denominator of the ratio is the amount of work that can be performed in the allotted time when working at maximum capacity, and the numerator of the ratio is the amount of computational work actually required within the allotted time.

FIG. 9 shows the energy consumption data where higher utilizations mean more demanding performance requirements. As can be seen in FIGS. 7 and 8, method 200 is the only estimation method that captures the true behavior of the application and this results in significant energy savings across the full range of utilizations.

Learning the performance for Kmeans application is computationally challenging because the application scales well to 8 cores, but its performance degrades sharply when more cores are applied. The illustrative numbers provided in this non-limiting example can be generalized, as would be understood by a person of ordinary skill in the art, to an arbitrarily large number of cores. As the number of cores increases, other learning algorithms might be faster. Therefore, finding the peak using only 6 uniformly distributed values (5, 10, . . . , 30 cores) without exploring every possible number of cores is quite challenging. The offline learning method predicts the highest performance at 32 cores because that is the general trend over all applications. The online method predicts peak performance at 24 cores, so it benefits by learning that performance degrades at the highest number of processors, but the online method fails to discover the actual peak. The online method requires many more samples to correctly find the peak. In contrast, method 200 leverages prior knowledge of an application whose performance peaks with 8 cores. Because method 200 has previously encountered an application with similar behavior, method 200 is able to quickly realize that the Kmeans application follows a similar pattern and method 200 produces accurate estimates with just a small number of observations. Generally, the methods described herein can work with any number of observations. It can be observed that the HBM seems to advantageously provide good accuracy, especially with only a small number of observations, but other learning approaches can be used.

Now simulations are described. The simulations provide an evaluation of method 200's performance and power estimates, and also of method 200's ability to use those estimates to minimize energy across a range of performance requirements. First, the experimental setup of the simulation is described and benchmark approaches are also described and compared to method 200. Further, method 200's accuracy is discussed for performance and power estimates. Then it is demonstrated that method 200 provides near optimal energy savings using these estimates. Also discussed is how method 200 performs with respect to different sample sizes and a measurement of method 200's overhead.

The test platform for the simulation is a dual-socket Linux 3.2.0 system with a SuperMICRO X9DRL-iF motherboard and two Intel Xeon E5-2690 processors.

This is a non-limiting example. For example, the methods described herein are not contingent on the parameters of the test platform. The methods described herein are general, and can be applied to any number of platforms with different numbers and types of configurable resources. The cpufrequtils package is used to set the processor's clock speed. The processors have eight cores, fifteen DVFS settings (from 1.2 to 2.9 \GHz), hyperthreading, and TurboBoost. In addition, each chip has its own memory controller, and the numactl library is used to control access to memory controllers. In total, the system supports 1024 user-accessible configurations, each with its own power/performance tradeoffs (e.g., 16 cores, two hyperthreads, two memory controllers, and 16 speed settings (15 DVFS settings plus TurboBoost)). According to Intel's documentation, the thermal design power for these processors is 135 Watts. The system is connected to a WattsUp meter which provides total system power measurements at one second intervals. In addition, Intel's RAPL power monitor is used to measure chip power for both sockets at finer-grain intervals. The simulations use 25 benchmarks from three different suites, including: PARSEC (which includes blackscholes, bodytrack, fluidanimate, swaptions, x264); Minebench (which includes ScalParC, apr, semphy, svmrfe, Kmeans, HOP, PSA, and Kmeansnf); and Rodinia (which includes cfd, nn, lud, particlefilter, vips, btree, streamcluster), backprop, and bfs).

In certain implementations, the use of more applications can be used to improve the results. The applications used represent a broad set of different computations with different requirements and demonstrate generality. The simulation also uses a partial differential equation solve jacobi), a file intensive benchmark (filebound), and a search web-server (swish++) These benchmarks provide means for testing a range of types of important multicore applications with various compute-intensive and i/o-intensive workloads. All the applications run with up to 32 threads (the maximum supported in hardware on the test machine). This is a non-limiting example, any number of threads can be used. In addition, all workloads are long running, taking at least 10 seconds to complete. To produce measurable behavior, the configurable system is operated for a sufficiently long time. What constitutes a sufficiently long time can be application and system dependent. For example, a sufficiently long time could be much shorter than 10 s. For example, the GRAPE implementation described below can operate on the microsecond scale. Similarly if the operation time is longer, then the system has more than enough time to learn. This duration gives sufficient time to measure system behavior. Alt applications are instrumented with the Application Heartbeats library which provides application specific performance feedback to method 200. Thus, method 200 is ensured of optimizing the performance that matters to the application being evaluated. All performance results are then estimated and measured in terms of heartbeats per second. When the Kmeans application is used to demonstrate method 200, the heartbeats per second metric represents the samples clustered per second.

To evaluate method 200 quantitatively, the accuracy of the predicted performance and power values ŷ is measured with respect to the true data y as, $$\text{accuracy}(\hat{y}, y) = \max\left(1 - \frac{\|\hat{y} - y\|_2^2}{\|y - \bar{y}\|_2^2}, 0\right).$$

Now, method 200 is evaluated by comparing method 200 with four baselines approaches: the race-to-idle approach, the online approach, the offline approach, and the exhaustive search approach. The race-to-idle approach allocates all resources to the application and once it is finished the system goes to idle. This strategy incurs almost no runtime overhead, but may be suboptimal in terms of energy, since maximum resource allocation is not always the best solution to the energy minimization equation. The online approach carries out polynomial multivariate regression on the observed dataset using configuration values (the number of cores, memory control and speed-settings) as predictors, and estimates the rest of the data-points based the same model. Then it solves a linear program of the energy minimization problem provided in the foregoing. This method uses only the observations and not the prior data. The offline approach takes the mean over the rest of the applications to estimate the power and performance of the given application and uses these predictions to solve for minimal energy. This strategy only uses prior information and does not update based on runtime observations. The exhaustive search approach searches every possible configuration to determine the true performance, power, and optimal energy for all applications.

Figure 12A:
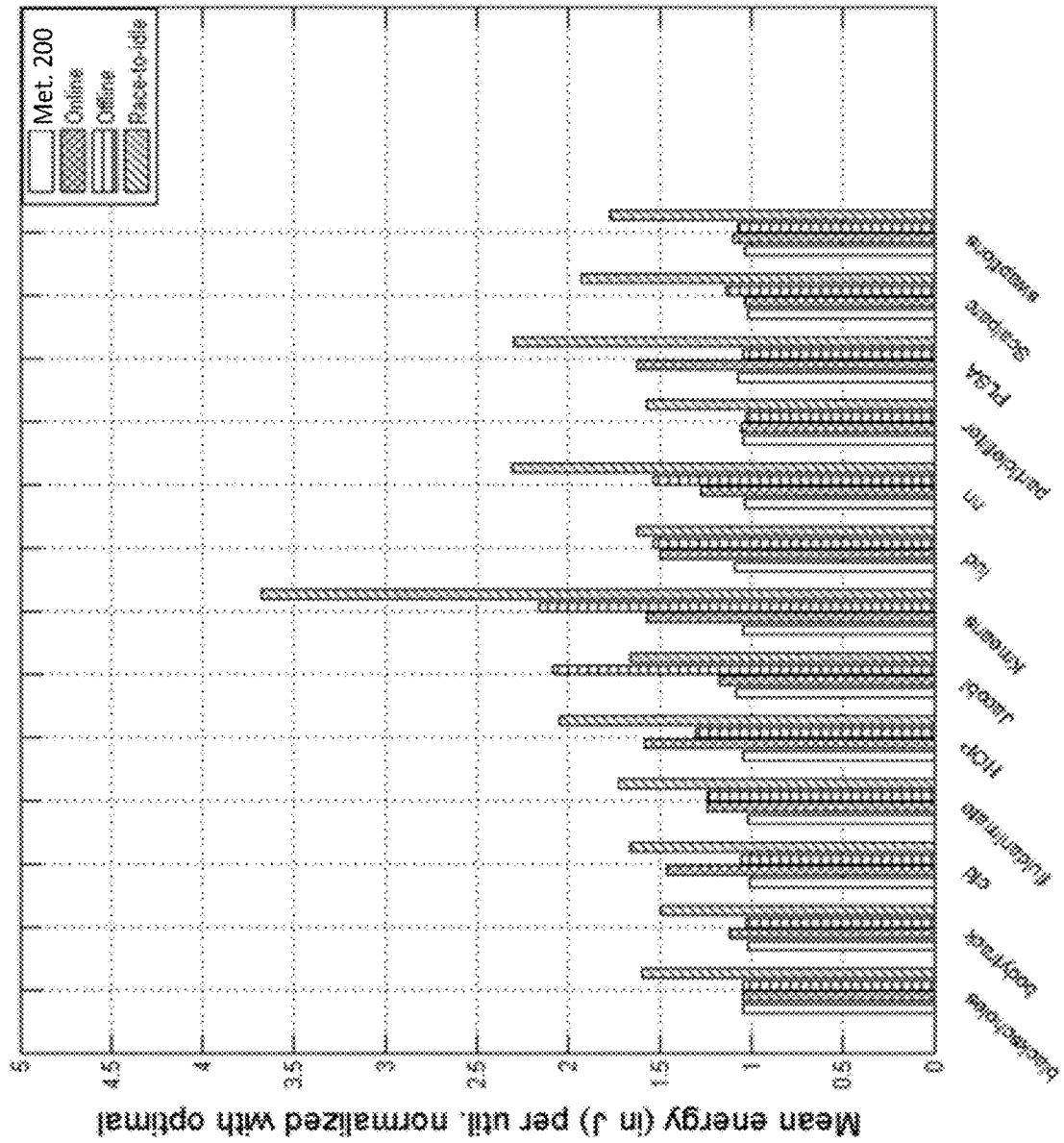
FIG. 12A shows a bar plot comparing the mean energy of optimal configurations determined according to four different optimization techniques for 13 different benchmark applications, according to one implementation.
Figure 12B:
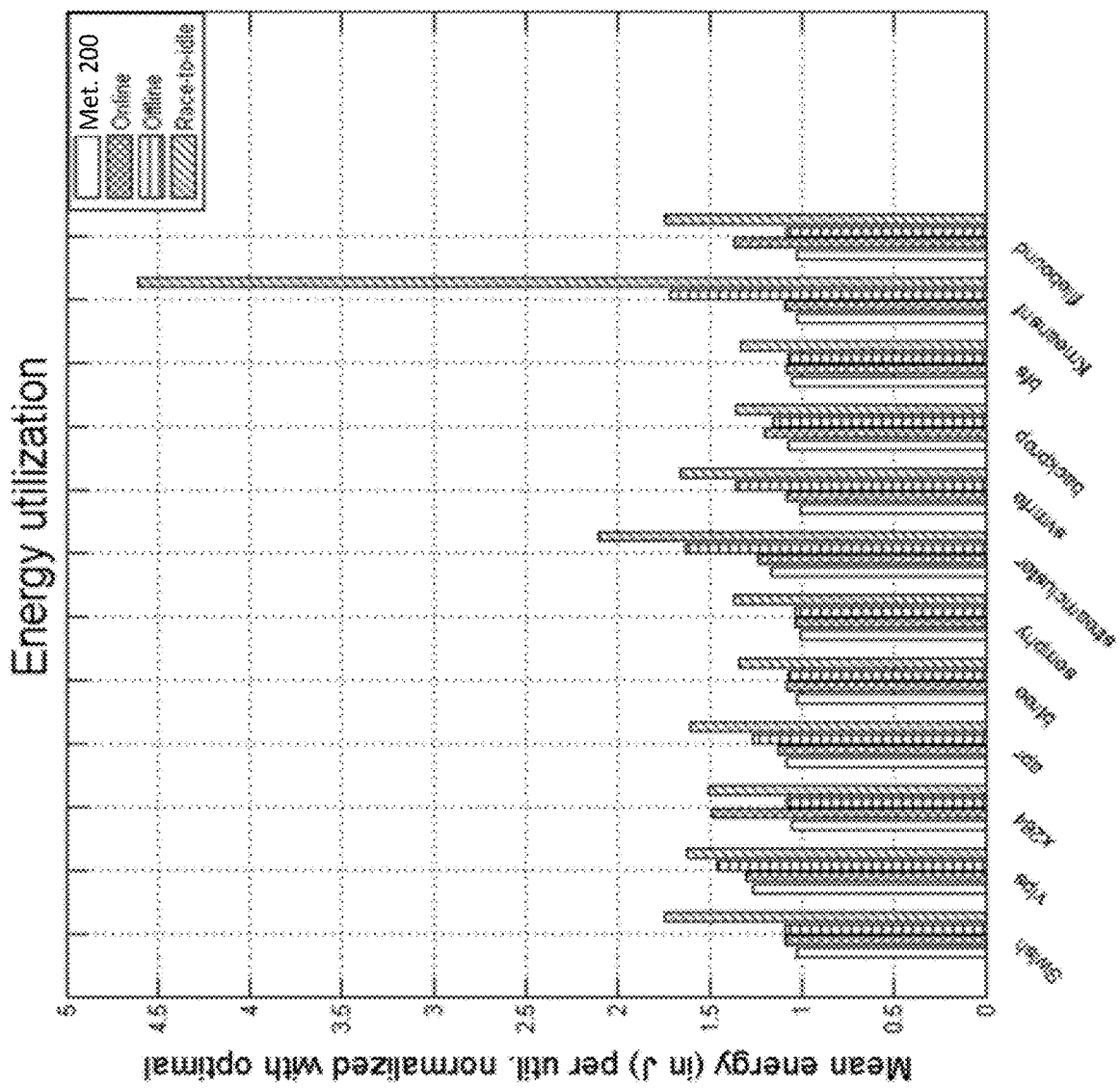
FIG. 12B shows a bar plot comparing the mean energy of optimal configurations determined according to four different optimization techniques for 12 other benchmark applications, according to one implementation.

FIGS. 12A and 12B show a comparison of average energy (normalized to optimal) by different estimation techniques for various benchmarks. The energy for method 200 is very close to optimal. On an average (taken over all the benchmarks) method 200 consumes 6% more than optimal, as compared to the online, offline, and race-to-idle approaches, which respectively consume 24%, 29% and 90% more energy than optimal.

Figure 10A:
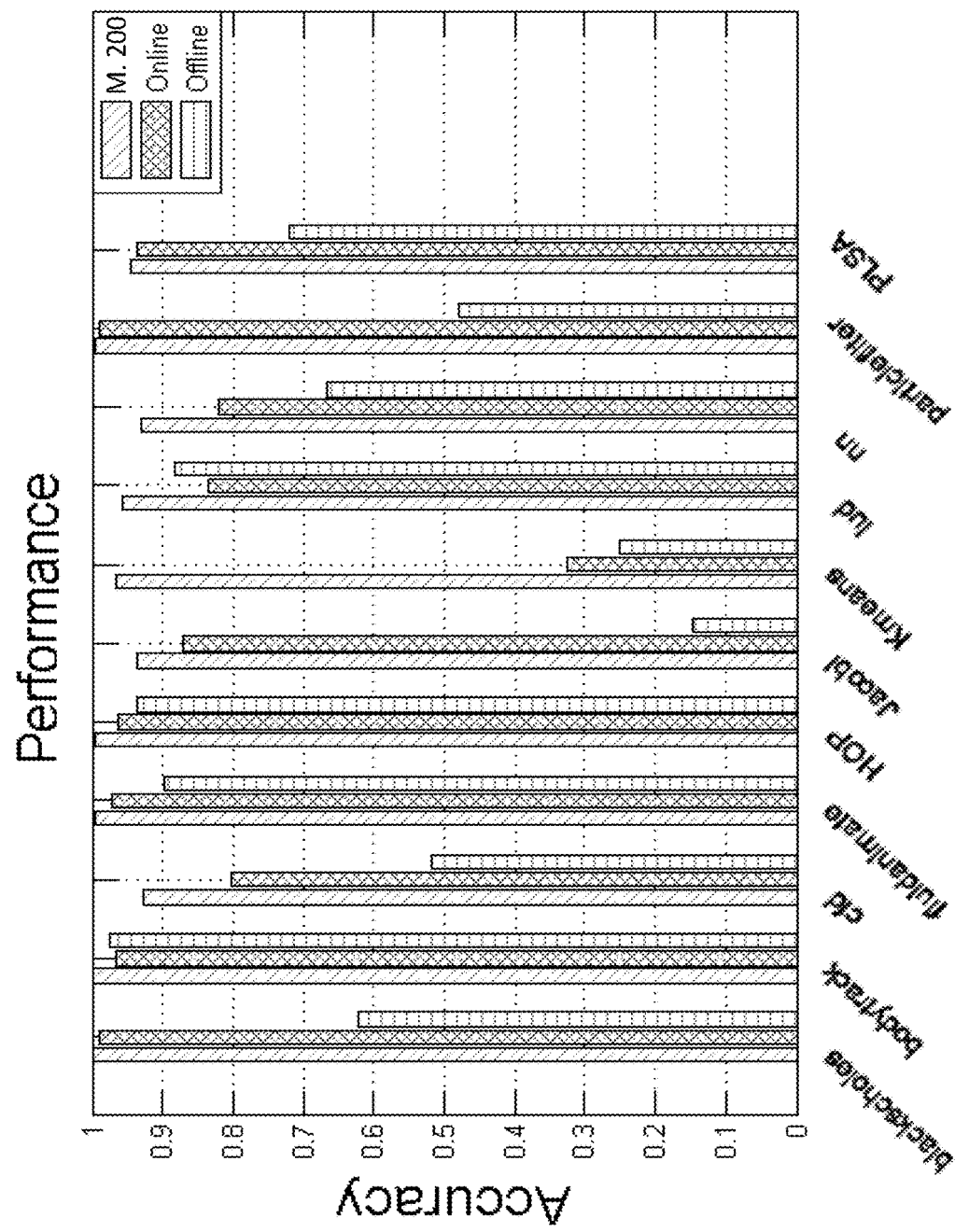
FIG. 10A shows a bar plot comparing the accuracy of performance estimates by three different optimization techniques for 11 different benchmark applications, according to one implementation.
Figure 10B:
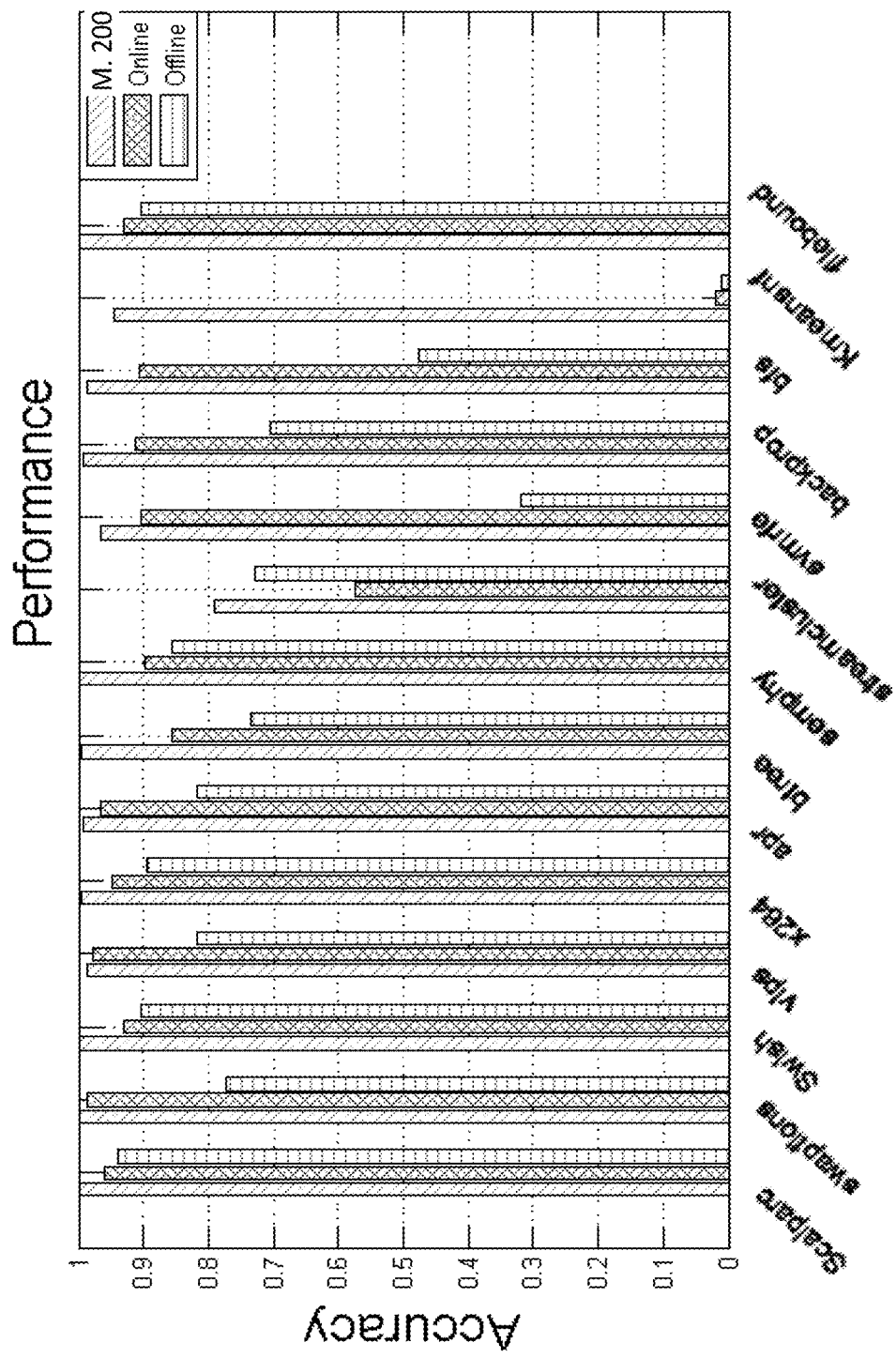
FIG. 10B shows a bar plot comparing the accuracy of performance estimates by three different optimization techniques for 14 other benchmark applications, according to one implementation.

FIGS. 10A and 10B show bar charts of the Pareto frontier for power and performance estimation using different estimation algorithms. The estimated Pareto-optimal frontiers are compared to the true frontier found with exhaustive search, providing insight into how method 200 solves the expressions in the foregoing. When the estimated curves are below optimal plots, it represents worse performance, i.e., missed deadlines, whereas the estimations above the optimal represent wasted energy.

Method 200's estimates are compared with the online, offline, and exhaustive search methods described in the foregoing. Each of the 25 applications is deployed on the test system, and performance and power are estimated. In certain embodiments, method 200 and the online method both randomly select and sample 20 configurations. Unlike the online method, which only uses these 20 samples, method 200 utilizes these 20 samples along with all the data from the other applications for the estimation purpose. These are non-limiting examples. Both approaches get more accurate as the number of samples increases. For both method 200 and the online approach, the average estimates are produced over 10 separate trials to account for random variations. The offline approach does no sampling. The exhaustive approach samples all 1024 configurations.

FIGS. 10A and 10B show a comparison of performance (measured as speedup) estimation by different techniques for various benchmarks. The accuracy of method 200 is consistently better than the online and offline approaches. On an average (over all benchmarks), method 200's accuracy is 0.97 compared to 0.87 and 0.68 for the online and offline approaches respectively. The results are normalized with respect to the exhaustive-search method. Further, these are representative, non-limiting results. It can be expected that the results to change on different systems or with different applications. However, in certain implementations, it can be observed that the HBM performs better than existing approaches.

Figure 11A:
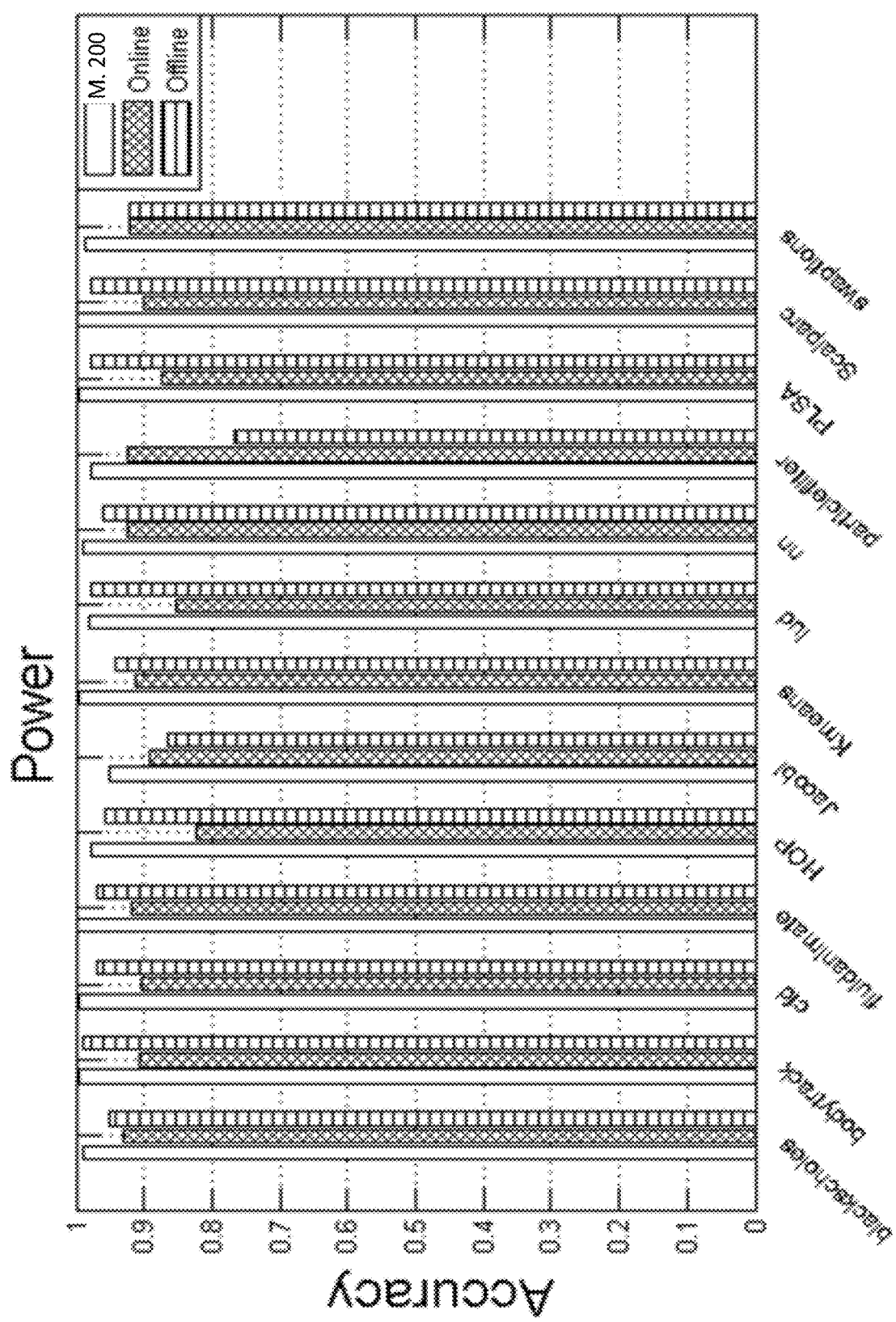
FIG. 11A shows a bar plot comparing the accuracy of power estimates by three different optimization techniques for 13 different benchmark applications, according to one implementation.
Figure 11B:
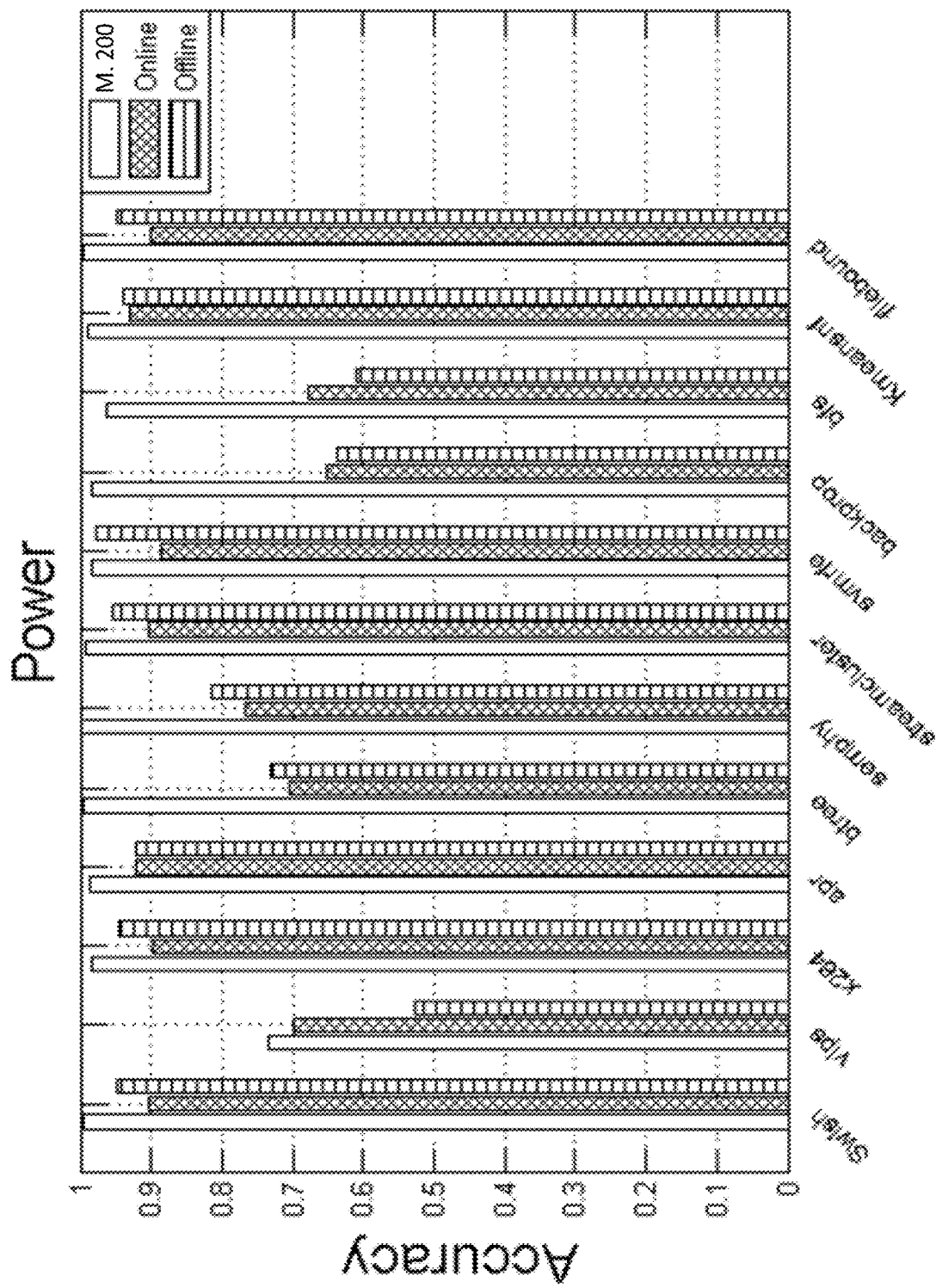
FIG. 11B shows a bar plot comparing the accuracy of power estimates by three different optimization techniques for 12 other benchmark applications, according to one implementation.

FIGS. 11A and 11B show a comparison of power (measured in Watts) estimation by different techniques for various benchmarks. The accuracies for method 200 are consistently better than the offline approach. On an average (over all benchmarks), method 200's accuracy is 0.98 compared to 0.85 and 0.89 for the online and offline approaches respectively. Again, the results are normalized with respect to the exhaustive-search method. As above, these are representative, non-limiting results.

The performance and power estimation accuracies are shown in FIGS. 10A and 10B and in FIGS. 11A and 11B respectively. The benchmarks are shown along the x-axis and estimation accuracy on the y-axis. Unity represents perfect accuracy. As seen in these FIGS. 10A, 10B, 11A, and 11B, method 200 produces significantly higher accuracy for both performance and power. On average (across all benchmarks and all configurations) method 200's estimations achieve 0.97 accuracy for performance and 0.98 for power. In contrast, the online approach achieves accuracies of 0.87 and 0.85, while the offline approach's accuracies are 0.68 and 0.89. Even for difficult benchmarks (like the Kmeans application), method 200 produces accurate estimations despite sampling less than 2% of the possible configuration space.

Method 200 produces highly accurate estimates of performance and power. For example, the performance models for the Kmeans, Swish, and x264 applications have accuracies of 0.99, 1.00, and 0.98, respectively, and the power-consumption models for the Kmeans, Swish, and x264 applications have accuracies of 0.99, 1.00, and 0.98, respectively. Method 200 accurately represents both the peak performance configuration and the local minima and maxima for all three applications. These accurate estimates provided by the performance models make method 200 well-suited for use in energy minimization problems, especially for applications having unusual behavior.

Figure 13A:
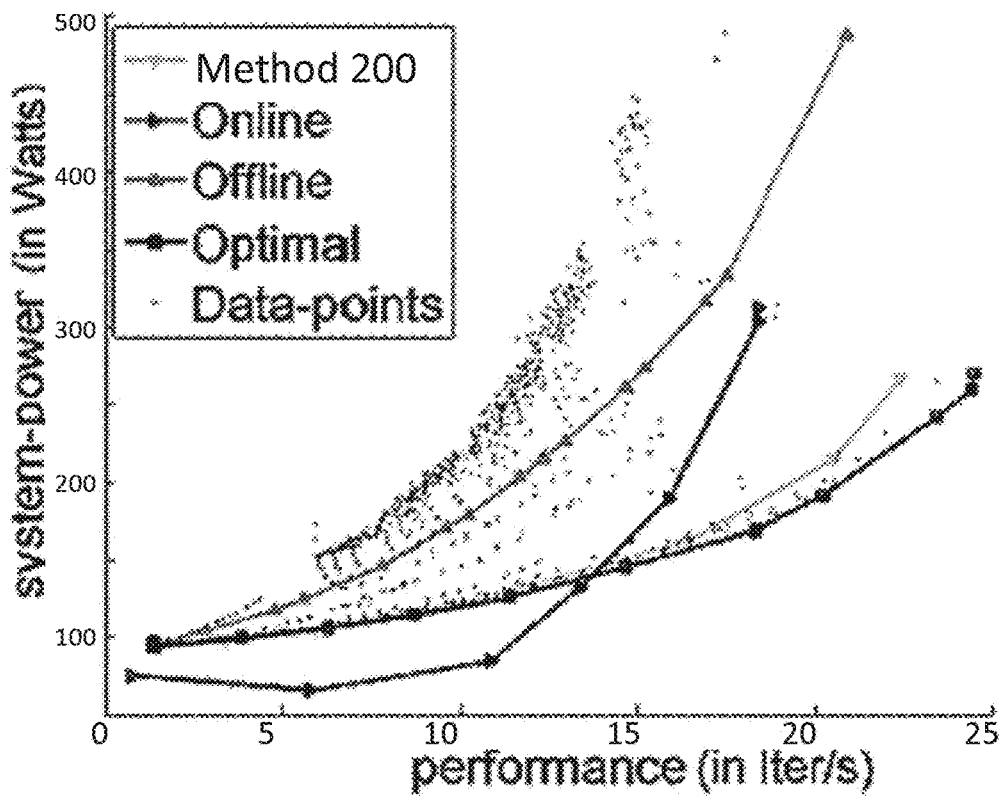
FIG. 13A shows a plot of a convex hull of the power-performance tradeoff space for the device executing a Kmeans application for various optimization techniques.
Figure 13B:
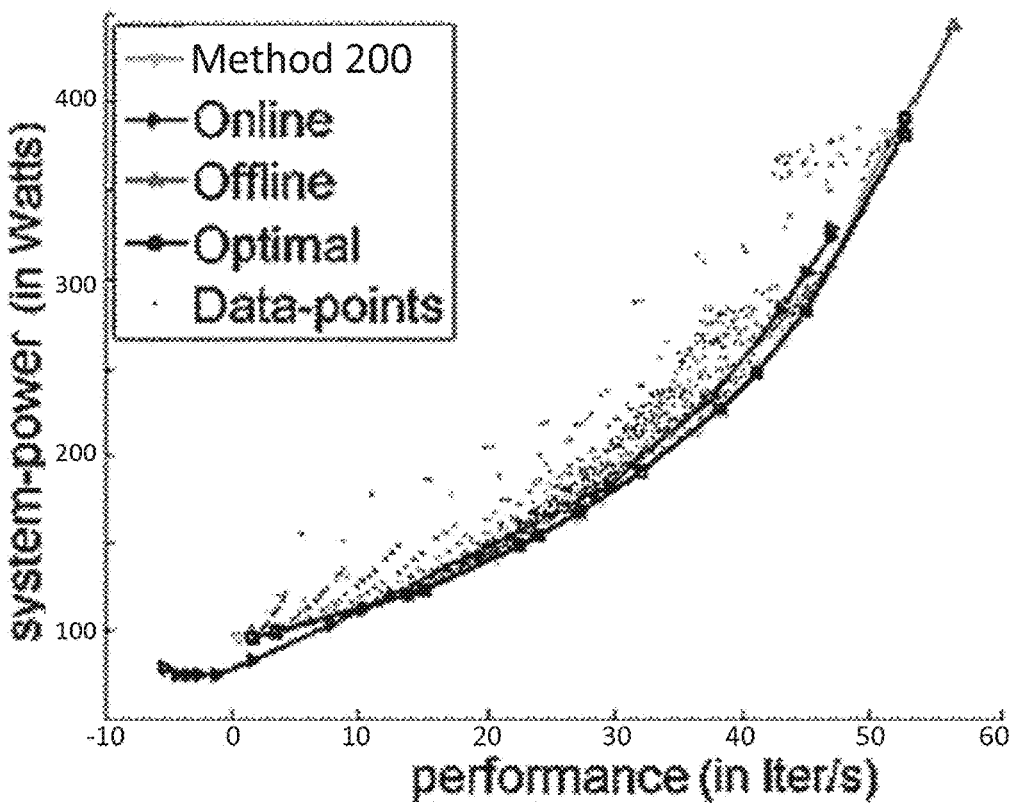
FIG. 13B shows a plot of a convex hull of the power-performance tradeoff space for the device executing a swish application for various optimization techniques.
Figure 13C:
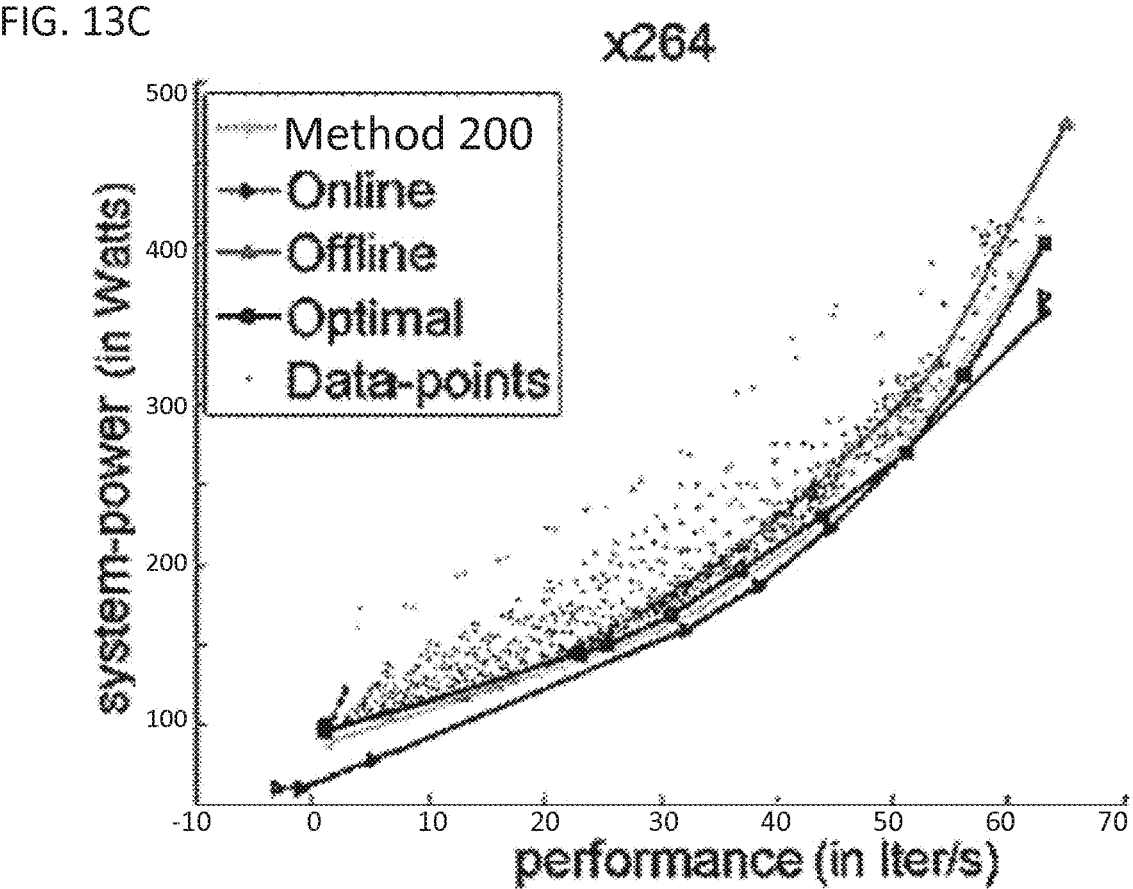
FIG. 13C shows a plot of a convex hull of the power-performance tradeoff space for the device executing an x264 application for various optimization techniques.

The goal of method 200 is not only to estimate performance and power, but to minimize energy for a performance (or utilization) target. Thus, method 200 uses the estimates of the performance model to form the Pareto-optimal frontier of performance and power tradeoffs. FIGS. 13A, 13B, and 13C show the true convex hull and those estimated by method 200 and the offline and online approaches. Due to space limitations, only the hulls for the three representative applications (i.e., Kmeans, Swish, and x264) are shown. In FIGS. 13A, 13B, and 13C performance (measured as speedup) is shown on the x-axis and system wide power consumption (in Watts) on the y-axis. FIGS. 13A, 13B, and 13C clearly show that method 200's more accurate estimates of power and performance produce more accurate estimates of Pareto-optimal tradeoffs.

To evaluate energy savings, each application is deployed with varying performance demands. Technically, the deadline is fixed and the workload W is varied, such that W∈[minPerformance, maxPerformance] for each application. One hundred different values are tested for W for each application, each value of W representing a different utilization demand from 1% to 100%. This broad range of possible utilizations demonstrates the generality of the methods described herein. Each approach is used to estimate power and performance and form the estimated convex hull and select the minimal energy configuration.

Figure 14A:
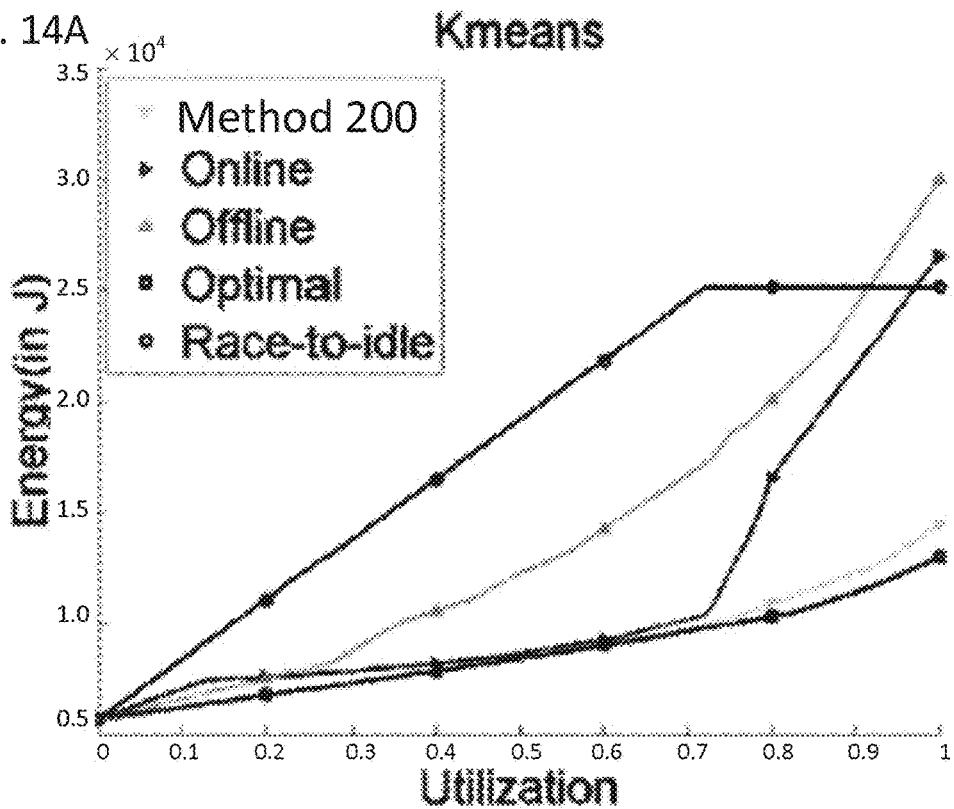
FIG. 14A shows a plot of the energy consumed as a function of utilization for the device executing a Kmeans application for various optimization techniques.
Figure 14B:
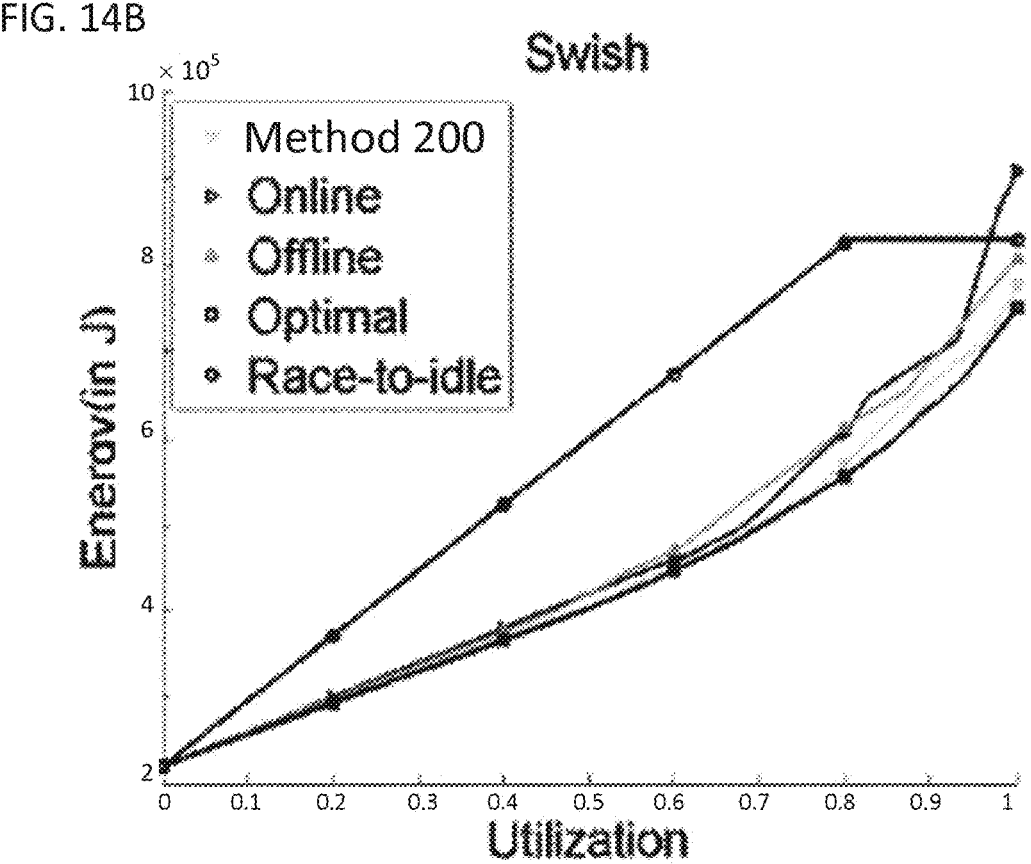
FIG. 14B shows a plot of the energy consumed as a function of utilization for the device executing the Kmeans application for various optimization techniques.
Figure 14C:
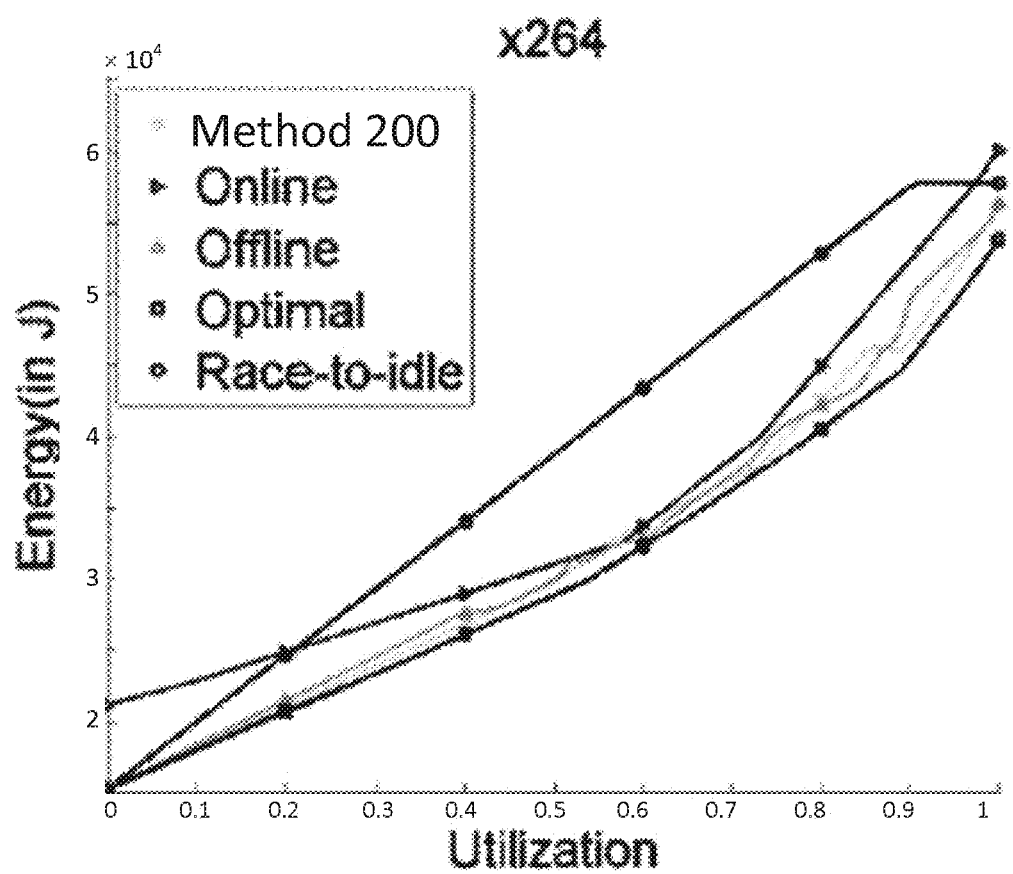
FIG. 14C shows a plot of the energy consumed as a function of utilization for the device executing the swish application for various optimization techniques.

FIGS. 14A, 14B, and 14C show the results for the three representative benchmarks. Each of the FIGS. 14A, 14B, and 14C shows the utilization demand on the x-axis and the measured energy (in Joules) on the y-axis. Each of the FIGS. 14A, 14B, and 14C shows the results for the method 200, online, and offline estimators as well as the race-to-idle approach and the true optimal energy. As shown in FIGS. 14A, 14B, and 14C, method 200 produces the lowest energy results across the full range of different utilization targets. In this example, method 200 is consistently close to optimal and outperforms the other estimators. The experiment described in the foregoing is repeated for all applications, then average the energy consumption for each application across all utilization levels. These results are shown in FIGS. 12A and 12B, which display the benchmark on the x-axis and the average energy (normalized to optimal) on the y-axis. On an average across all the applications, method 200 does only 6% worse than optimal. In contrast, online, offline and race-to-idle methods are 24%, 29%, and 90% worse respectively. These are non-limiting representative results. These results demonstrate that method 200 not only produces more accurate estimates of performance and power, but that these estimates produce significant-near optimal-energy savings.

Figure 15A:
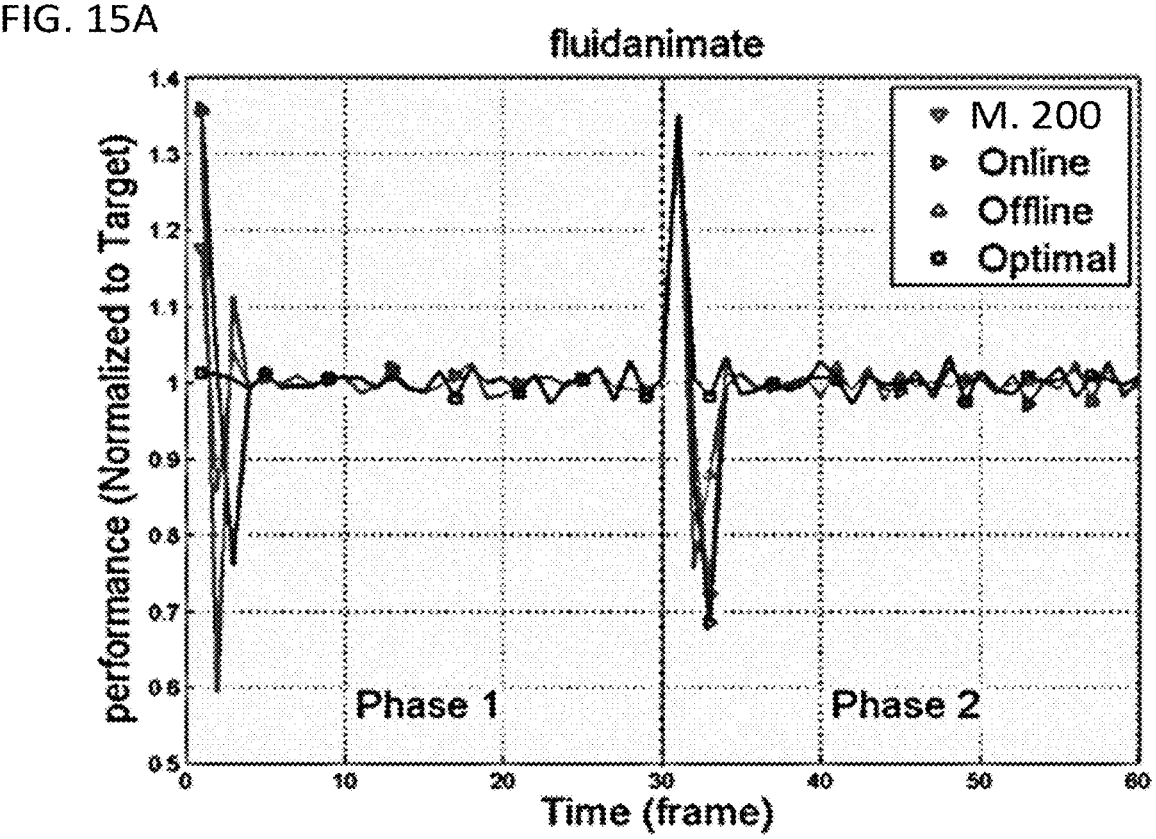
FIG. 15A shows a plot of performance of the device as a function of time for a transition from phase 1 to phase 2 of the application fluidanimate.
Figure 15B:
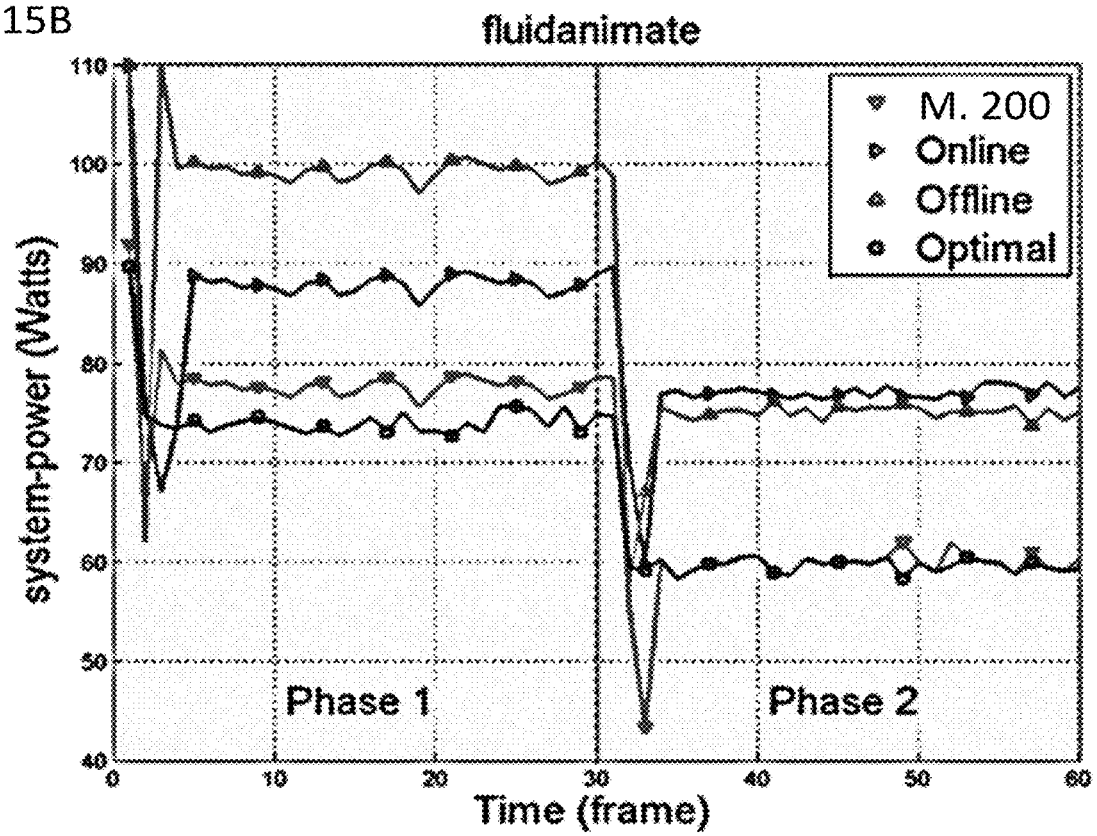
FIG. 15B shows a plot of power consumption of the device as a function of time for a transition from phase 1 to phase 2 of the application fluidanimate.

Next is described how method 200 can quickly react to changes in application workload. To demonstrate this, the application fluidanimate, which renders frames, was executed with an input that has two distinct phases. Both phases are completed in the same time, but the second phase is performed with significantly less work. In particular, the second phase uses only ⅔rd of the resources used by the first phase. These are non-limiting representative results. Thus, executing the application fluidanimate demonstrate that method 200 can quickly react to phase changes and maintain near optimal energy consumption. The results of executing the application fluidanimate are shown in FIGS. 15A and 15B and summarized in Table 1. FIGS. 15A and 15B show time (measured in frames) on the x-axis.

FIG. 15A shows performance normalized to real-time on the x-axis, and FIG. 15B shows power in Watts (subtracting out idle power) on the y-axis. The dashed vertical line shows where the phase change occurs. Each of FIGS. 15A and 15B shows the behavior for method 200, the offline method, the online method, and an optimal solution.

All computational configurations represented in FIGS. 15A and 15B are able to meet the performance goal in both phases. This fact is not surprising as all use gradient ascent to increase performance until the demand is met. The real difference comes when looking at power consumption. Here, it can be observed that method 200 again produces near optimal power consumption despite the presence of phases. Furthermore, this power consumption results in near optimal energy consumption as well, as shown in Table 1. These results indicate that method 200 produces accurate results even in dynamically changing environments.

TABLE 1

Relative energy consumption by various algorithms with respect to optimal. These are non-limiting representative results.

| Algorithm | Phase#1 | Phase#2 | Overall |
|---|---|---|---|
| Method | 1.045 | 1.005 | 1.028 |
| Offline | 1.169 | 1.275 | 1.216 |
| Online | 1.325 | 1.248 | 1.291 |

Method 200's runtime overhead is tricky to quantify, but can be quantified. The runtime takes several measurements, incurring minuscule sampling overhead. After collecting these samples, the runtime incurs a one-time cost of executing method 200. After executing this algorithm, the models are sufficient for making predictions and method 200 does not need to be executed again for the life of the application under control. For this reason, method 200 appears to be well suited for long running applications which may operate at a range of different utilizations. In certain embodiments, the one-time estimation process is sufficient to provide accurate estimates for the full range of utilizations.

Therefore, the overhead is measured in two ways: (i) the average time required to execute method 200 is measured on the system and (ii) the average total system energy consumption is measured while executing the runtime. The average execution time is 0.8 seconds across each benchmark for each power and performance. These are non-limiting representative results. The average total system energy consumption while executing the runtime is measured to obtain an energy overhead value of 178.5 Joules. The overhead is not trivial. However, for applications that run in the 10 s of seconds to minutes or more, method 200's overhead is easily amortized by the large energy savings enabled. For comparison, the exhaustive search approach takes more than 5 days to produce the estimates for the semphy application, and for the HOP application, which is the fastest application used in the example in the foregoing, an exhaustive search takes at least 3 hours.

Now, a method of performing process 230 is described, using an example of achieving a latency goal for executing an application. Many implementations of process 230 can be used. The implementation described now uses abstract resource management into a middleware or runtime, and this particular implementation is referred to as POET (Performance with Optimal Energy Toolkit). POET is unique because of (i) how it generates and uses energy awareness, (ii) POET is designed for portability, and (iii) POET incorporates a true minimal-energy resource allocation algorithm.

To better understand POET, it is helpful to consider motivations for portable, energy-aware resource management. Further it is helpful to consider an example application by evaluating the timing and energy tradeoffs of a video encoder on two embedded platforms, a Sony Vaio™ tablet and an ODROID™ development board. The two platforms not only have different resources for management, but also have latency and energy tradeoffs with different topologies. Thus, resource allocation strategies that save energy on one are wasteful on the other.

This example features a video encoder, composed of jobs, where each job encodes a frame. The encoder is instrumented to report job latency and the platform's energy consumption is measured over time. The two platforms have different configurable resources, shown in Table 2. The Vaio allows configuration of the number of active cores, the number of hyperthreads per core, the speed of the processors, and the use of TurboBoost. The ODROID supports configuration of the number of active cores, their clock speed, and whether the application uses the "big" (Cortex-A15 high performance, high power) or "LITTLE" (Cortex-A7 low performance, low power) cores.

Figure 16A:
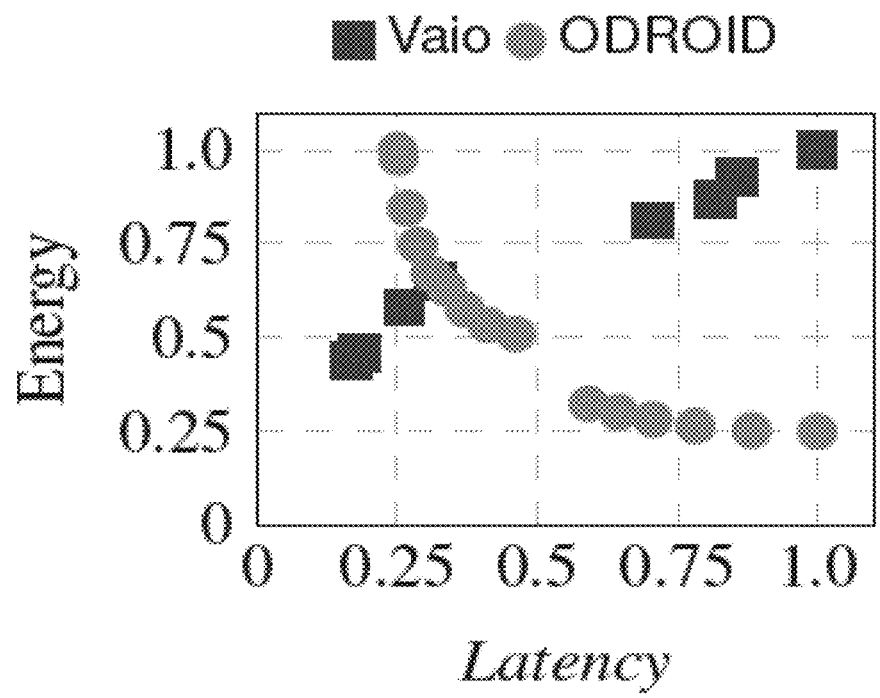
FIG. 16A shows a plot comparing energy and latency tradeoffs for the Vaio and the ODROID systems.
Figure 16B:
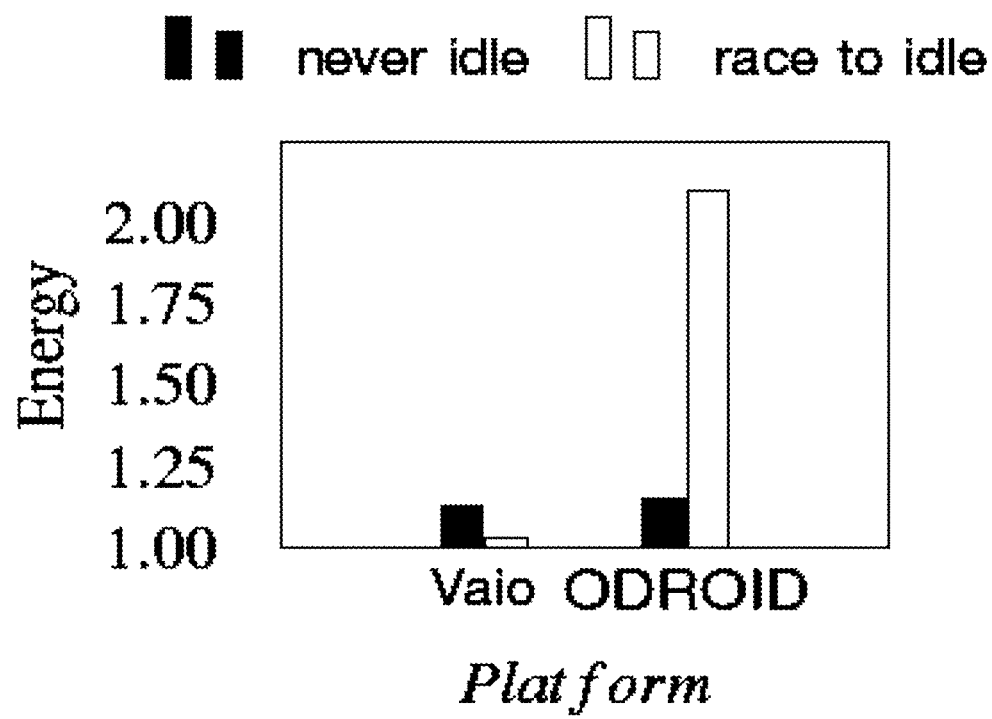
FIG. 16B shows a bar plot comparing energy consumption for the Vaio and the ODROID systems when the never-idle and race-to-idle heuristics are applied.

FIGS. 16A and 16B exemplify the tradeoffs between energy consumption and latency. In FIG. 16A, the x-axis shows the average latency (normalized to 1—the empirically determined worst case). The y-axis shows energy (normalized to 1—the highest measured energy). FIGS. 16A and 16B show the very different tradeoffs for the Vaio and the ODROID with each point representing a different configuration. For the Vaio, energy increases as frame latency increases. That is, a slower job wastes energy. For the ODROID, energy decreases as frame latency increases. That is a slower encoding saves energy.

The different shapes of these tradeoff spaces lead to different optimal resource allocation strategies. Empirical studies show that the race-to-idle heuristic, which makes all resources available and then idles after completing a job, is near optimal on systems like the Vaio. On systems like the ODROID, energy can be economized by keeping the system constantly busy and never idle.

To demonstrate the importance of choosing the right strategy, the two heuristics, race-to-idle and never-idle, are analyzed and compared using both platforms and compare their energy consumption to respective optimal configurations. The latency target is set equal to twice the minimum latency and the energy consumption of encoding 500 video frames using each heuristic is measured.

FIG. 16B shows the results, normalized to the optimal energy found by measuring every possible resource configuration. Both heuristics meet the latency target, but their energy consumptions vary tremendously. On the Vaio, race-to-idle is near optimal, but never-idle consumes 13% more energy. Conversely, never-idle is near optimal for the ODROID, but race-to-idle consumes two times more energy.

These results demonstrate that the resource allocation strategy greatly affects energy consumption, and more importantly, that heuristic solutions are not necessarily portable across devices. These two points motivate the need for an approach like POET, which provides near optimal resource allocation while remaining platform-independent. POET's runtime uses control theory to meet timing constraints and linear programming to minimize energy consumption. Thus, using the performance model obtained from the server 110, a device 120 executing POET's runtime can optimize energy consumption according to some predefined criteria, as exemplified in the following.

In certain implementations, POET uses a resource allocation framework. The goal of the resource allocation framework is twofold: (i) to provide predictable timing so application jobs meet their deadlines and (ii) to minimize energy consumption given the timing requirement. These two subproblems are intrinsically connected, but can be decoupled to provide a general solution. In practice, complexity can

TABLE 2

Two embedded platforms with different configurable components. These differences in platforms demonstrate the generality of the methods described herein. Further, the methods described herein are even more general, and are not restricted to these two platforms.

| Platform | Processor | Cores | Core Types | Speeds (GHz) | Turbo-Boost | Hyper-Threads | Idle Power (W) | Configurations |
|---|---|---|---|---|---|---|---|---|
| Sony Vaio | Intel Haswell | 2 | 1 | .6-1.5 | yes | yes | 2.5 | 45 |
| ODROID-XU + E | Samsung Exynos5 Octa | 8 | 2 (A15 & A7) | .8-1.6 (A15) .5-1.2 (A7) | no | no | 0.12 | 69 | arise from the keeping resource allocation general with respect to the platform and the running application. The problem of providing predictable timing is addressed by using control theory to compute a generic control signal. Using the computed control signal, the energy minimization problem is solved using mathematical optimization.

Figure 17:
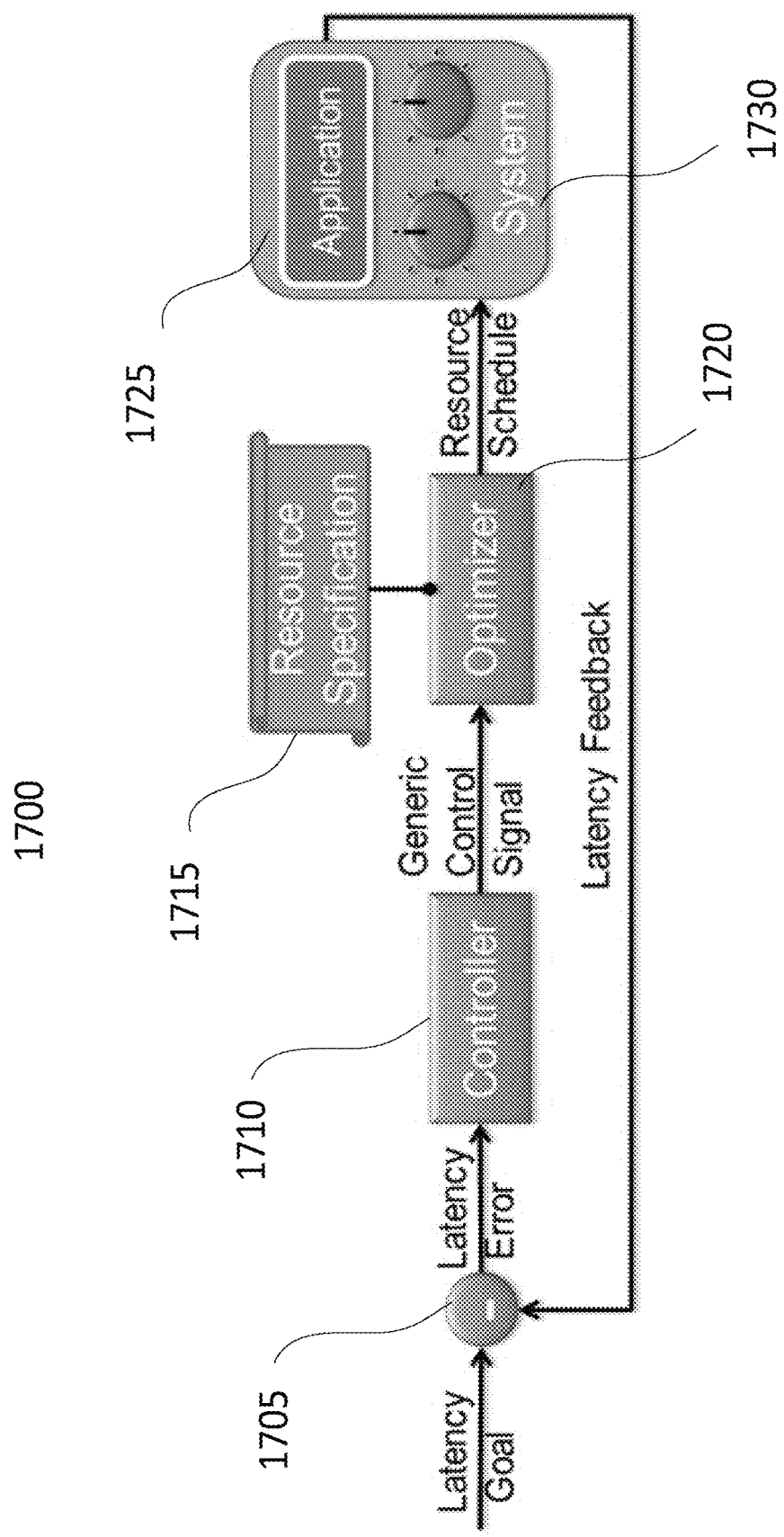
FIG. 17 shows a schematic diagram of a POET architecture, according to one implementation.

FIG. 17 illustrates the POET architecture 1700. The application 1725 informs the runtime of its target job latency (i.e., latency goal). Measuring each job start and completion time, POET's runtime computes a latency error and passes it to a controller 1710. The controller 1710 uses the latency error (i.e., error) to calculate a generic control signal, indicating how much the speed of the application 1725 can be altered. This signal is used by the optimizer 1720, together with the specification of available resources 1715, to schedule resource usage so that the desired speed is achieved and energy consumption is minimized. Both the controller 1710 and the optimizer 1720 are designed independently of the application 1725 and system 1730. The only assumption made is that applications are composed of repeated jobs, each with a (soft real-time) deadline, or desired latency. Further, for multicore platforms, it is assumed that each job may be processed by multiple, communicating threads.

The controller 1710 cancels the error between the desired job deadline $d_r$ and its measured latency $d_m(t)$ at time t. The error e(t) is considered using the abstraction of the job speed, where the required speed is $1/d_r$ and the measured speed at time t is $1/d_m(t)$.

$$e(t) = \frac{1}{d_r} - \frac{1}{d_m(t)}$$

POET models latency as $$d_m(t) = \frac{1}{s(t-1) \cdot b(t-1)}$$

wherein s(t) is the speedup to achieve with respect to b(t), the base application speed, i.e., the speed of the application when it uses the minimum amount of resources.

POETs controller 1710 uses the error to calculate the control signal s(t) so that the speedup cancels the error. The controller 1710 intervenes at discrete time instants and implements the integral control law, as expressed by $$s(t) = s(t-1) + (1-p) \cdot \frac{e(t)}{b(t)}$$

wherein p is a configurable pole of the closed loop characteristic equation. To ensure the controller 1710 reaches a steady state where the error is eliminated without oscillations, the value of p should lay in the unit circle, i.e., 0≤p<1 and p is user-configurable. Relatedly, in certain implementations, the CALOREE architecture 2000 automatically configures the pole to ensure convergence given a learned model. A small p makes the controller 1710 highly reactive, whereas a large p makes it slow to respond to external changes. However, a large p ensures robustness with respect to transient fluctuations and may be beneficial for very noisy systems. A small p will cause the controller 1710 to react quickly, potentially producing a noisy control signal.

The parameter b(t) represents the application's base speed, which directly influences the controller 1710. Different applications will have different base speeds. Applications may also experience phases, where base speed changes over time. To accommodate these situations, POET, in certain embodiments, continually estimates base speed using a Kalman filter, which adapts b(t) of control the current application behavior.

POETs control formulation is independent of a particular application as it, in certain embodiments, uses the Kalman filter to estimate the application base speed. Unlike prior work, this controller 1710 does not reason about a particular set of resources, but computes a generic control signal s(t). POET provides formal guarantees about its steady-state convergence and robustness without requiring users to understand control theory.

The optimizer 1720 turns the generic control signal computed by the controller 1710 into a system-specific resource allocation strategy, translating the speedup s(t) into a schedule for the available resources. The schedule is computed for the next τ time units. To meet the requirement on the target latency and avoid deadline misses, POET ensures that the application completes I(t) jobs in the next interval by the expression $$I(t) = \tau \cdot s(t) \cdot b(t).$$

As shown in FIG. 17, the optimizer 1720 takes, as input, a resource specification containing the set of available system configurations (e.g., the performance model obtained from the server 110). For example, there can be C possible configurations in the system and by convention, these configurations are numbered from 0 to C−1. Accordingly, c=0 indicates the configuration where the least amount of resources is allocated to the application 1725, corresponding to a low-power idle state or sleep state when available. In contrast, configuration C−1 maximizes the resource availability. Each configuration c is associated with a power consumption $p_c$ and speedup $s_c$.

Given this information, POET schedules for each configuration c an execution time $\tau_c$, ensuring that the I(t) iterations complete and the total energy consumption is minimized. To do so, POET solves the optimization problem:

$$\text{minimize} \sum_{c=0}^{C-1} \tau_c \cdot p_c$$

$$\text{s.t.} \sum_{c=0}^{C-1} \tau_c \cdot s_c \cdot b(t) = I(t)$$

$$\sum_{c=0}^{C-1} \tau_c = \tau$$

$$0 \leq \tau_c \leq \tau, \forall c \in \{0, \ldots, C-1\}$$

The solution to the optimization problem minimizes the total energy consumption subject to the constraints that all jobs be completed within the next control period. The optimization problem ensures that the time is fully scheduled and imposes the constraint that a non-negative time is assigned to each configuration. Solving linear optimization problems is generally challenging. However, this particular optimization problem has a structure that makes it practical to solve. Feasible solutions are confined to a polytope in the positive quadrant defined by the two constraints. Thus, linear programming theory states an optimal solution exists for this problem when all the $\tau_c$ are equal to zero except for (at most) two configurations.

TABLE 3

Minimum energy schedule algorithm.

| | |
|---|---|
| Input: C | → system configurations |
| Input: s(t) | → given by Eqn. 3 |
| Input: τ | → given by application |
| under = {c \| $s_c$ ≤ s(t)} | |
| over = {c \| $s_c$ > s(t)} | |
| candidates = { ⟨ u, o ⟩ \| u ∈ under, o ∈ over} | |
| energy = ∞ | |
| optimal = ⟨ −1, −1 ⟩ | |
| schedule = ⟨ 0, 0 ⟩ | |
| for ⟨ u, o ⟩ ∈ candidates do | → Loop over all pairs |
| $\tau_u$ = (τ · s(t) − τ · $s_o$)/($s_u$ − $s_o$) | |
| $\tau_o$ = τ − $\tau_u$ | → Compute energy of this pair |
| newEnergy = $\tau_u$ · $p_u$ + $\tau_o$ · $p_o$ | |
| if newEnergy < energy then | → Compare energy to best found so far |
|    energy = newEnergy | |
|    optimal = ⟨ u, o ⟩ | |
|    schedule = ⟨ $\tau_u$,$\tau_o$ ⟩ | |
|   end if | |
| end for | |
| return optimal | → Pair of configurations with minimal energy |
| return schedule | → Time to spend in each configuration |

The minimum-energy-schedule algorithm shown in Table 3 takes the set of configurations, the controller's speedup, and the time interval τ specified by the application. It then divides the configurations in two distinct sets. The first set contains all configurations with a speedup less than or equal to the target. The second contains the remaining configurations. That is, those configurations with speedups greater than required. Subsequently, the minimum-energy-schedule algorithm loops over all possible pairs of configurations, with one from each set, to determine how much time should be spent in each configuration given the deadline. If the energy of the pair is lower than any previous energy, the algorithm stores the current best pair, its energy, and its schedule. When the algorithm terminates, its output is the pair of chosen configurations and their assigned times.

The algorithm tests all possible pairs from the two sets, each of which contains at most C elements, so an upper bound to the algorithm complexity is order $O(C^2)$. There is an optimal solution to the linear program with at most two non-zero values of $\tau_c$ (this is because the dual problem has two dimensions) and minimum-energy-schedule algorithm tests all pairs of configurations. Therefore, minimum-energy-schedule algorithm will find a minimal-energy schedule.

In practice this process can be sped up by considering only Pareto-optimal (in performance/power) configurations. Sorting into Pareto-optimal configurations takes order O(C log C) time, and need only be done once. After sorting, configurations can be indexed by a bucketed hash table with speedup as the key. Given a sufficiently large table this reduces the per control invocation complexity to constant time.

The controller 1710 and the optimizer 1720 both reason about speedup instead of absolute performance or latency. The absolute performance of the application, measured by the average latency of its jobs, will vary as a function of the application 1725 itself and the system 1730 that the application 1725 is executed on. However, speedup is a general concept and can be applied to any application and system, thus providing a more general metric for control. Moreover, the controller 1710 customizes the behavior of a specific application using the estimate of its base speed produced by the Kalman filter. The optimizer 1720 operates in a platform-independent manner, using the available configurations provided as input to find the optimal solution, without relying on a particular heuristic that may be system-specific or application-dependent. Finally, the customizable pole p in the foregoing equations allows for flexibility and robustness to inaccuracies and noise.

The ability to control robustness to inaccuracies and model errors is a major advantage of feedback control systems. In particular, POET is stable and converges to the desired latency without oscillations provided that 0≤p<1. Formal analysis of this behavior can be obtained by applying standard control techniques.

In addition to provable convergence, the control formulation allows an analysis of POETs robustness to user error. In particular, suppose Δ is a multiplicative error term, indicating the largest error in the speedup values provided in the system configurations. That is, if the provided speedup is $s_p$, the real value is $s_p$·Δ. POET cancels the error despite inaccurate information if and only if 0<Δ<2/(1−p). The value of p therefore determines how robust POET is to errors in speedup specifications. For example, when p=0.1, $s_p$ can be off by a factor of two and the system is still guaranteed to converge. Users who can provide good system models will therefore use a small value of p, while less confident users can select a larger p. All the experiments in the evaluation use p=0 to test the implementation in the least forgiving setting.

Next, additional details regarding the POET architecture 1700 are provided according to one non-limiting implementation. First, a Kalman filter is described. Then, the convergence of the controller is analyzed. Next, the robustness to inaccuracies is discussed in the user-specified configurations. Finally, additional data is presented to compare POET architecture 1700 to an approach that only uses DVFS to meet latency goals while minimizing energy consumption.

The controller of the POET architecture 1700 customizes itself to the behavior of the application under control. This customization is achieved at runtime by estimating the key parameter of the controller, b (t), using a Kalman filter. Denoting the application timing variance as $q_b$ (t) and assuming minimal measurement variance (i.e., the application may be noisy, but the signaling framework does not add additional noise), the Kalman filter formulation is given by $$\hat{b}^-(t) = \hat{b}(t-1)$$

$$e_b^-(t) = e_b(t-1) + q_b(t)$$

$$k_b(t) = \frac{e_b^-(t) \cdot s(t)}{[s(t)]^2 \cdot e_b^-(t)}$$

$$\hat{b}(t) = \hat{b}^-(t) + k_b(t)\left[\frac{1}{d_m(t)} - s(t) \cdot \hat{b}^-(t)\right], \text{ and}$$

$$e_b(t) = [1 - k_b(t) \cdot s(t-1)]e_b^-(t).$$

In this formulation, $k_b$ (t) is the Kalman gain for the latency, $\hat{b}^-$(t) and $\hat{b}$(t) are the a priori and a posteriori estimates of b(t), and $e_b^-$ (t) and $e_b$ (t) are the a priori and a posteriori estimates of the error variance.

The POET architecture 1700 uses a Kalman filter because it produces a statistically optimal estimate of the system's parameters and is provably exponentially convergent. The user does not need to have prior knowledge on Kalman filtering—in certain embodiments, all the filter parameters are computed by the controller (speedup s(t)), measured (latency $d_m$ (f), latency variance $q_b$ (t)), or derived (all others).

Control-theoretical adaptation mechanisms are useful since they provide formal guarantees on the behavior of the system under control during runtime. Usually, for linear time-invariant systems, this analysis is performed in the transfer function domain, because it greatly simplifies the mathematical approach. For continuous-time systems, typically the Laplace transform is used, while for discrete-time systems, the analysis is typically performed using the Z-transform. In the Z-transform domain, the operator $z^{-k}$ is a k-unit delay.

Now, a discussion is provided to prove that the controller computes the correct speedup to cancel the latency error. Therefore, it is assumed that, whichever speedup is computed, the optimizer translates it into a schedule with no error. The Kalman filter converges to its estimated value. Therefore, it is proven that the controller converges to the correct control signal when the Kalman filter has already reached its correct estimate b. Since the input and output signals are bounded, this proof suffices to show that the entire system converges.

The equation $$d_m(t) = \frac{1}{s(t-1) \cdot b(t-1)}$$

can be transformed into its Z-transform equivalent $$A(z) = \frac{b}{z},$$

wherein A(z) is the transform of the effect of the input s(t) on the output $d_m(t)$. Similarly, the controller equation $$s(t) = s(t-1) + (1-p) \cdot \frac{e(t)}{b(t)}$$

can be transformed into the corresponding one in the transfer function domain, and becomes $$C(z) = \frac{(p-1) \cdot z}{b \cdot (z-1)}$$

where p is the controller pole and $z^{-1}$ is the unit delay. The Z-transform of the closed loop system is $$F(z) = \frac{C(z) \cdot A(z)}{1 + C(z) \cdot A(z)}$$

and can be rewritten as $$F(z) = \frac{\frac{(p-1) \cdot z}{b \cdot (z-1)} \cdot \frac{b}{z}}{1 + \frac{(p-1) \cdot z}{b \cdot (z-1)} \cdot \frac{b}{z}} = \frac{1-p}{z-p}$$

The closed loop system has a pole p. The system also has a static gain of 1, therefore the input (the desired latency) is translated directly into the output without modifications. Provided that $0 \leq p < 1$, the system is stable by design.

To analyze the robustness of the POET architecture 1700 to error, suppose that the speedup values provided in the resource specification are incorrect. Let $s_c$ be the specified speedup with the largest error. The true speedup can be expressed as $\bar{s}_c = \Delta \cdot s_c$, with $\Delta$ being a multiplicative error term. For example, $\Delta=5$ indicates that the specified speedup is off by a factor of 5 and $\Delta=0.5$ indicates that the real speedup is only half of that specified. These are non-limiting representative values.

Due to the relationship between base speed b and speedup $s_c$ an error in the speedup term is equivalent to the same error in the estimate of base speed. Therefore, the robustness to errors of the POET architecture 1700 is determined in the specified speedup by substituting $\Delta \cdot b = b$ into F(z), which can be expressed as $$F(z) = \frac{C(z) \cdot A(z)}{1 + C(z) \cdot A(z)}$$

$$= \frac{\frac{(p-1) \cdot z}{b \cdot (z-1)} \cdot \frac{b \cdot \Delta}{z}}{1 + \frac{(p-1) \cdot z}{b \cdot (z-1)} \cdot \frac{b \cdot \Delta}{z}}$$

$$= \frac{(1-p) \cdot \Delta}{1 + \Delta \cdot (1-p) - z}.$$

The closed loop represented by the above expression of F(z) is stable if and only if its pole is within the unit circle. Assuming the pole is real, its absolute value should be between 0 and 1. Then, for a stable system, $-1 < \Delta \cdot p + \Delta + 1 < 1$. The first part, $-1 < \Delta \cdot p + \Delta + 1$, translates to $$\Delta < \frac{2}{(1-p)}.$$

The second part, $\Delta \cdot p + \Delta + 1 < 1$, imposes $\Delta > 0$ and $p < 1$. The second constraint is already verified in the controller design. As a final result, the system is stable when $$0 < \Delta < \frac{2}{(1-p)}.$$

This means that if p=0.1, the maximum $\Delta$ that the system can stand is 2.2, while if p=0.9, the maximum $\Delta$ is 20.

As described above, the POET architecture 1700 can use a performance model obtained from a server 110 to optimize the efficiency (i.e., the ratio of computational task performed to the energy consumption rate) subject to a constraint of completing a given workload W=I(t) within a predefined time period T=τ. Also described above, a speed-up factor is used to dynamically feedback, correct, and control for deviations from ideal performance when the device 120 executes the application.

Similarly, the performance model and the speed-up factor can be used with other optimization criteria and can be used to perform optimizations, subject to other constraints. For example, the optimization criteria can be to maximize the computational tasks while ensuring that the energy reserves last until a predetermined time, e.g., that the device 120 has power throughout the business day until evening when the device can be recharged. Also, the optimization criteria can be to dynamically select the most efficient configuration for a particular application without being subject to additional constraints.

Further, in certain applications the optimization criteria can be to constrain the maximum energy consumption within a predefined time period subject to an additional constraint that a predefined number of computational tasks are performed within the predefined time period. This can be achieved using the performance model and the speed-up factor, but sometimes the device 120 cannot simultaneously satisfy both constraints for a given application. In that case approximate computing can be added to the POET architecture 1700. The JouleGuard architecture, which is described next, provides a non-limiting example of an implementation of optimization using a combination of a performance model obtained from a server 110, a controller using a speed-up factor, and an accuracy optimizer when the speed-up factor alone is insufficient to satisfy all constraints of the constrained optimization criteria.

Figure 18:
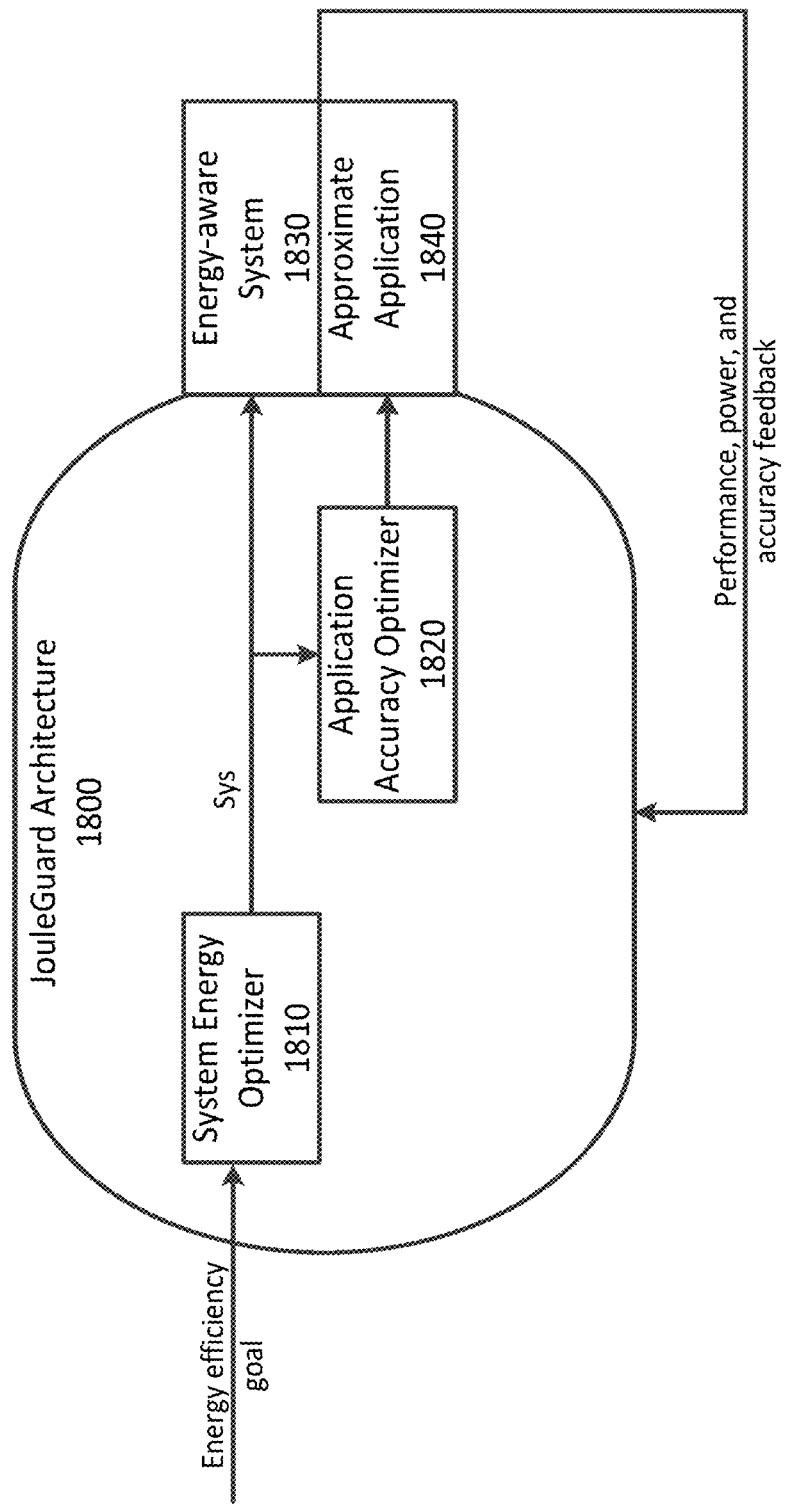
FIG. 18 shows a schematic diagram of a JouleGuard architecture, according to one implementation.

FIG. 18 shows an example implementation of a Joule-Guard architecture 1800. The JouleGuard architecture 1800 can be arranged to split the problem of meeting an energy goal while maximizing accuracy into two components. The first component, which is labeled System Energy Optimizer (SEO) 1810 in FIG. 18, is responsible for putting the system into the most energy efficient system configuration. For example, the SEO 1810 can perform some of the functions of controller 1710 in the POET architecture 1700. The expected speed and power of the most energy efficient system configuration are passed to the Application Accuracy Optimizer (AAO) 1820, which determines how much additional performance to obtain from tuning the application accuracy.

If the performance, power, and accuracy of all combinations of application and system configuration are known ahead of time (e.g., based the performance model) and these do not change, then the application and system configuration need only be configured once. In general, however, unpredictable dynamic fluctuations are expected, making it challenging to perfectly predict the highest energy efficiency system configuration ahead of time. Further, allowing for imperfections in the determined performance model can make the system more robust. Furthermore, variations can result from the configuration that may be either/both application and/or input dependent. Therefore, the optimization is solved at runtime using dynamic feedback. Both the SEO 1810 and AAO 1820 can adapt to changes in the other, yet still converge to reliable steady-state behavior. First the SEO 1810 is described, and then the AAO 1820 is described, with an analysis of how the JouleGuard architecture 1800's provides energy guarantees.

TABLE 4

Notation used in describing the JouleGuard architecture 1800.

| | Symbol | Meaning |
|---|---|---|
| General | Sys | set of all system configs |
| | App | set of all application configs |
| | sys | an individual system config |
| | app | an individual application config |
| | bestsys | most energy efficient system config |
| | bestapp | most accurate app config achieving required speedup |
| | default | the default config of application or system |
| | r | computation rate |

TABLE 4-continued

Notation used in describing the JouleGuard architecture 1800.

| | Symbol | Meaning |
|---|---|---|
| | p | power consumption |
| | α | accuracy |
| | s | speedup |
| | f | factor by which to decrease energy consumption |
| | W | application workload |
| | E | energy budget |
| | $v_{sys}$ | represents variable v in system config sys |
| | $v_{app}$ | represents variable v in application config app |
| | $\bar{v}$ | represents a measured value of variable v |
| | $\hat{v}$ | this symbol represents an estimated value of variable v |
| | v(t) | this denotes the value of v at time t |
| Learning | α | |
| | x | parameters balancing exploration and exploitation |
| Control | ρ | |
| | pole | pole of control system |
| | error | difference between required speed and current speed |
| | δ | multiplicative error in learned models |
| | C(z) | Z-transform of the controller |
| | A(z) | Z-transform of the application |
| | z | unit delay operator |

Table 4 summarizes the notation used to describe the JouleGuard architecture 1800. The table has three parts. One contains general notation that is used in this description. The other two contain notation specific to either the learning or control pieces. As shown in the table, the measured, estimated and true values of variable v are respectively distinguished as $\bar{v}$, $\hat{v}$, and v. Subscripts refer to the variable's value in different configurations of the application or system. Parenthetical notation is used to refer to values at particular times.

Now, and embodiment of the SEO 1810 is described. The JouleGuard architecture 1800 can use reinforcement learning to identify the most energy efficient system configuration, employing a bandit-based approach. The system configurations are modeled as arms in a multi-armed bandit (e.g., essentially levers in different slot machines). The reward for pulling an arm is the energy efficiency of that configuration. The goal is to quickly determine which arm (configuration) has the highest energy efficiency. This is straightforward given the convex hull in the configuration trade-off space provided by the performance model. Further, feedback of the performance and power while the system is executing the application can be used to refine the configuration and schedule in real time. For example, the Joule-Guard architecture 1800 can estimate system configuration sys's energy efficiency by estimating performance and power $\hat{r}_{sys}(t)$ and $\hat{p}_{sys}(t)$ using exponentially weighted moving averages:

$$\hat{p}_{sys}(t)=(1-\alpha)\cdot\hat{p}_{sys}(t-1)+\alpha\cdot\bar{p}_{sys}(t)$$

$$\hat{r}_{sys}(t)=(1-\alpha)\cdot\hat{r}_{sys}(t-1)+\alpha\cdot\bar{r}_{sys}(t)$$

Empirically, it has been observed that α=0.85 provides good outcomes on average across all applications and systems described herein.

In a typical bandit problem without a performance model obtained from the server 110, the initial estimates might be random values. This is not a good choice for estimating performance and power because a general trend indicates that both power and performance tend to increase with increasing resources. Therefore, in this case, the JouleGuard architecture 1800 can initializes its performance and power estimates so that the performance increases linearly with increasing resources and power increases cubically with increasing clockspeed and linearly with other resources. This is an overestimate for all applications, but it is not a gross overestimate. Such an initialization performs exceedingly well in practice.

Generally, the performance model obtained from the server 110 can be used to provide a better model of changes in performance and power consumption as a function of the configuration.

The final component of a bandit solution is balancing exploration (i.e., trying different configurations) and exploitation (i.e., making use of the best configuration found so far). In addition, JouleGuard architecture 1800 can be reactive to changes caused by application-level adaptation. Therefore, JouleGuard architecture 1800 can explore the system configuration space using a combination of the obtained performance model and Value-Difference Based Exploration. VDBE balances exploration and exploitation by dynamically computing a threshold, $\epsilon(t)$ where $0 \leq \epsilon(t) \leq 1$.

In certain implementations, when selecting a system configuration, JouleGuard architecture 1800 generates a random number rand ($0 \leq$ rand$<1$). If rand$<\epsilon(t)$, JouleGuard architecture 1800 selects a random system configuration. Otherwise, JouleGuard architecture 1800 selects the most energy efficient configuration found so far. $\epsilon$ is initialized to 1 and updated every time the runtime is invoked. A large difference between the measured efficiency $\bar{r}_{sys}(t)/\bar{p}_{sys}(t)$ and the estimate $\hat{r}_{sys}(t)/\hat{p}_{sys}(t)$ results in a large $\epsilon$, while a small difference makes $\epsilon$ small. At each iteration of the runtime $\epsilon(t)$ is updated according to $$x(t) = \exp\frac{-\left|\alpha\left(\frac{\bar{r}_{sys}(t)}{\bar{p}_{sys}(t)} - \frac{\hat{r}_{sys}(t)}{\hat{p}_{sys}(t)}\right)\right|}{5}$$

$$\rho(t) = \frac{1-x(t)}{1+x(t)}$$

$$\epsilon(t) = \frac{1}{|Sys|} \cdot \rho(t) + \left(1 - \frac{1}{|Sys|}\right) \cdot \epsilon(t-1).$$

The constants in the above equations are non-limiting representative values, and other values are contemplated. If the random number is below $\epsilon(t)$, JouleGuard architecture 1800 selects a random system configuration. Otherwise, JouleGuard architecture 1800 searches for the system configuration with the highest estimated energy efficiency, as given by $$\text{best } sys = \underset{sys}{\text{argmax}} \left\{ \frac{\hat{r}_{sys}(t)}{\hat{p}_{sys}(t)} \middle| sys \in Sys \right\}.$$

The JouleGuard architecture 1800 then puts the system into this configuration and uses the expected performance and power consumption to perform application accuracy optimization.

In certain implementations, the selection of an updated configurations can be based on the performance model, e.g., using a gradient search, a genetic algorithm, simulated annealing algorithm, or other optimization search method.

The bandit-based approach has the beneficial property that when the system models are correct $\epsilon(t)=0$, JouleGuard architecture 1800 will cease to randomly explore the space (i.e., JouleGuard architecture 1800 will not use a random configuration after it has learned accurate models). If the system is disturbed in anyway, or the application has an unexpected impact on system performance and power, the models will be inaccurate and $\epsilon(t)$ will increase, so JouleGuard architecture 1800 will likely explore new states to find more efficient configurations. This learning mechanism makes JouleGuard architecture 1800 extremely robust to external variations, but it is stable when the system does not vary.

Next, an embodiment of the AAO 1820 is described. Given the system configuration found based on the above update equations, JouleGuard architecture 1800 determines the application configuration that will meet the energy goal while maximizing accuracy. Given the system performance and power estimates determined by SEO 1810 and a factor f by which to decrease energy consumption, JouleGuard architecture 1800 can find the application configuration that provides a speedup, which is given by $$s(t) = f(t) \cdot \frac{\hat{r}_{default}}{\hat{p}_{default}} \cdot \frac{\hat{p}_{bestsys}(t)}{\hat{r}_{bestsys}(t)}$$

The difficulty is that ensuring energy requires that JouleGuard architecture 1800 maintains this performance despite unpredictable events, temporary disturbances, or unmodeled dependences between application configuration and system power consumption. Therefore, JouleGuard architecture 1800 continually adjusts the speedup applied as a function of time t. JouleGuard architecture 1800 models the problem of meeting speedup s as a control problem and minimizes the error error(t) between the measured performance $\bar{r}(t)$ and the required performance $r(t)=f(t)\cdot\hat{r}_{bestsys}(t)$ at time t (i.e., error $(t)=r(t)-\bar{r}(t)$).

Maintaining performance despite dynamic environmental changes is a classical control problem; many cross-layer approaches incorporate control for this reason. JouleGuard architecture 1800 builds on these examples, formulating a proportional integral (PI) controller eliminating error (t), which is given by $$s(t) = s(t-1) + \frac{(1-\text{pole}(t))\cdot \text{error}(t)}{\hat{r}_{bestsys}(t)},$$

wherein s(t) is the speedup required beyond $\hat{r}_{bestsys}$, and pole(t) is the adaptive pole of the control system, which determines the largest inaccuracy in the system model that JouleGuard architecture 1800 can tolerate while maintaining stability and ensuring that the energy goal is met. While many systems use control, JouleGuard architecture 1800's approach is unique in that the controller constantly adapts its behavior to account for potential inaccuracies introduced by the learning mechanism.

The formal mechanism that sets the pole is discussed in below. Intuitively, control techniques make it possible to determine how inaccurate the models can be and still stabilize at the goal (i.e., meet the target energy while avoiding oscillations. The learning system used in SEO 1810 is constantly measuring the inaccuracy between its models and the actual performance and power. JouleGuard architecture 1800 uses this measured difference to set the pole. When the difference is large, the controller acts slowly, avoiding oscillations and allowing SEO 1810 to learn independently of any application changes. When the system model inaccuracy is low, the pole is small and the controller works quickly.

In summary, JouleGuard architecture 1800 determines the application configuration by measuring the performance at time t, computing the error between the required and measured performance, then computing a speedup s(t). JouleGuard architecture 1800 then searches application configurations on the Pareto-optimal frontier of performance and accuracy tradeoffs to select the highest accuracy configuration delivering that speedup, which is given by $$bestapp = \underset{app}{\operatorname{argmax}}\{a_{pp} \mid s_{app} > s(t) \wedge app \in A\}.$$

The control system of the JouleGuard architecture 1800 provides formal guarantees of energy consumption. First, it can be shown that the control system converges to the desired speedup. This can be done through standard analysis in the Z-domain.

The Z-transform of the application is simply $$A(z) = \frac{\hat{r}_{bestsys}}{z}.$$

The Z-transform for the control system's transfer function is $$C(z) = \frac{(1 - \text{pole})z}{(z - 1)}.$$

Therefore, the transfer function of the closed loop system is:

$$F(z) = \frac{C(z) \cdot A(z)}{1 + C(z) \cdot A(z)}$$

$$= \frac{\frac{(1 - \text{pole})z}{(z - 1)} \cdot \frac{\hat{r}_{bestsys}}{z}}{1 + \frac{(1 - \text{pole})z}{(z - 1)} \cdot \frac{\hat{r}_{bestsys}}{z}}$$

$$= \frac{1 - \text{pole}}{z - \text{pole}}.$$

Following standard control analysis, the system's stability and convergence to the goal can be evaluated. The system is stable—in the control theoretic sense that it will not oscillate around the goal—if and only if 0≤pole<1. Therefore, pole is chosen to meet these restrictions. Furthermore, the system is convergent, meaning that when it stabilizes error(t)=0 if and only if F (1)=1. Based on the above equations, it can be observed that this condition is clearly met. Therefore, it can be conclude that the control system is stable and convergent. These guarantees, however, are based on the assumption that $\hat{r}_{bestsys}$ is an accurate estimate of the performance delivered in bestsys. In the next section, it is discussed how to ensure stability even when the estimate is inaccurate (as it likely is at system initialization).

The controller's robustness to inaccurate estimates of $\hat{r}_{bestsys}$ is determined by analyzing the above equations. Suppose the estimate is incorrect and the true value is $r_{sys}=\delta\hat{r}_{sys}(t)$ where δ is a multiplicative error in the estimation. For example, δ=5 indicates that model is off by a factor of 5. It can be determined that the robustness to these inaccuracies of the JouleGuard architecture 1800 by substituting $\delta\hat{r}_{sys}$ into F(z) to generate $$F(z) = \frac{C(z) \cdot A(z)}{1 + C(z) \cdot A(z)}$$

$$= \frac{\frac{(1 - \text{pole})z}{(z - 1)} \cdot \frac{\delta\hat{r}_{sys}}{z}}{1 + \frac{(1 - \text{pole})z}{(z - 1)} \cdot \frac{\delta\hat{r}_{sys}}{z}}$$

$$= \frac{(1 - \text{pole})\delta}{z + (1 - \text{pole})\delta - 1}.$$

So, pole determines how robust JouleGuard architecture 1800 is to model inaccuracies. For example, F(z) pole=0.1 implies that $\hat{r}_{sys}(t)$ can be off by a factor of 2.2 and JouleGuard architecture 1800 will still converge.

To provide convergence guarantees—and, thus, energy guarantees—JouleGuard architecture 1800 sets the pole to provide stability and avoid the oscillations seen in the swish++ example for the uncoordinated approach. JouleGuard architecture 1800 has a bound on model inaccuracies as it is constantly updating its estimates of system performance using. Thus, JouleGuard architecture 1800 computes δ(t), the multiplicative inaccuracy at time t as:

$$\delta(t) = \frac{\bar{r}(t)}{\hat{r}_{sys}(t - 1)}$$

and computes the pole as:

$$\text{pole}(t) = \begin{cases} \delta(t) > 2: & 1 - 2/\delta(t) \\ \delta(t) \leq 2: & 0 \end{cases}.$$

This is one non-limiting representative example of a choice for the pole. Other methods of determining the pole are contemplated. The JouleGuard architecture 1800 can automatically adapt the pole so that the controller is robust to inaccuracies in the system models. In practice, the pole is large when the learner is unsure and likely to randomly explore the space. This means that the controller will be slow to change configurations when the learner is aggressive. In contrast, when the learner converges, δ(t) is low and the controller can be more aggressive. This adaptive pole placement combined with machine learning is the unique feature of JouleGuard architecture 1800, which distinguishes it from prior approaches and allows JouleGuard architecture 1800 to split the energy guarantee problem into two subproblems yet still provide robust guarantees.

A user may request an energy goal that is impossible to meet given the application and the system. In this case, JouleGuard architecture 1800 reports that the goal is infeasible and then configures the application and system to provide the smallest possible energy consumption.

The runtime of the JouleGuard architecture 1800 is summarized in Table 5. This algorithm is implemented through a straightforward coding of the math described above and summarized in the algorithm listing. Two requirements are (i) measuring feedback and (ii) configuring the application and system. These are interface issues rather than technical issues. JouleGuard architecture 1800 can be supplied a function that reads performance and power. Any performance metric can be used as long as it increases with increasing performance.

TABLE 5

Algorithm for control of JouleGaurd architecture 1800.

Require W          Workload provided by user
Require E          Energy budget provided by user
loop
Measure work done W(t) and energy consumed E(t).
Measure performance r̄(t) and power p̄(t) in configuration c.
Update performance and power estimates $\hat{r}_c$ and $\hat{p}_c$:
$\hat{p}_c(t) = (1-\alpha)\cdot\hat{p}_c(t-1)+\alpha\cdot\bar{p}_c(t)$
$\hat{r}_c(t) = (1-\alpha)\cdot\hat{r}_c(t-1)+\alpha\cdot\bar{r}_c(t)$
Update $\epsilon(t)$:

$$\epsilon(t) = \frac{1}{|Sys|}\cdot\rho(t) + \left(1 - \frac{1}{|Sys|}\right)\cdot\epsilon(t-1).$$

Generate random number rand
if rand < $\epsilon(t)$ then
Select random system configuration
else
Select energy optimal system configuration sys:

$$sys = \underset{sys}{\mathrm{argmax}}\left\{\frac{\hat{r}_{sys}(t)}{\hat{p}_{sys}(t)} \,\middle|\, sys \in Sys\right\}.$$

endif
Compute the controller's pole $$\delta(t) = \frac{\bar{r}(t)}{\hat{r}_{sys}(t-1)}$$

$$\mathrm{pole}(t) = \begin{cases} \delta(t) > 2: & 1 - 2/\delta(t) \\ \delta(t) \leq 2: & 0 \end{cases}.$$

Compute remaining energy and work.
Use those values to compute speedup target:

$$s(t) = f(t)\cdot\frac{\hat{r}_{default}}{\hat{p}_{default}}\cdot\frac{\hat{p}_{bestsys}(t)}{\hat{r}_{bestsys}(t)}.$$

Compute speedup control signal:

$$s(t) = s(t-1) + \frac{(1-\mathrm{pole}(t))\cdot\mathrm{error}(t)}{\hat{r}_{bestsys}(t)}$$

Select the application configuration to deliver speedup:

$$app = \underset{app}{\mathrm{argmax}}\{a_{app} \mid s_{app} > s(t) \wedge app \in A\}.$$

end loop

Table 5 shows pseudocode for an algorithm to control the JouleGuard architecture 1800, according to one implementation. A user may request an energy goal that is impossible to meet given the application and the system. In this case, JouleGuard architecture 1800 reports that the goal is infeasible and then configures the application and system to provide the smallest possible energy consumption.

Similarly, power can be read from an external power monitor or from modern hardware devices that support on-board power measurement. Prior work defined a general interface for specifying system-level configurations. A straightforward extension of this interface supports application configuration changes as well. Given these interfaces, the JouleGuard architecture 1800 is implemented as a C runtime that can be compiled directly into an application. It can replace existing runtime systems for approximate applications, or it can convert a statically configured approximate application into one dynamically configurable to meet energy goals.

JouleGuard architecture 1800 does not require precise quantification of application accuracy, rather it requires an ordering on application configurations. Many frameworks provide precise accuracy quantification, others do not and some leave it to the programmer. Approaches that do not precisely quantify accuracy still order configurations, but the order represents preferences rather than absolute numerical differences. JouleGuard architecture 1800 does not need a precise value for accuracy. The only place it reasons about accuracy is in the equation to calculate bestapp when selecting an application configuration. This equation only requires a total order on available configurations. Thus, JouleGuard architecture 1800 is compatible with a wide range of approximate approaches.

The implementations described above have assumed that all accuracy tradeoffs occur at the application level. In additional implementations, it is proposed that the approximate hardware reduces energy consumption in exchange for occasionally returning an inexact result. In most cases, these approximate hardware units maintain the same timing, but reduce power consumption. For those cases, it is straightforward to modify the above control system to work with approximate hardware. The learning engine can be used to find the most energy efficient system configuration that sacrifices no accuracy (this step is the same as the above). The JouleGuard architecture 1800 is then modified such that the control system to manage power (rather than speedup) by tuning hardware level approximation. The approach is similar, but the controller would reduce power instead of increase performance. Yet another issue is to coordinate approximate applications with approximate hardware. Such a combination requires a modification of JouleGuard architecture 1800 to handle the fact that both layers affect accuracy.

Now, a non-limiting example is described to illustrate what is meant by maximizing an approximate application's accuracy for an energy budget. First the problem is framed in terms of a mathematical optimization. Descriptions are provided regarding 1) application-only, 2) system-only, and 3) cross-layer solutions.

It is assumed that the application performs some set amount of work W. The total work does not change, but the application can do this work faster or slower by changing its accuracy. For example, a video encoder encodes an entire video, but can use different algorithms that changes the encoding time and the noise in the output. It can be assumed that an energy budget E represents the energy specified by a user to perform the work W. Therefore, the system can be configured to ensure that the work is completed within the energy budget and accuracy is maximized.

It can be assumed that an approximate application 1840 with a set of configurations $C_A$, where each configuration $k \in C_A$ represents a unique performance $r_k$ and accuracy $a_k$. It can be assumed that $a_c$ is a relative metric rather than absolute—many standard metrics for representing how far approximate applications 1840 are from a nominal behavior apply. An energy-aware system 1830 can have configurations $c_s$, where each configuration $k \in C_S$ has performance $r_k$ and power consumption $p_k$.

In certain applications, it is not assumed that the application and system are independent. Instead, it is not assumed that changing either application or system may have unmodeled effects on the other. For example, changing application accuracy may change system power consumption. Similarly, changing system performance may have an unknown effect on the performance of different application configurations. Thus, a goal is to obtain a solution that is robust despite these unmodeled dependences.

In certain implementations, the following accuracy optimization problem with constrained work and time maximizes accuracy given an energy budget:

$$\text{maximize} \sum_c t_{\langle app, sys \rangle} \cdot a_{\langle app, sys \rangle}$$

subject to $$\sum_c t_{\langle app, sys \rangle} \cdot p(app, sys) \leq E$$

$$\sum_c t_{\langle app, sys \rangle} \cdot r(app, sys) = W$$

$$0 \leq t_{\langle app, sys \rangle} \text{ for } app \in C_A \text{ and } sys \in C_S$$

$$t_{\langle app, sys \rangle} \geq 0$$

Here a (app, sys), p(app, sys), and r(app, sys) are (possibly) non-linear functions representing the accuracy, power, and performance of the combination of application configuration $app \in C_A$ and $sys \in C_S$. the constrained accuracy optimization problem schedule times $t_{(app, sys)}$ to spend in the configuration ⟨app, sys⟩. The above equations maximize accuracy, the while ensuring that the energy budget is not exceeded, that the work is completed within the allotted time, and that the times are non-negative. Further, the above equations represent a non-linear optimization problem. This non-linearity distinguishes the energy guarantee problem from prior work that provides performance guarantees, formulated as a linear program. While the JouleGuard architecture 1800 adopts an approach of splitting the optimization problem into application and system components, the approach differentiates over previous approaches in part because the approach herein adopts novel solutions to these subproblems to provide energy guarantees.

As described herein, several possible solutions exist to the constrained accuracy optimization problem. The first considers only application-level configurations, the second considers only system-level configurations, and the third considers cross-layer approaches coordinating application and system.

Considering only application-level optimization, a solution can be obtained using a single system configuration with a single power consumption $p_s$. Thus, it is trivial to solve the constrained accuracy optimization problem. Since power cannot change, energy will be reduced by completing the work in the shortest amount of time possible. Therefore, the optimal accuracy solution will be the one that lets $t_{(app, s)} \cdot p_s = E$.

Therefore, $r_{app} = p_s \cdot W/E$. So, the solution is to set the application in the highest accuracy configuration that achieves a computation rate of at least $p_s \cdot W/E$. This can be achieved using the performance model obtained from the server 110.

In a system-only implementation, the solution cannot alter application behavior. Instead, they work on performance and power tradeoffs. In this case, accuracy is not a variable, so every feasible solution to the constraints optimization problem is equivalent. Thus, a system-only approach can solve this problem as long as there is a system configuration s such that $r_s/p_s \geq W/E$. In other words, a system-only approach works if there is a configuration whose energy efficiency is greater than or equal to W/E. Without such a configuration, then the problem has no feasible solution.

A coordinated, cross-layer approach selects both application and system configuration. The true optimal solution requires knowledge of all combinations of application and system performance, power, and accuracy as well as a solution to the non-linear optimization problem.

Now, the solution is provided for the case when the application and system were independent. As shown above, the system does the most work for an energy budget when running in its single most energy efficient state:

$$\text{i.e., } \sum_c t_c \cdot p_c = E.$$

By the theory of mathematical optimization, an optimal solution to the constrained accuracy optimization problem lies on the polytope of feasible solutions. For the constrained accuracy optimization problem, this property implies that the optimal solution occurs when there is strict equality in the equation for the energy, $$sys = \underset{c}{\text{argmax}}\{r_c / p_c \mid c \in S\}.$$

Combining the above expression, it can be observed that $t_{sys} = 1.0$ $t_c = 0 \forall c \neq sys$ and $t_{sys} = E/p_{sys}$. To satisfy the work constraint, the application and system must work at a combined performance of r. If the speedup of the approximate application 1840 is denoted as $s_{app}$, then it can be written that $r = s_{app} \cdot r_{sys}$; i.e., the work rate is the product of the system's computation rate and the speedup provided by adapting the application.

Accordingly, by solving for an $s_{app}$, it can be shown that the work gets done and that accuracy is maximized. Further, by substituting r and $t_{sys}$ into the above equations, it can be shown that $$t_{sys} \cdot r = W$$

$$E/p_{sys} \cdot s_{app} \cdot r_{sys} = W, \text{ and}$$

$$s_{app} = \frac{W \cdot p_{sys}}{E \cdot r_{sys}}.$$

Therefore, the application can be configured to satisfy $$app = \underset{c}{\text{argmax}}\left\{a_c \mid s_c \geq \frac{W \cdot p_{sys}}{E \cdot r_{sys}} \wedge c \in A\right\}.$$

Thus, a solution is obtained to the problem of coordinating application and system to maximize accuracy on an energy budget by putting the system in its most energy efficient configuration, and then configuring the application to achieve the necessary additional speedup.

Two conclusions can be drawn from the above analysis. First, the optimization problem has a unique structure making it tractable despite the huge space that can arise from combining application and system configurations. Second, it is possible to decompose the problem into two dependent but simple sub-problems. The first sub-problem is to find the most energy efficient system configuration. The second sub-problem is to use the solution to first find an application configuration. This structure can be used with a runtime algorithm implementing the optimization that can be split into two communicating components: one that solves the above equation for sys and one that solves the above equation for app.

There are benefits to proactively coordinating the application and system rather than having the application or system react to changes in the other. Application or system only approaches miss potential multiplicative (e.g., non-linear) benefits. Coordination can be used to extract a maximum benefit from the system before altering the application, producing equivalent or better accuracy than application or system configuration alone. The performance model obtained from the server 110 enables improved coordination of the application and system to obtain the optimal combination.

This analysis assumes that the application speedup and system power were independent. That assumption might not hold at runtime. A runtime system that implements this model will both solve the optimization problem and account for any runtime changes in application and system behavior in order to maintain guarantees despite the simplifying assumptions made in this section.

Now, an example illustrating the benefits of the Joule-Guard architecture 1800 is provided. This example demonstrates the challenges of maximizing accuracy on an energy budget and illustrates the formal analysis provided above. This example considers a document search application using an approximate version of the open-source swish++ search engine, which varies the number of documents it returns per query. In this example. the search engine is executed on a server platform which supports several configurations controlling tradeoffs between power and performance.

Next a non-limiting example is provided using illustrative numbers and using a swish++ algorithm. The swish++ algorithm is configured as a web server, and is deployed on a system with 32 threads. Further, the search is performed using public domain books from Project Gutenberg as the search documents. For search queries, a dictionary is constructed of all words present in the documents, excluding stop words, and words are selected at random following a power law distribution. The search performance and the total system power consumption are measured with the application in its default (full accuracy) configuration using all system resources. In this default configuration, swish++ processes 3100 queries per second (qps) at an average power consumption of 280 Watts, or 0.09 Joules per query.

For this example, the desired reduction to the energy consumption is ⅓ to achieve an energy consumption of 0.06 Joules per query (the full evaluation tests a wide range of energy goals). This energy could be achieved with a 50% performance increase, a 33% power decrease, or by some combination of the two. The primary challenge is determining which combination will result in the highest application accuracy.

Naively, it might be tempting to start with approaches that provide other guarantees and see if small changes can provide energy guarantees. For example, here various modified approaches are considered, including, (i) modifying a system-level approach, (ii) modifying an application-level approach, and (iii) an uncoordinated combination of the application and system-level approaches. All three of these can be improved by using the JouleGuard Architecture 1800. The behavior of all four approaches can be observed in FIG. 19.

Figure 19:
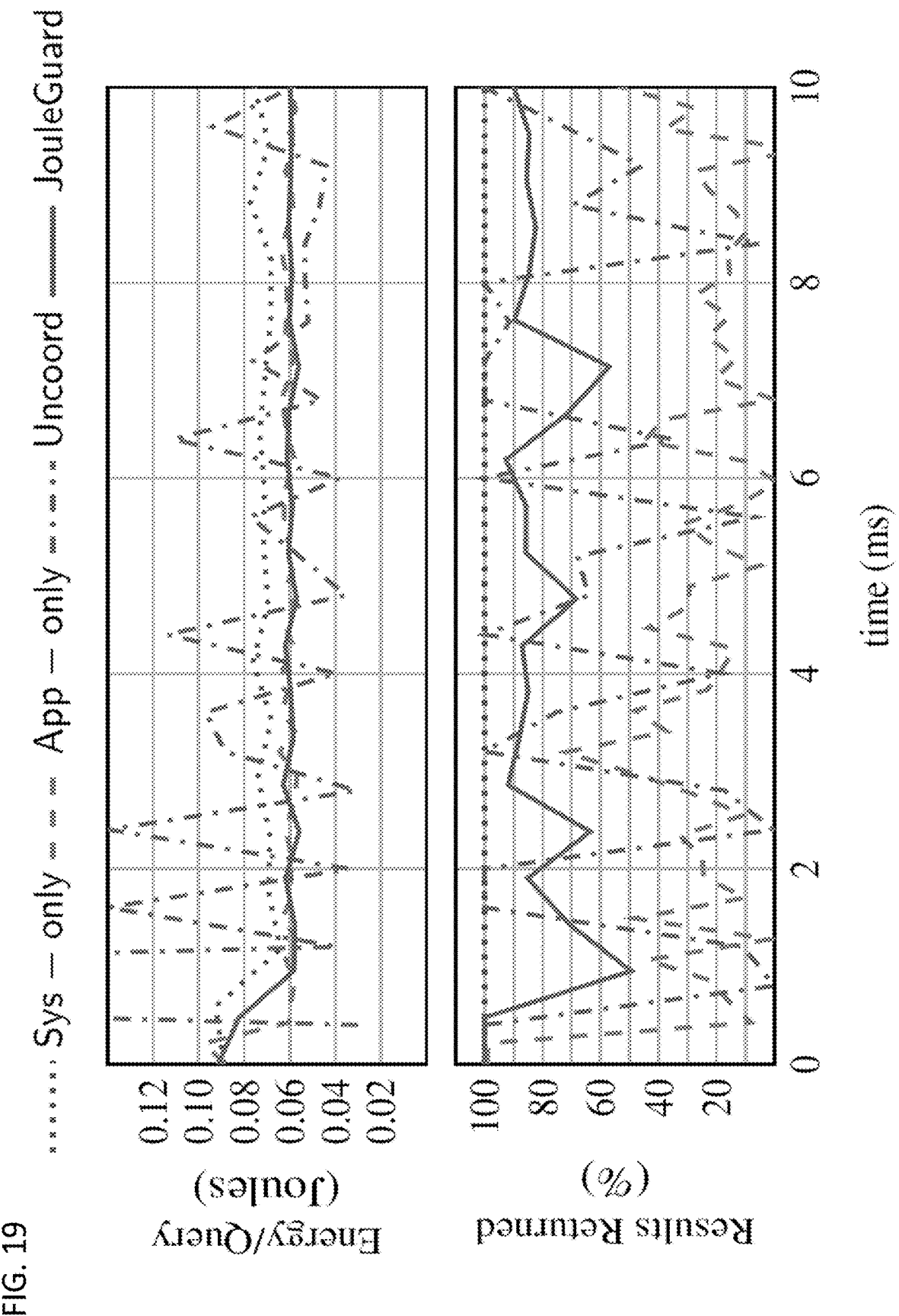
FIG. 19 shows a plot of simulation results for energy and percentage of returned results using various control methods compared to the JouleGuard architecture, according to one implementation.

The system can change swish++'s resource allocation to reduce energy consumption. A system-level approach that provides energy guarantees for individual system components satisfies some but not all of the desired objectives. For example, in such a system-level approach, it is a user's responsibility to request energy from individual components such that the total system energy respects the guarantee. To provide an overall system energy guarantee users must know precisely how much energy to request from each component and how much performance they will get from that combination. Thus, to determine the best overall configuration on the desired system, a performance model representing the best configurations of the entire configuration space is needed to determine if there is a configuration (e.g., a combination of cores, clockspeed, hyperthreading, and memory controllers) that meets the energy goal. In various implementations, this is provided by the performance model obtained from the server 110. For the application swish++ the best configuration happens to process 1750 qps at a cost of 125 Watts, or 0.07 Joules per query. This value is 20% higher than the goal, and this system-level approach results in no accuracy loss (as shown in FIG. 19).

The system-level approach has two drawbacks. First and foremost, it did not meet the goal. By itself, the system simply cannot reduce energy consumption to 0.06 Joules per query. Second, obtaining any energy reduction requires a tremendous knowledge of the system to request the best combination of different components. Second, obtaining any energy reduction relies on accurate knowledge of the system to determine the best combination of different components. In this example, the space is exhaustively searched. In practice, a more intelligent way to determine the system configuration is needed. As discussed above, the server 110 can generate an accurate estimate of the performance model for all configurations without performing an exhaustive search of the device configurations.

Formally, given a set of all system configurations, each of which can be identified as c, with performance $r_c$ and power consumption $p_c$ then the energy at the system level is minimized by selecting the most energy efficient configuration sys using the equation $$sys = \underset{c}{\mathrm{argmax}}\{r_c / p_c \mid c \in S\}.$$

Solving this equation is simple, if an accurate performance model, such as the performance model provided from the server 110, is available. However, a more robust solution can be obtained by using feedback and control to correct for deviations between the actual performance and the performance model. Also, as shown here, the best system configuration can be insufficient to achieve the desired goal. In which case, approximate computing can be relied on to make up for the deficiency.

Finding the system-level approach insufficient by itself to satisfy the goals for our needs, an approximate application is then used. Several application-level frameworks trade accuracy for other benefits. None provide formal energy guarantees, but PowerDial, e.g., guarantees performance. This performance guarantee combined together with the knowledge of the system's default power consumption can be used to meet the energy goal. For example, PowerDial can be operated at 4700 qps knowing the default power is 280 Watts. Doing so, 0.06 Joules per query is obtained, corresponding exactly with the desired goal, but at a high cost of accuracy loss. On average, each query returns 83% fewer results.

Given that each application has a set of configurations A, where each configuration has a speedup $s_c$ and accuracy $a_c$, and assuming the system's default configuration has performance $r_{default}$ and power consumption $p_{default}$, the default energy is improved by a factor f and the accuracy is maximized by finding an application configuration app as given by the expression $$app = \mathrm{argmax}_c \left\{ a_c \mid s_c \geq f \cdot \frac{r_{default}}{p_{default}} \wedge c \in A \right\}.$$

The application-level approach met the energy goal, but with high accuracy loss. The system-level approach shows there are more energy-efficient system configurations. It is tempting, then to combine these approaches and meet the energy goal by decreasing system power and increasing application performance. A straightforward approach uses the application and system-level solutions concurrently, but without any communication between the two. A challenge with this uncoordinated approach is that both the application and system act without knowledge of each other. The uncoordinated deployment of adaptive systems leads to instability and oscillatory behavior, even when the individual adaptive components are provably well-behaved. Indeed, this oscillatory behavior is illustrated in the uncoordinated approach, which is shown in FIG. 19.

Regarding the uncoordinated approach, to meet the energy goal of 0.06 Joules per query a performance goal of 2100 Queries/s and a power goal of 125 Watts (i.e., 0.06=125/2100) is set. If these goals were met, the achieved energy would be the desired 0.06 Joules per query. Instead, the instability of the uncoordinated approach leads to oscillatory behavior and the energy never converges. This oscillatory behavior results in an average performance of 2080 qps, an average power of 147 Watts, and an average return of 81% fewer results than the default. Rather than improving over application or system alone, the uncoordinated combination achieves the same energy efficiency as the system only approach with an accuracy loss close to the application-only approach. The intuition behind the oscillatory behavior is that both the application and system reason about performance under the assumption that no other actor is manipulating performance. When application and system act concurrently without knowledge of each other, this assumption is violated and instability occurs.

Rather than abandon the combination of the application and system approaches, the JouleGuard architecture 1800 actively coordinates the two. The coordinated approach of the JouleGuard architecture 1800 has been described above, but here the results for swish++ application are shown. As describe here, in certain implementations of the JouleGuard Architecture 1800, machine learning is used to find the most energy efficient system configuration, which provides the performance of 1750 qps at 125 Watts. Recall, this configuration resulted in 0.07 Joules per query, 20% above the target. Therefore, the JouleGuard architecture 1800 then uses control theory to speedup the application by an additional 20% to 2100 qps. Thus, the JouleGuard architecture 1800 hits the target of 0.06=125/2100 Joules per query—at a cost of 24% fewer results per query than the default setup of application and system.

Of all four approaches described herein, this coordinated one is clearly the best. It meets the energy goal while delivering the smallest possible loss in accuracy-a significant savings over the application-level approach.

Now, a summary is provided of several benefits of the JouleGuard architecture 1800. The JouleGuard architecture 1800 can be implemented using various programming languages (e.g., the programming language C), and it can be implemented on various hardware platforms having different configurations (e.g., a heterogeneous mobile processor, a tablet, and a server). Further, JouleGuard architecture 1800 adds only small overhead, in terms of both energy and performance. JouleGuard architecture 1800 can quickly converge to a given energy goal with low error. Additionally, on average, across all applications, all machines, and a number of energy goals, the JouleGuard architecture 1800 can dynamically adapt and maintains energy within a few percent of the goal. Further, the JouleGuard architecture 1800 can dynamically converge to the energy goals with near optimal accuracy. On average, for all applications, systems and goals, the JouleGuard architecture 1800 converges to within a few percent of true optimal accuracy. The JouleGuard architecture 1800 can provide greater accuracy than the best that could be achieved through either application approximation or system resource allocation alone. Moreover, the JouleGuard architecture 1800 quickly reacts to application phases, automatically increasing accuracy whenever the application workload changes.

In certain implementations, the JouleGuard architecture 1800 provides accuracy optimization under energy constraints. It provides energy guarantees. It maximizes accuracy on an energy budget by splitting the optimization problem into two sub-problems, i.e., finding the most energy-efficient system configuration and tuning application performance to provide additional energy savings while maximizing accuracy. Further, in these implementations, the JouleGuard architecture 1800 provides an approach for combining the solutions to these sub-problems. The JouleGuard architecture 1800 is robust and converges to the energy goals even when there are inherent dependences between application and the system. The JouleGuard architecture 1800 is the first method that simultaneously provides formal guarantees of energy consumption together with maximizing accuracy.

Now, a description is provided of the benefits of a combination of machine learning of a performance model at a server together with a control architecture of a device which uses the performance model obtained from the server. This discussion uses the example of using the control architecture of the POET architecture 1700 together with the performance model, but the method can also be used with the JouleGuard architecture 1800, as would be understood by a person of ordinary skill in the art.

Control theory is a general technique. However, implementations are problem-specific because traditional control design directly incorporates application- and system-specific models. For example, a controller that manages video encoding on a phone using processor speed will be of no use to a wireless receiver on an embedded system. This brittleness of control design is further exacerbated by growing application diversity and hardware complexity. For example, heterogeneous processors expose a huge range of performance and energy tradeoffs, which vary from application to application. Control theoretic libraries allow users to generate customized solution for specific applications and systems by providing models. While these approaches are a step in the direction of generality, they still require significant user input and prior knowledge of the application to be controlled. In contrast, the methods described herein provide the benefits of control theoretic techniques even for applications without providing models and with minimal inputs from users.

This is achieved by overcoming several challenges. For example, heterogeneous processor designs expose multiple resources that interact in complex ways, often leading to non-convex optimization problems. Further, limited resources can be devoted to exploring these tradeoff spaces, e.g., it is disadvantageous to expend more energy learning the tradeoff spaces than would be saved by knowing the tradeoff spaces. Additionally, it is beneficial to maintain the ability to formally reason about the controlled system's dynamic behavior despite working without a priori knowledge.

These challenges and goals are overcome and met by the methods described above and explained further now. The combined system of the learned performance model together with the POET architecture 1700 is referred to as the CALOREE system 2000, which stands for Control And Learning for Optimal Resource Energy and Efficiency. CALOREE system 2000 represents a unique combination of control theory and machine learning. CALOREE system 2000 dynamically manages resources for streaming applications to ensure their performance needs are met while minimizing their energy consumption.

Figure 20:
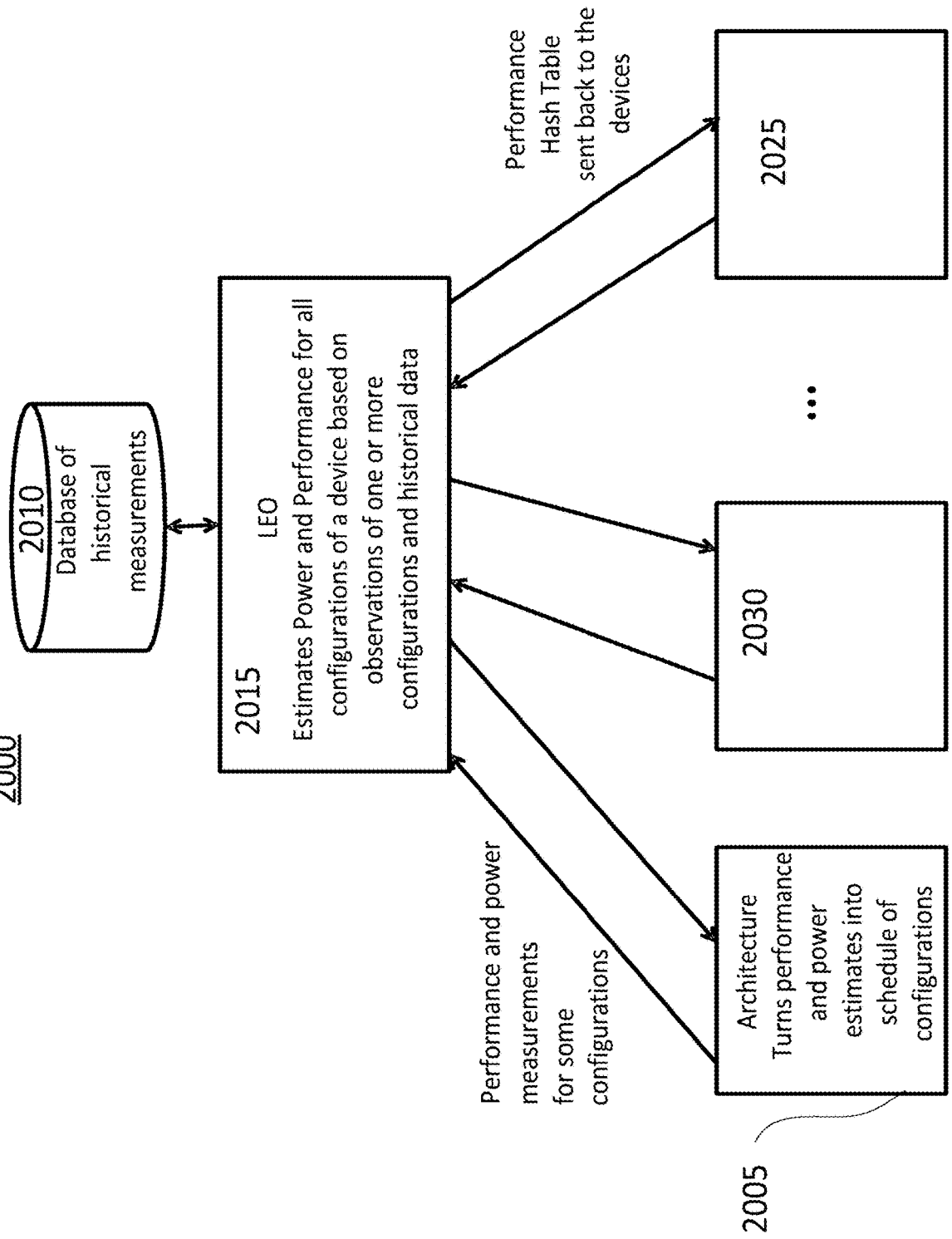
FIG. 20 shows a schematic diagram of a CALOREE system, according to one implementation.

FIG. 20 shows an implementation of CALOREE system 2000. CALOREE system 2000 has two components. The first component is a generalized control system (GCS) that runs on a device 2005, which can be, e.g., an embedded or mobile device, and the GCS manages resources. The second component uses machine learning (e.g., hierarchical Bayesian model (HBM)) executed on a remote server 2015. When the GCS encounters a new application, it takes a small sample of the performance and energy in different resource configurations and sends those samples to the server 2015, which executes a learning algorithm to learn the statistically most likely power consumption and performance metrics for the remaining untested configuration based on a comparison with a database 2010 of previous measurements including previous measurements from various devices executing assorted applications. These various devices can include device 2005, device 2015 and device 2030, for example. The learning algorithm on the server 2015 can be any machine learning algorithm, including an algorithm referred to as Learning for Energy Optimization (LEO) algorithm, which uses an HBM to learn estimates of the power and performance for all configurations of the device 2005 when executing the current application. Although other implementations are possible, the non-limiting example described herein specifically uses an HBM learning method. The HBM aggregates samples across devices and applications to produce an estimate of the performance and energy tradeoffs of each application and device. This estimate is stored in a performance hash table (PHT) that is sent to the GCS, which uses it to control its local application.

Additionally, in certain implementations, the HBM sends the GCS each application's estimated variance so that the controller can tune its behavior not just to the model, but also to the potential range in the model's output.

The CALOREE system 2000 beneficially addresses the three challenges listed above. An HBM, such as the LEO algorithm, is well-suited to learning non-convex optimization spaces that arise in systems with many configurable resources, addressing the complexity challenge. The HBM can, however, use significant computational resources both in terms of the number of computational operations and storage in order to store sufficient samples of several different applications to produce accurate models. Therefore, the HBM is best performed using a server or cloud computing, rather than on a mobile device, which has much more limiting power and storage constraints. Accordingly, in the CALOREE system 2000 the learning operations are off-loaded to a remote server to address overhead challenges. Finally, because the HBM communicates the model's variance, it is possible to derive probabilistic control theoretical guarantees. These are not quite as strong as traditional control theoretic guarantees that assume the model is fixed and known, but they still provide some mechanisms for formal reasoning. While a traditional control system guarantees convergence, the CALOREE system 2000 allows the user to specify a lower bound on the probability that the system will converge to the desired performance. For example, a user can specify that the system will converge with at least 95% probability.

Next a non-limiting example is provided to illustrated an implementation of the CALOREE system 2000 and to demonstrate its ability to control streaming applications on heterogeneous ARM big.LITTLE devices, with the HBM implemented on an x86 server. This implementation is then compared to other state-of-the-art learning and control systems. The CALOREE system 2000 is also tested in both single-app and multi-app environments. In single-app environments, the streaming application runs by itself. In multi-app environments, other applications unpredictably enter the system and compete for resources. Overall, it is observed that the CALOREE system 2000 achieves more reliable performance than previous methods, and achieves more energy savings than previous methods.

Regarding the reliable performance of the CALOREE system 2000, in the single-app case, all methods achieve average performance close to the requirement. However, the CALOREE system 2000's worst case performance is still within 4% of the target, while prior techniques achieve worst case performance between 28% to 75% lower than the requirement. In the multi-app case, prior learning approaches average at least 10% performance error, prior control approaches average 5% error, and the CALOREE system 2000 achieves just 2.7% average error, which is almost half the next best competitor. All prior approaches have a worst case performance at least 70% below the target, while the CALOREE system 2000's worst case performance is within 13% of the target.

Regarding the energy savings of the CALOREE system 2000, in the single-app case, the CALOREE system 2000 reduces average energy by 23-47% compared to prior learning approaches and by 24% compared to prior control approaches. For the most complicated applications, the CALOREE system 2000 provides energy savings of more than 2 times compared to the best prior approaches. In the multi-app case, the CALOREE system 2000 reduces average energy by 31% compared to prior control approaches and by 8% compared to prior learning approaches. While, the savings compared to learning approaches may look small, in this case the learning approaches are saving energy by missing their performance goal.

The CALOREE system 2000 is compared to a control system with rigorous a priori per application models—including models of application interference in the multi-app case—something that would be impractical to deploy in the real world. It is observed that CALOREE's average performance error across all cases is only 2% worse than this ideal controller and its average energy is only 7.5% higher. This result shows that the CALOREE system 2000 provides a considerable increase in generality with only minor reductions in performance and energy.

In summary, control theoretic approaches are well suited to manage resources in dynamic environments and machine learning techniques can produce accurate models of complex processors. The methods described herein uniquely combine control theoretic approaches with machine learning techniques in order to generate a solution that at runtime controls resource usage for a streaming application with no prior knowledge.

Figure 21A:
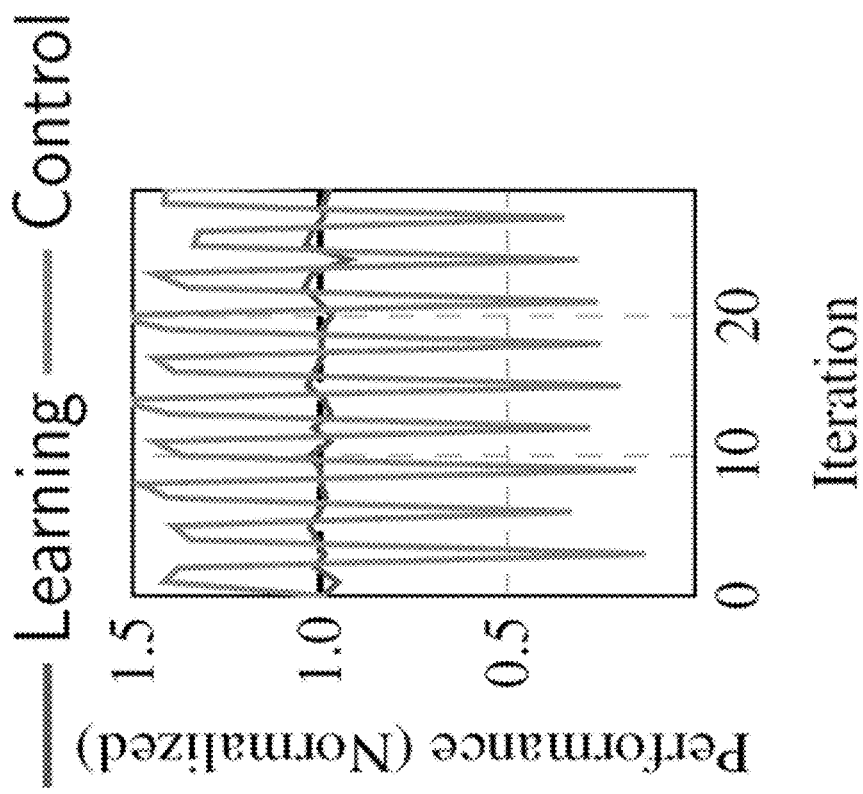
FIG. 21A shows plot of performance as a function of configuration for a device having an ARM big.LITTLE architecture that is executing a Lavamd application.
Figure 21B:
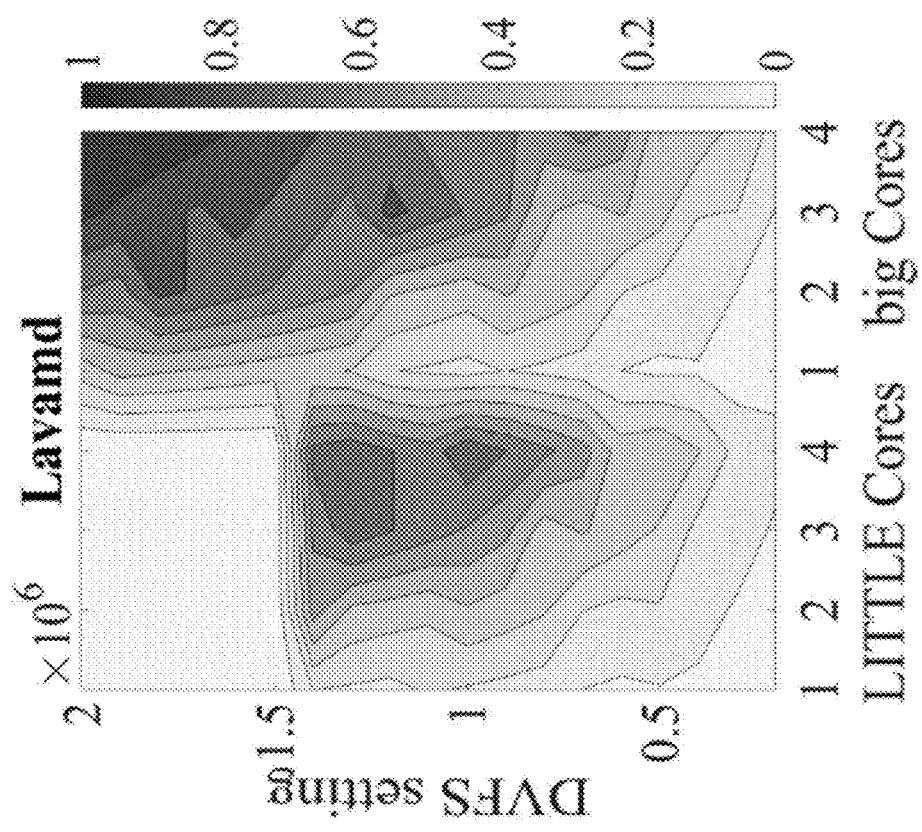
FIG. 21B shows plot of performance as a function of time for a device having an ARM big.LITTLE architecture that is executing the Lavamd application and that is selecting the configuration on the basis of a learning method or a control method.
Figure 22A:
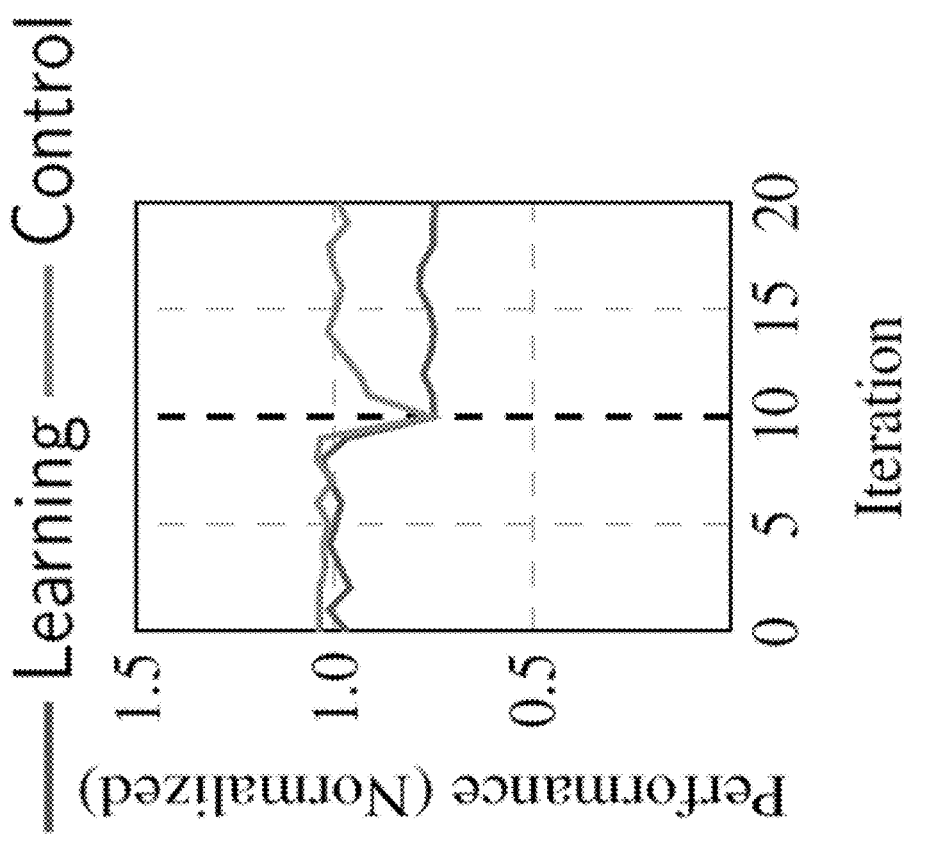
FIG. 22A shows plot of performance as a function of configuration for a device having an ARM big.LITTLE architecture that is executing a Kmeans application.
Figure 22B:
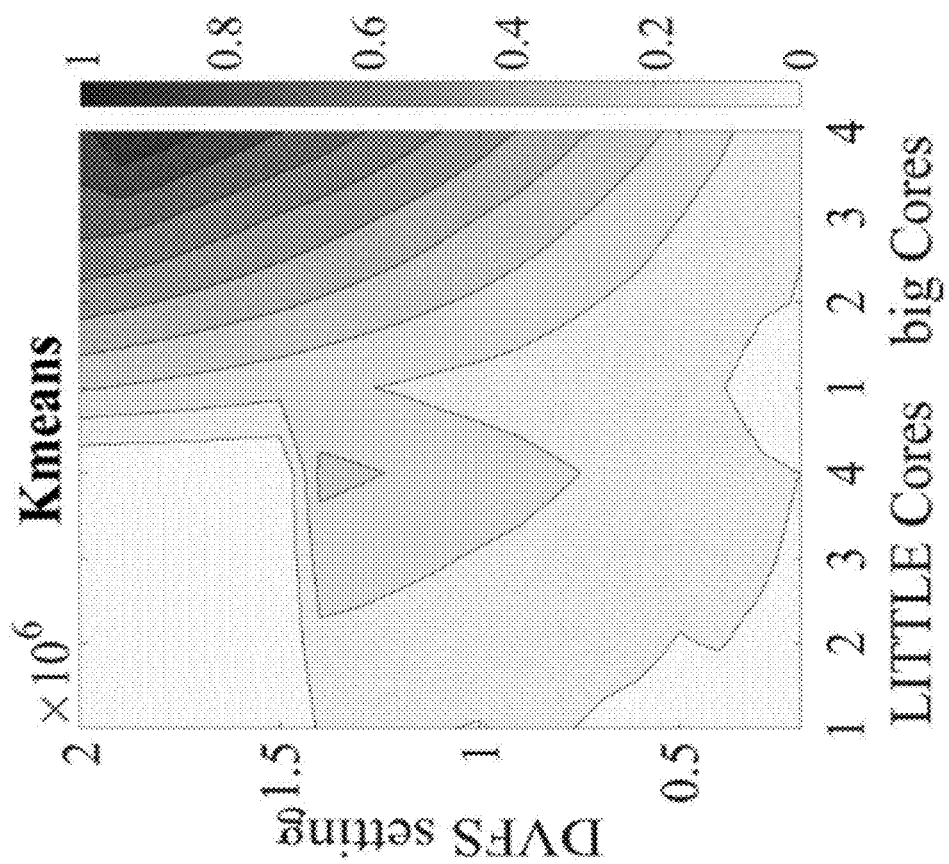
FIG. 22B shows plot of performance as a function of time for a device having an ARM big.LITTLE architecture that is executing a Kmeans application and that is selecting the configuration on the basis of a learning method or a control method.

The non-limiting examples illustrated in FIGS. 21A, 21B, 22A and 22B and described here present two simple examples to illustrate the complementary strengths and weaknesses of learning and control. FIG. 21A shows a contour plot for normalized performance for a Lavamd algorithm for different configurations. FIG. 21B shows a time-line for running the Lavamd algorithm using either learning (i.e., LEO) or control (i.e., POET) separately. FIG. 22A shows a contour plot for normalized performance for a Kmeans algorithm for different configurations. FIG. 22B shows a time-line for running the Kmeans algorithm using either learning (i.e., LEO) or control (i.e., POET) separately. The non-limiting examples use mobile development boards featuring Samsung's Exynos 5 Octa with an ARM big-.LITTLE architecture that has four energy-efficient LITTLE cores and four high-performance big cores. Each cluster can be set to different frequencies, leading to a large configuration space for assigning resources to multi-threaded applications.

Each configuration (assignment of cores and frequencies) has different performance for different applications. FIGS. 21A, 21B, 22A and 22B show how performance varies as a function of both resource usage and application. FIGS. 21A, 21B, 22A and 22B show cores on the x-axis and frequency on the y-axis, with darker regions representing higher performance. The presence of local minima and maxima mean that the function from resource usage to performance is non-convex. Therefore, simple gradient ascent/descent methods are not suitable to navigating these configuration spaces. Additionally, the Lavamd application has a significantly more complicated configuration space than the Kmeans application.

Now, prior learning and control approaches are described. LEO, a hierarchical Bayesian learner, estimates application performance as a function of its resource usage. POET, a control system, adjusts resource usage to meet application performance requirements with minimal energy. By describing the results of the LEO and POET systems separately it is possible to develop intuition about when one approach performs better than the other, motivating the proposal to combine the two systems, as described herein.

Many machine learning approaches have been proposed to estimate application performance in a variety of scenarios. Machine learning is well suited to building models of complicated systems like those used in FIGS. 21A, 21B, 22A and 22B. To demonstrate how well learning manages complexity, one can consider meeting a performance requirement for Lavamd, which has a complicated configuration space. The application can use either learning or control separately to attempt to meet a performance goal with minimal energy. On one hand, the learning approach estimates all configurations' performance and power and then uses the lowest power configuration that delivers the required performance. On other hand, the control approach has a generic model of performance/power frontiers (similar to Kmeans) and it constantly measures performance and adjusts resource usage according to this generic model.

In contrast to many controllers using linear models, in certain implementations, POET uses a convex model and handles some non-linearities. However, it is sensitive to local maxima.

FIG. 21B shows the results of controlling 30 iterations of Lavamd to meet the performance requirement. The use of 30 iterations is a non-limiting illustrative example. The x-axis shows iteration number and the y-axis shows normalized performance. The learning approach achieves the goal, but the controller oscillates wildly around it, sometimes not achieving the goal and sometimes delivering performance that is too high (and wastes energy). The oscillations occur because the controller adjusts resources based on an incorrect (over-simplified) model of the configuration space. Hence, the learner's ability to handle complex models is crucial for reliable performance in this example.

This result may be somewhat counter-intuitive. The problem is that the controller cannot handle the complexity of Lavamd. One way to fix this problem would be to build a custom controller just for this application, but that controller would not be useful for other applications. In contrast, the learner can find the local maxima in the configuration space, and as this application has no phase changes or other dynamics, the one configuration that the learner finds is suitable for the entire application.

The benefits of using control over learning can be understood by considering a dynamic environment. This is simulated by beginning with Kmeans as the only application running on the system. Halfway through its execution, a second app is launched on a big core, dynamically altering resource availability. FIG. 22B shows the results of this experiment. The vertical dashed line represents when the second application begins. FIG. 22B clearly shows the benefits of a control system in this dynamic scenario. After a small dip in performance, the controller returns it back to the desired level. The learning system, however, does not have any inherent mechanism to measure the change or adapt to the altered performance. While the system could theoretically relearn the configuration space whenever the environment changes, doing so is disadvantageous in some implementations. Control systems are a light-weight mechanism for managing such dynamics. Control systems are resilient to scale change in the system performance or power. Many dynamic changes reduce all configurations' performance almost uniformly, changing the magnitude of performance without altering the relative difference between configurations. For this reason, control systems have proven especially useful in webservers with fluctuating request rates and multimedia applications with dynamically varying inputs.

To understand the CALOREE system 2000, consider a mobile device or embedded system running a streaming application on a heterogeneous processor. No prior knowledge of this streaming application is assumed, but there is prior knowledge of other applications. The goal of the CALOREE system 2000 is to quickly build a model of the new application and then control the resource usage of the mobile devices such that a desired performance target is meet with minimal energy.

Figure 23:
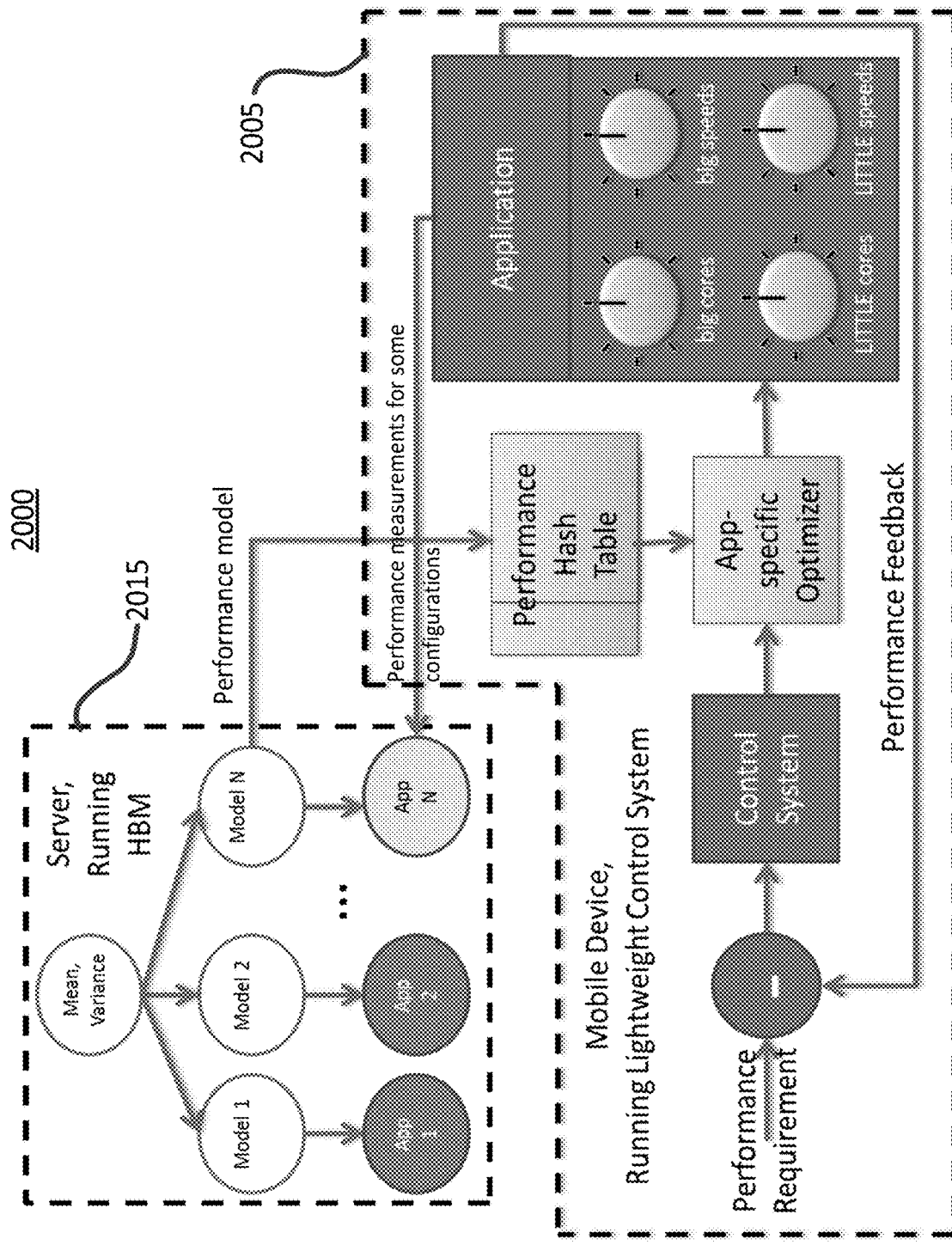
FIG. 23 shows a schematic diagram of a CALOREE system using an HBM to generate the performance model at the server and a lightweight control system in the device to implement configuration control using the performance model, according to one implementation.

FIG. 23 shows an implementation of the CALOREE system 2000 approach to meeting the desired performance target with minimal energy. In the implementation of the device 2005 shown in FIG. 23, the control system is a generalized control system (GCS), which allocates resources to the new application to meet its specified performance goal with minimal energy. The GCS starts with a generic resource model, and as it selects configurations it records performance and power in each configuration, after recording a small number of values (typically less than 10% of the total configuration space).

Exploring a greater percentage of the configuration space often produces greater accuracy. And on the converse, exploring a lesser percentage of the configuration space can reduce the accuracy. Depending on the goals and the system more or less exploration of the configuration space can be beneficial.

The recorded values are sent to a remote server 2015 which runs a hierarchical Bayesian model (HBM). The HBM estimates the application's performance and power in all other configurations and extracts those configurations that are Pareto-optimal in the performance/power tradeoff space. These configurations are packaged in a special data structure—the performance hash table (PHT)—and sent to the GCS. The PHT can be generated in the server 2015 and sent to the devices 2005 as part of the performance model. Alternatively, the performance model can be sent the device 2005, and the device 2005 can assemble the PHT from the received performance model. Using the PHT, the GCS selects an energy minimal resource configuration in constant time (O(1)). The constant time to select the energy minimal resource is an absolute time duration (i.e, no matter how many configurable parameters there are, the controller will select a combination of configurations in a constant amount of time). That is, adding more parameters does not slow down the controller.

In certain implementations, in addition to the PHT, the server sends back the model's variance. In these implementations, the GCS can use this variance to customize control to the model's uncertainty, allowing guaranteed convergence to the performance goal despite the fact that the system starts with no prior knowledge of the streaming application.

Now, additional details of the CALOREE system 2000 are provided. These additional details begin with a description of a control design for a computer system according to one non-limiting embodiment. Then a description is provided of the generalized control system of the CALOREE system 2000, according to one non-limiting embodiment. Next, a description is provided of how the CALOREE system 2000 turns the generalized control signal into specific resource configurations using a model. Further, a description is provide of how to use a hierarchical Bayesian model to estimate resource performance and power tradeoffs. Then, the performance hash table that encodes the learned model is described. Finally, a description is provided of some brief analysis of the approach. This description is provide as a non-limiting example of the CALOREE system 2000.

Figure 24:
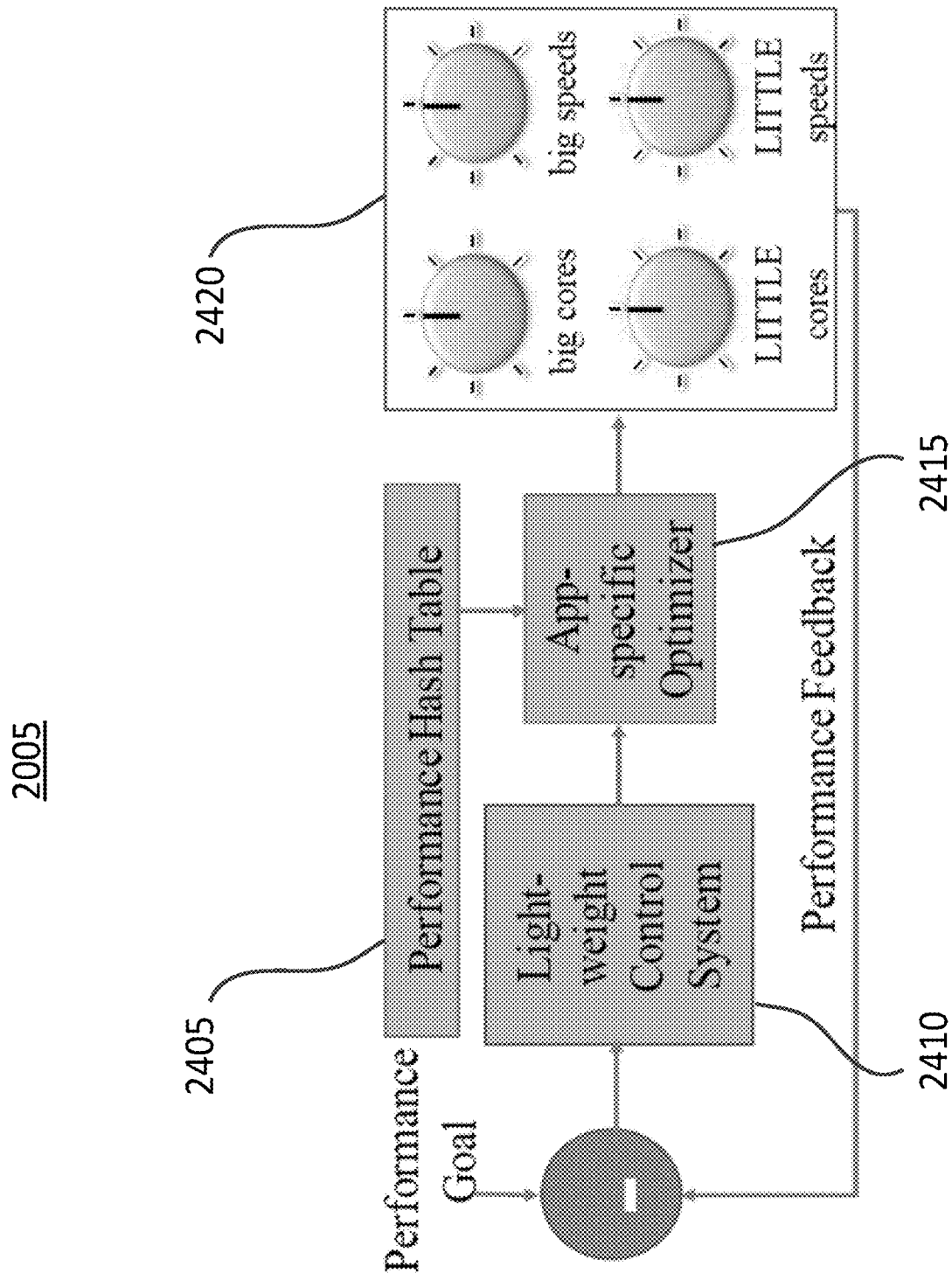
FIG. 24 shows a schematic diagram of the device, according to one implementation.

FIG. 24 shows a non-limiting example of a light-weight control system for the device 2005. A controller has a performance goal (e.g., corresponding to a quality-of-service or real-time constraint) and adjusts system resource usage to see that the goal is met. In a simple example, a control system might adjust processor frequency to ensure that a performance goal is met. Even better, an optimal controller would use the minimal clockspeed to meet the performance requirement.

To turn clockspeed into performance a controller needs a model relating these two values. Directly mapping clockspeed to performance is difficult-a hypothetical model might account for instruction mixes, memory hierarchy, memory latency, synchronization overheads, etc. Building such a model is a tedious and error-prone process, even before addressing the additional complications presented by system dynamics (e.g., applications transitioning from memory to compute bound). Instead, control systems use relatively simple difference models. Continuous time systems would use differential equations, but as time in computers is inherently discretized the discussion herein is restricted to difference equations which are appropriate for discrete time systems.

Continuing the example of controlling performance with clockspeed, a simple model appropriate for control would be to assume that the performance is a linear function of the clockspeed, which is given by $$\text{perf}(t) = k \cdot \text{clock}(t-1) + \delta$$

Here, the observed performance perf(t) is predicted as some constant k times the clockspeed applied at the previous time step, clock(t−1), plus some noise, δ drawn from a Gaussian distribution. This simple linear difference model ignores low-level details like instruction mix, and instead uses feedback, predicting behavior of the next time step as a function of the previous time step. Using the relationship of the above equation, it is possible to synthesize a simple controller that is provably convergent to the desired performance. The controller can be governed, e.g., by the expressions $$\text{error}(t) = \text{goal} - \text{perf}(t), \text{ and}$$

$$\text{clock}(t) = \text{clock}(t-1) - \frac{\text{error}(t)}{k}.$$

The controller governed by the above equations provides formal guarantees that it will converge to the desired performance (goal in the above equations) and it bounds the time taken to converge. All these guarantees, however, are predicated on the accuracy of the model; i.e., on the value k in this simple example. This value is highly dependent on the particular application under control. More complicated examples that control multiple resources are relatively straightforward extensions of the example shown here that use matrix equations instead of the scalar equations presented here. Either way, the control system is highly dependent on the value of k. The value of k could be set to be application specific, but then the controller will fail on some applications. If a value of k is chosen such that performance still converges to the goal for all applications it will be very slow, meaning that the controller will take many time steps to react to some dynamic events. It would clearly be beneficial to tune the control models to individual applications.

Figure 26:
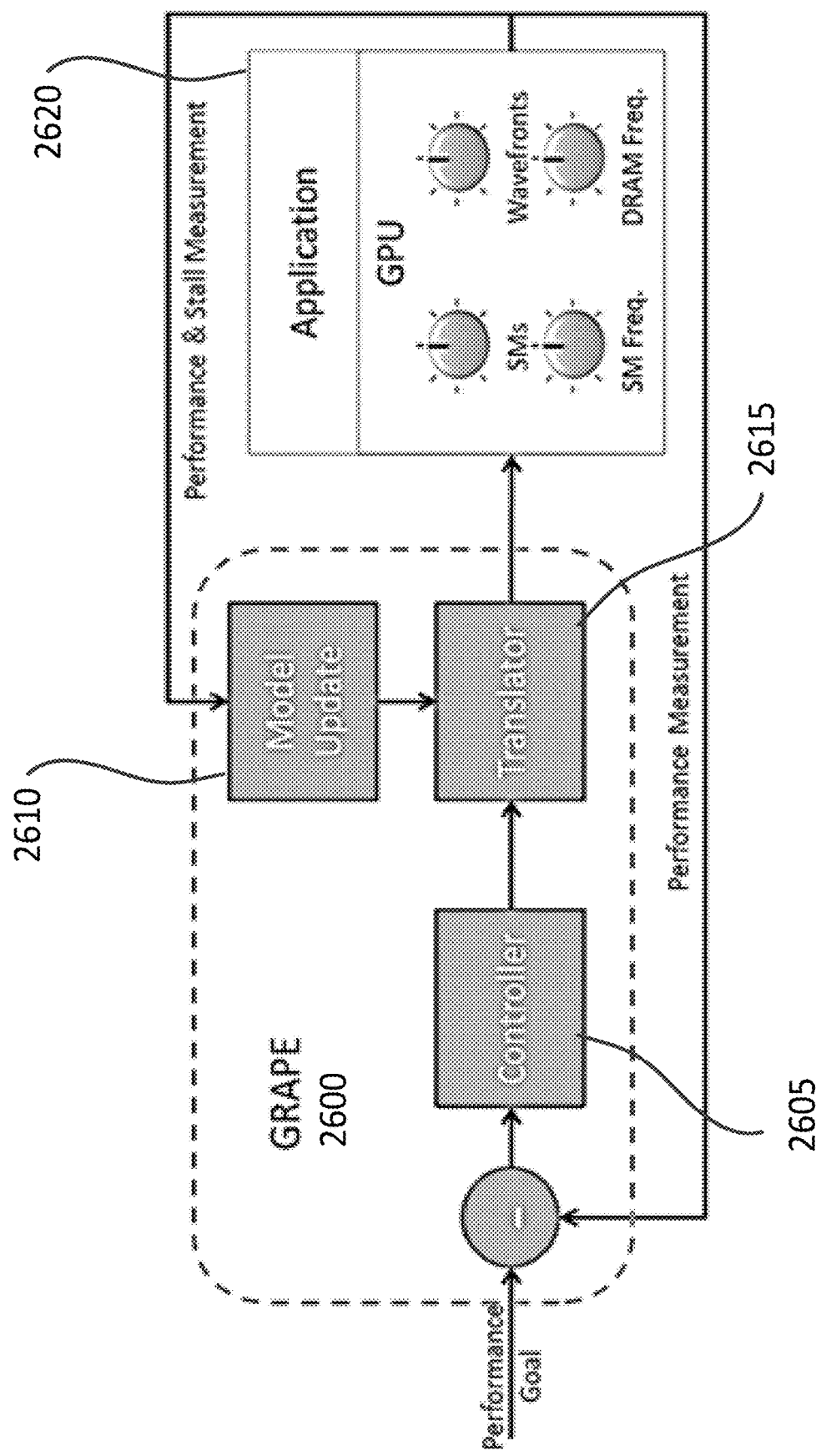
FIG. 26 shows a schematic diagram of a GPU Resource Adaptation for Performance and Energy (GRAPE) architecture, according to a first implementation.

It is desirable to use control and learning to solve the problem of meeting an application's performance requirements while minimizing energy consumption. The difficulty is that classical control formulations like the example above integrate the models directly into the controller, i.e., the application-dependent relationship between performance and resource usage is directly used in the control equations. This problem is addressed by adding a layer of indirection. This idea is illustrated in FIG. 26. Instead of directly controlling resources using an application-dependent model, speedup is controlled by passing the speedup value to a separate module that translates speedup into a desired resource configuration using the learned models. The following description describes the formulation for controlling speedup and then describes the translator that converts that speedup into resource allocations.

Analogous to the above equation for perf(t), it is possible to write a simple difference model relating speedup to performance:

$$\text{perf}(t) = b \cdot \text{speedup}(t-1) + \delta,$$

wherein b is the base speed of the application, here defined as the speed when all resources are available. While b is application specific, it is easy to measure online, by simply allocating all resources. Such a configuration should not violate any performance constraints (although it is unlikely to be energy efficient) so it is safe to take this measurement without risk of violating performance constraints. With this model, the control law becomes $$\text{error}(t) = \text{goal} - \text{perf}(t) \text{ and}$$

$$\text{speedup}(t) = \text{speedup}(t-1) - \frac{\text{error}(t)}{b},$$

which states that the speedup to apply at time t is a function of the previous speedup, the error at time t and the base speed b. This is a very simple deadbeat controller that provides all the standard control theoretic formal guarantees. In certain implementations, the controller can include a pole, rather than being a deadbeat controller. By measuring base speed online while the application runs, the control can be tuned to a specific application. It is noted that using this definition of base speed, most speedups will be less than one. In addition to making base speed easier to measure, this has the nice property of bounding the learner's output, making for more robust learning. Next, the description describes how to address the problem of converting an abstract speedup into an actual resource allocation.

Consider how to map the speedup produced by the above equations into a resource allocation. On an exemplary target system, an ARM big.LITTLE architecture, that specifically means mapping speedup into a number of big cores, a number of small cores, and a speed for both (on the system big and little cores can be clocked separately).

The primary challenge here is that the HBM produces a discrete non-linear function of resource usage into speedup and powerup, while the above equation is a continuous linear function. This divide is bridged by assigning time to resource allocations such that the average speedup over a control interval is that produced by the above speed-up control equations.

An assignment of time to resources is referred to as a schedule. Not surprisingly, there are typically many schedules that meet a particular performance requirement. It is desirable to find a minimal energy schedule. Given a time interval τ, a workload W to complete in that interval, and a set of C configurations, this problem can be expressed as $$\min \sum_{c=0}^{C-1} \tau_c \cdot p_c$$

Subject to $$\sum_{c=0}^{C-1} \tau_c \cdot s_c \cdot b = W$$

$$\sum_{c=0}^{C-1} \tau_c = \tau$$

$$0 \le \tau_c \le \tau, \forall c \in \{0, \ldots, C-1\},$$

wherein $p_c$ and $s_c$ are the estimated powerup and speedup of configuration c and $\tau_c$ is the amount of time to spend in configuration c. The power equation above simply states that the objective is to minimize energy (power times time). The work equation above states that the work must be done, while the time/deadline equation above requires the work to be done on time. The final inequality simply imposes the physical constraint of no negative time.

While most linear programming problems would be inefficient to solve repeatedly on a mobile device, the linear programming problem represented by the above equations has a constant time (O(1)) solution. At most two of $\tau_c$ are non-zero, meaning that at most two configurations will be used in any time interval. If the configurations are charted in the power and performance tradeoff space the two configurations with non-zero $\tau_c$ lie on the lower convex hull of the power performance tradeoff space. These two facts are used to construct a constant time algorithm for finding the optimal solution online.

Figure 25:
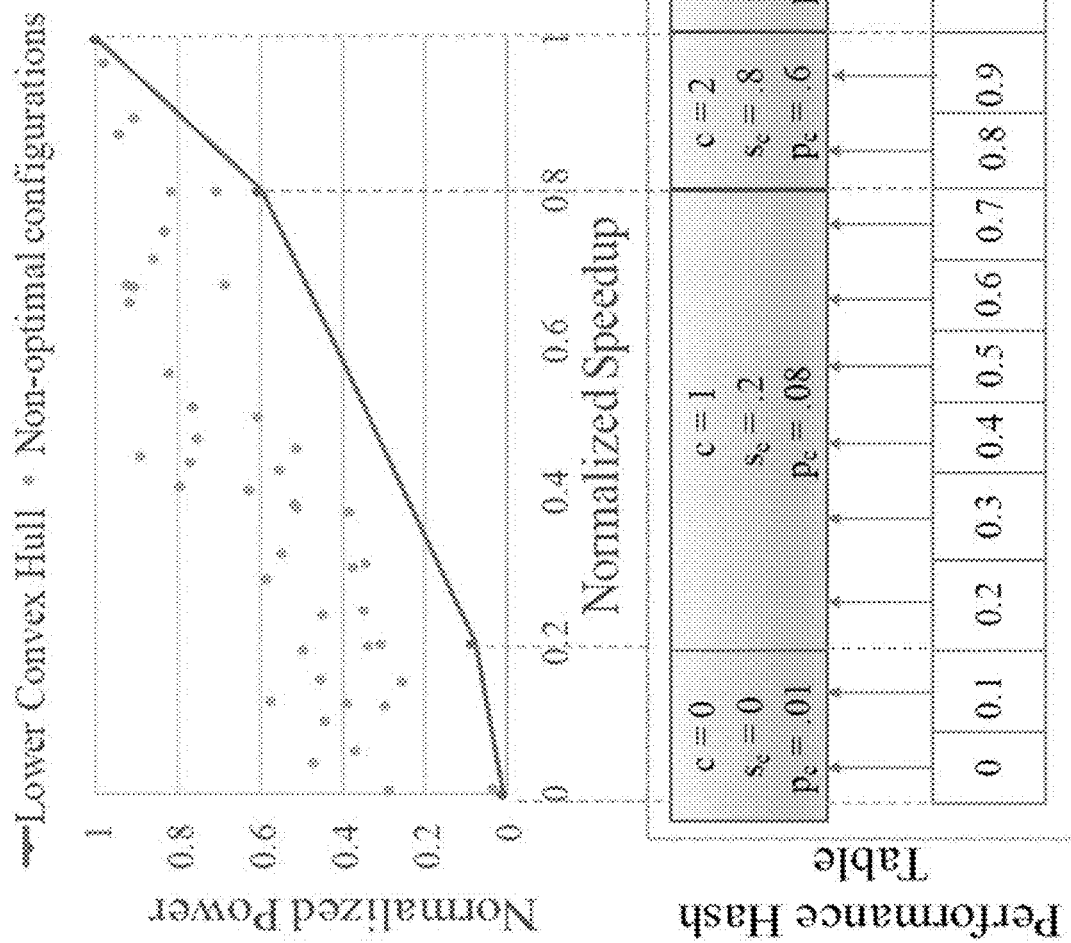
FIG. 25 shows a schematic diagram of the performance hash table (PHT), according to one implementation.

FIG. 25 shows a performance hash table (PHT), which is a data structure to efficiently convert a required speedup into a configuration. The PHT is a novel data structure that allows constant time operation. This constant time operation is achieved by increasing the memory usage. If less memory usage is desired and slower operation can be tolerated, a sorted list could be used instead. Given n combinations of configurations, a sorted list can be executed in O(log n) time.

The PHT contains points on the lower convex hull of the power/performance tradeoff space. It consists of two arrays; the first is an array of pointers that point into the second array, which stores the configurations on the convex hull sorted by speedup. Recall that speedups are computed relative to the base speed, which uses all resources. Because the largest speedup possible is 1, the only concern is that the speedup is less than 1. The first table of pointers has a resolution indicating how many decimal points of precision it captures. The example in FIG. 25 has a resolution of 0.1. To improve the visibility of FIG. 25, the non-limiting example provided herein uses a resolution of 0.1 and a table of size 10. However, other resolutions and table sizes can be used, especially if the aesthetics of generated figures is not an issue. In practice the resolution is a tradeoff between the maximum control error and the size of the PHT. Any positive resolution can be used. Each pointer in the first table points to the configuration in the second array that has the largest speedup less than or equal to the index.

To use the table, the translator receives a speedup s(t) from the controller. It needs to convert this into two configurations referred to as hi and lo. To find the hi configuration, the translator clamps the desired speedup to the largest index lower than s(t) and then walks forward until it finds the first configuration with a speedup higher than s(t). This configuration is hi. To find the lo configuration, the translator clamps the desired speedup to the smallest index higher than s(t) and then walks backwards until it finds the configuration with the largest speedup less than s(t).

For example, consider the PHT in FIG. 25 and a translator trying to meet a speedup s(t)=0.65. To find hi, the translator indexes at 0.6 and walks up to find c=2 with $s_c$=0.8, setting hi=2. To find lo, the translator indexes the table at 0.7 and walks backward to find c=1 with $s_c$=0.2, setting lo=1. The above values are provided as a non-limiting example.

Finally, the translator sets $\tau_{hi}$ and $\tau_{lo}$ by solving the following set of equations:

$$\tau = \tau_{hi} + \tau_{lo}$$

$$s(t) = s_{hi} \cdot \tau_{hi} + s_{lo} \cdot \tau_{lo}$$

In these equations, s(t) is the speedup requested by the translator, and $s_c$ are the speedups estimated by the learner.

By solving the above equations, the translator has turned the speedup requested by the controller into a schedule of resource allocations using the models provided by the HBM. Provided that the resolution is large enough to get a good spread of configurations to indices, the translator will always index the configuration array at most one entry from where it needs to be. Thus, the entire translation process runs in constant time—assuming that the learner is responsible for building the PHT once before passing it on to the translator. This efficiency comes at a cost of memory usage-many of the entries in the speedup index table will point to redundant locations in the configuration array. This is a reasonable tradeoff to make in practice because it is beneficial for the code that runs on the mobile device to be fast or else there is a risk of wasting energy while trying to save energy. In certain implementations, it is recommend that a table have a size 100, which provides a sufficient resolution and without being too wasteful of space. The table size of 100 is provided as a non-limiting example. Generally, any table size greater than 1 can be used.

In summary, the CALOREE system 2000 leverages the collective information of a number of independent mobile devices each running a lightweight controller. Each device, such as the device 2005, makes a small number of local observations of an application it runs and sends those to the server. The server 2015 integrates those observations using an HBM to produce customized models for each device. These models are sent back to the individual devices where they are used to meet performance requirements with minimal energy by translating a speedup signal into configurations.

Next, another implementation is described, which uses a GRAPE architecture 2600 as shown in FIG. 26. The GRAPE architecture 2600 includes a controller 2605, a translator 2615, and an update model 2610. The GRAPE architecture 2600 can be used to optimize energy consumption and performance according to the application executed on a graphical processing unit (GPU) such as the GPU 2620 shown in FIG. 26.

GPUs are often used to support applications, whose performance requirements are defined by their interaction with the outside world (e.g. a sensor or a human). When supporting such interactive applications, the goal should not be running as fast as possible, but running just fast enough to maintain interactive performance while minimizing energy usage. The GRAPE architecture 2600, which is described next, provides non-limiting examples of a hardware controller that can be integrated into existing GPU's to provide user-specified performance while minimizing energy usage. The performance and energy can be evaluated by modifying GPGPUSim to support the GRAPE architecture 2600. It is observed that, across a range of applications and performance targets GRAPE is within 99.87% of the desired performance, while consuming only 4.9% more energy than optimal. Compared to the standard strategy of racing-to-idle, GRAPE reduces energy consumption by 0.74 times on average and increases energy efficiency by 1.35 times. In addition, the area overhead of the GRAPE architecture 2600 can be evaluated by implementing it in VHDL.

The non-limiting exemplary implementations described herein are measured using the potential power reduction for four benchmarks run in an interactive style with three different resource management techniques. The baseline technique executes the application in the normal, batch mode. Race-to-idle is a common strategy that runs the application in its fastest configuration and then idles until the next input is ready. The oracle represents the true optimal approach that carefully tailors resource allocation for the application and performance requirement. The race-to-idle strategy is much better than doing nothing, but is far from optimal.

Clearly there is great potential for energy reduction by carefully tailoring resource usage. Various approaches can be used to address the problem of configuring GPUs (through both scheduling and resource management) for maximum performance. However, interactive applications particularly benefit from an approach that tailors resource usage to the particular application and performance requirement. The difficulty is that each application will respond differently to different resources (e.g., some will need more memory resources while others will need more computational resources). It is even likely that different kernels within an application will have different requirements. The challenge, then is dynamically determining how to tailor resource usage to the current application and performance requirement.

This challenge is addressed by the GRAPE (GPU Resource Adaptation for Performance and Energy) architecture 2600. The GRAPE architecture 2600, according to certain embodiments, is a hardware control system that manages GPU resources to meet software-specified performance goals. As shown in FIG. 26, the GRAPE architecture 2600 uses a controller 2605 to achieve a performance requirement, which ensures that the stream of inputs is processed at the right speed. The GRAPE architecture 2600 further augments the controller 2605 with a simple machine learning component implemented by the translator 2615 and the model update 2620 that tailors control to the behavior of the current application, ensuring optimal resource usage. Both the controller 2605 and the learner, which in FIG. 26 is realized using the translator 2615 and the model update 2620, can be implemented in hardware, removing the optimization burden from software developers.

To illustrate some advantages of the GRAPE architecture 2600, it is evaluated in two ways. First, the control and learning algorithms are integrated into GPGPU-Sim v3.2.2, a cycle-accurate GPGPU Simulator and GPUWatch, and then the ability of the GRAPE architecture 2600 to deliver performance and energy savings is tested using 17 benchmarks drawn from Rodinia and Parboil. This test is provided as a non-limiting example. Second, the GRAPE architecture 2600 is implemented GRAPE in VHDL to measure its performance, power, and area overhead. Given these two implementations, it is observed that the GRAPE architecture 2600 provides advantages with respect to: 1) performance predictability; 2) energy efficiency; 3) peak power reduction, and 4) low overhead. Regarding performance predictability, it is observed that across a range of different performance targets, according to the above described implementations, the GRAPE architecture 2600 achieves the desired performance with only 0.23% error. In fact, there is only a single benchmark and performance target for which the GRAPE architecture 2600 GRAPE fails to deliver the desired performance. Regarding energy efficiency, it is observed that the GRAPE architecture 2600 reduces the energy consumption by 0.74 times on average compared to the baseline. For example, the energy consumption reduction observed when executing the Kmeans application is 0.49 times. It is observed, however, that the efficiency can depend on the idle power. Regarding peak power reduction, according to the above implementations, the GRAPE architecture 2600 not only reduces the energy consumption but also the peak power. It is observed that the GRAPE architecture 2600 reduces peak power by 0.58 times of the normalized baseline. For example, the best power reduction is when executing the Kmeans application, for which the reduction is 0.31 times. Regarding low overhead, the GRAPE architecture 2600 can be implemented in an FPGA technology using Quartus II software, which in turn uses VHDL to count power and cycle overhead. The overhead power is measured in one implementation using PowerPlay Early Power Estimator, which shows that the GRAPE architecture 2600 uses 0.967 Watts to operate.

The low overhead of the GRAPE architecture 2600 means that it could easily be integrated into existing GPUs with almost additional cost. Energy savings are demonstrated by tailoring GPU resource usage when running interactive applications. The control and learning framework developed for the GRAPE architecture 2600 automatically adapts resource usage to meet the performance requirements of interactive GPU applications while minimizing energy consumption. Various implementations of this approach are described in, including simulations and hardware. The methods of the GRAPE architecture 2600 described herein uniquely provide a hardware solution for reducing GPU energy when processing interactive applications.

Next is provided a non-limiting example motivating the need to tailor resource usage for interactive applications. For example, consider using a GPGPU to accelerate digital signal processing (DSP). The fast Fourier transform (FFT) is one of the most important computations in DSP can be used in noise cancellation, for example. A noise cancellation application that works 16.384 kHz and 256 point FFT size should maintain the latency period to finish at 7.8125 m period. Assuming a noise cancellation algorithm need 5.25 ms to finish its duty, then the FFT has 2.5625 ms latency deadline. By default, 256 points FFT Rodinia implementation in GPGPU 1.030 ms, leaving space for the GRAPE architecture 2600 to adjust the performance down to 50%.

Figure 27A:
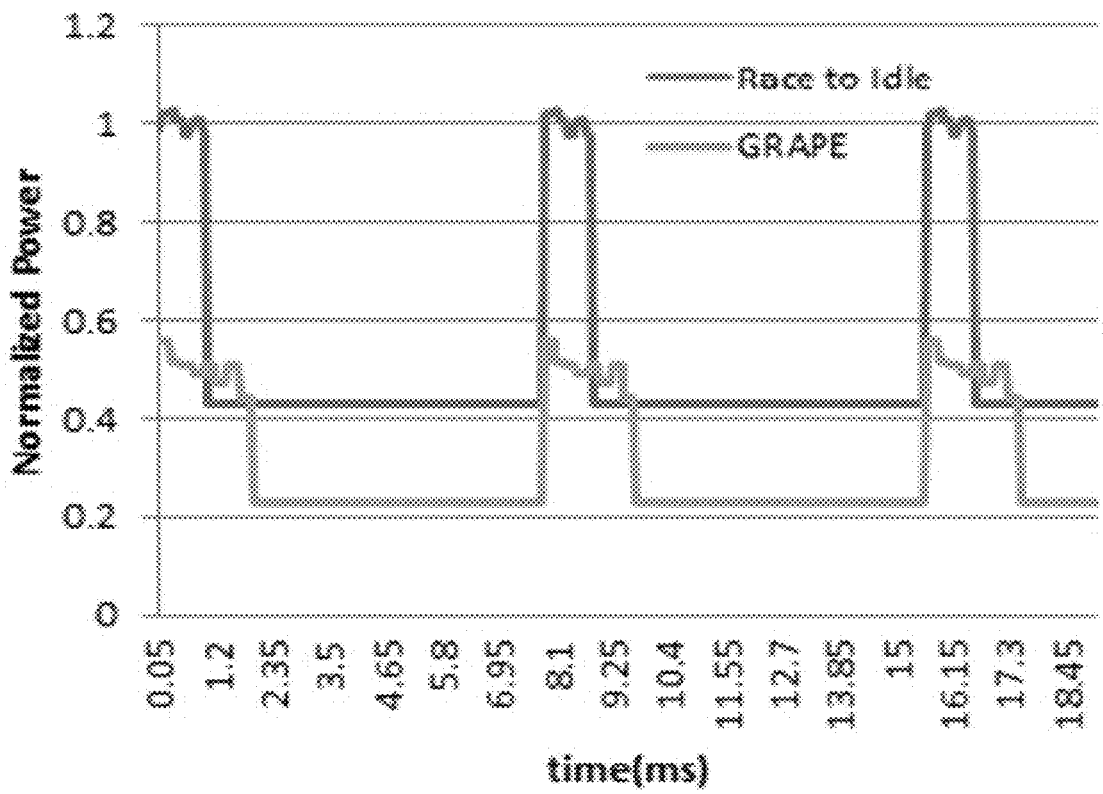
FIG. 27A shows a plot of normalized power as a function of time to compare a race-to-idle implementation with a GRAPE implementation.
Figure 27B:
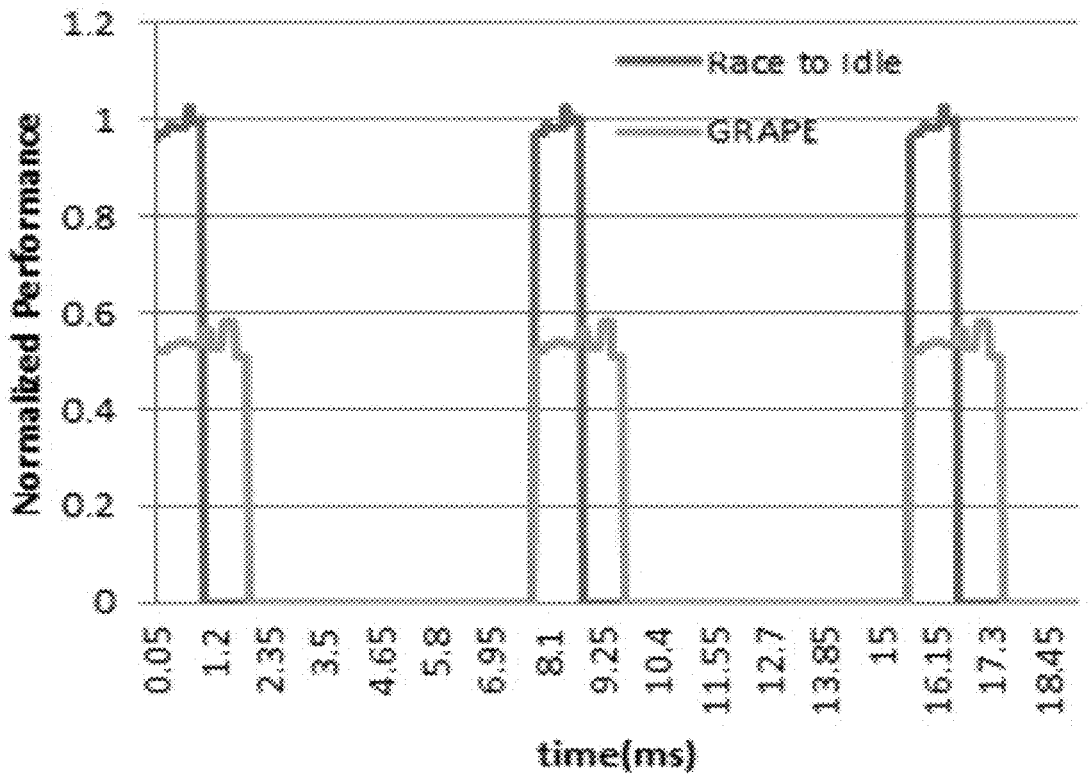
FIG. 27B shows a plot of normalized performance as a function of time to compare the race-to-idle implementation with the GRAPE implementation.
Figure 27C:
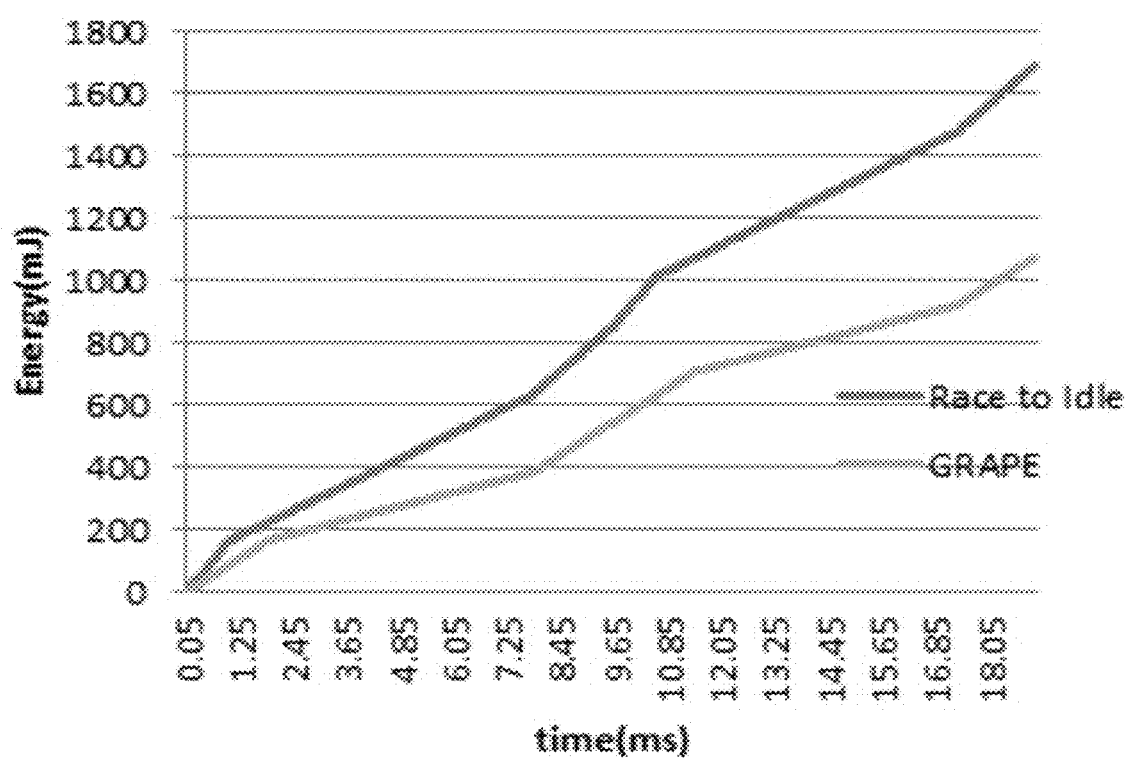
FIG. 27C shows a plot of integrated energy consumed as a function of time to compare the race-to-idle implementation with the GRAPE implementation.

FIGS. 27A, 27B, and 27C show the FFT application's performance (FIG. 27A), power (FIG. 27B), and energy consumption (FIG. 27C) when executed under control of the GRAPE architecture 2600. The FFT runs periodically and then idle to await the next data. It is demonstrated that running the FFT using a race-to-idle strategy requires more power than using the GRAPE architecture 2600. The GRAPE architecture 2600 adjusts resource usage such that the requirement for interactive performance is maintained. The GRAPE architecture 2600 not only reduces the maximum power consumption, but also reduces energy consumption over time.

A significant insight in the GRAPE architecture 2600 is that a combination of control theory and machine learning. The GRAPE architecture 2600 maintains simple internal difference models of how an application will respond to more resources. When an application is running, the controller 2605 of the GRAPE architecture 2600 detects differences between the application stated desired performance and the actual measured performance. The control system of the GRAPE architecture 2600 uses the difference models to eliminate error between the desired performance and the measured performance. Then the learning system of the GRAPE architecture 2600 (e.g., translator 2615 and the model update 2620) customizes the difference models so that the controller 2605 can be tailored for individual applications.

Intuitively, in certain implementations, the control system of the GRAPE architecture 2600 works like the cruise control in a car. Car drivers set a speed and cruise control adjusts fuel flow to ensure that the speed is met. In principle, a large number of variables affect the relationship between fuel flow and a car's speed such as wind speed, wind direction, incline, surface condition, and tire pressure. Modeling this large set parameters can be challenging, resulting in complicated models that are not useful in practice. Control engineers, however, have found that simple models based on difference equations used to construct robust cruise controls can deliver a desired speed even when the operating environment is unknown ahead of time. Motivated by prior successes in control theory, the GRAPE architecture 2600 applies similar techniques to the problem of maintaining a GPU performance goal while minimizing energy consumption.

GPGPU applications consist of variety of kernels, each with different behavior. These different kernels are analogous to different driving conditions in the cruise control example. Applying specific purpose control strategy to handle memory-bound applications may degrade the performance if compute-bound applications. Therefore a general control strategy can be applied. Recent research has demonstrated that, although generality sometimes causes performance loss, carefully constructed general control systems can perform better than dedicated ones.

Figure 28:
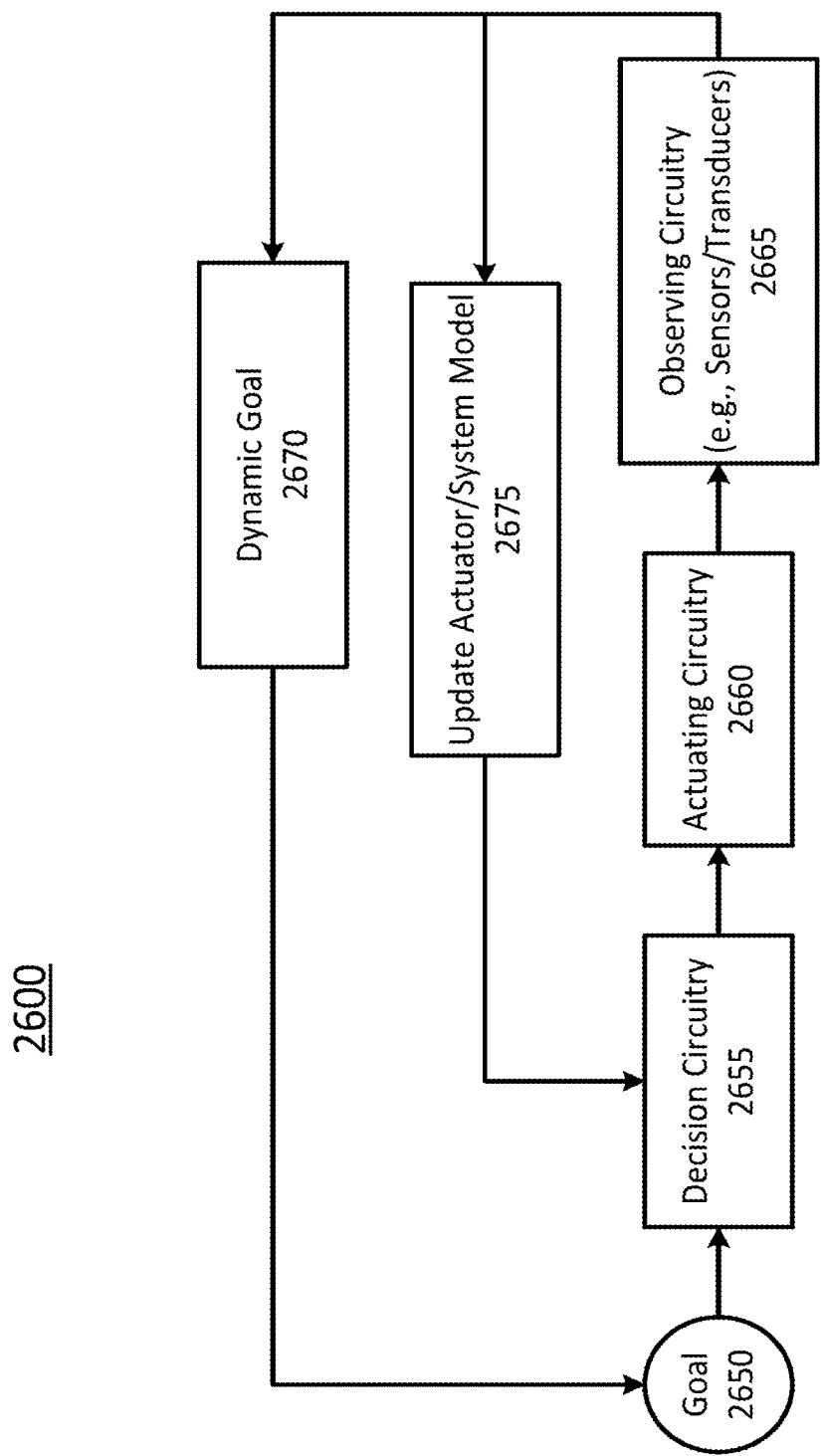
FIG. 28 shows a schematic diagram of a GPU Resource Adaptation for Performance and Energy (GRAPE) architecture, according to a second implementation.

FIG. 28 shows an alternative implementation of the GRAPE architecture 2600, using decision circuitry 2655, which performs some functions analogous to the controller 2605, actuating circuitry 2660, observing circuitry 2665, circuitry realizing an update of the actuator model 2675, circuitry to determine a dynamic goal (e.g., a speedup factor or a latency goal) that feedbacks to a goal 2650 at which a difference between a desired performance and actual performance is detected as an error that is feedback to the decision circuitry 2655 to determine a correction (e.g., a relative speedup factor).

In certain implementations, such as the implementation shown in FIG. 28, the GRAPE architecture 2600 can use a generic control system that implements an observe-decide-act (ODA) loop. In FIG. 28, the GRAPE architecture 2600 includes functionality to observe the GRAPE architecture 2600 and its environment, determine characteristics of the kernels, and possibly adjust performance goals. Then, the GRAPE architecture 2600 decides a general speedup to maintain specified performance goal. Having determined a speedup, GRAPE automatically and dynamically assigns resources to the kernel to meet the required speedup while reducing power consumption. The GRAPE architecture 2600 can handle different kernel characteristic, and make decisions about actuators and applications with which it has no prior experience. The control and learning mechanisms are simple, yet powerful, permitting them to be implemented in hardware.

Regarding the functionality provided by the observing circuitry 2665, the objectives of the observing circuitry 2665 of the GRAPE architecture 2600 are to monitor system performance and kernel behavior. The GRAPE architecture 2600 continuously monitors system performance $h_i$ and power cost $c_i$ during one window of $\tau$ time units. During each time unit $\tau$, the GRAPE architecture 2600 samples system performance at the beginning and middle of the time unit $\tau$.

In certain implementations, the GRAPE architecture 2600 observes a kernel's stall number, presence of idle cores, and ability to reach a performance goal $g_i$ in each $\tau$. High stall number means the kernels are in memory behavior. The presence of an idle core means the kernel is load-imbalanced, and the inability to reach the goal means the application had a non-uniform kernel characteristic.

Regarding the functionality provided by the circuitry to determine dynamic goal 2670, the GRAPE architecture 2600, in certain implementations, not only maintains throughput rate performance ($h_i$) but also latency performance ($\bar{h}$). GPGPU applications may consists of many kernels which have different behavior between others. Some kernels may have a maximum performance $h_{max}$ above the throughput performance goal and some kernels may have a $h_{max}$ below the user's performance goal $g_{default}$. The control system can maintain ($h_i$) when the kernel ($h_{max}$) is above the $g_{default}$. When this happen the GRAPE architecture 2600 ensures that the performance error will be paid in the future kernel to maintain the latency goal. Failure in keeping the performance goal in one kernel will cost the system to the deadline because the latency performance ($\bar{h}$) drop.

Table 6 summarizes the below described method. According to certain implementations, the GRAPE architecture 2600 can use a dynamic goal ($g_i$) to keep ($h_i$) and ($\bar{h}$) as close as possible but never below g by applying a simple classic control system as in Table 6. The constant α is used to control the dynamic rate. However, kernels with low ($h_{max}$) can occur in the last kernel, and GRAPE do have enough time to reclaim this lost latency. The GRAPE architecture 2600 overcomes this by dynamically setting lower limit of the ($g_i$). The GRAPE architecture 2600 can include an assumption that if there is a there is a low performance kernel, then another low-performance kernel is also likely to manifest later. A lower limit goal is insurance against a future low-performance kernel. An upper limit goal is also beneficial to maintain system performance not exceeding too much which can reduce the power saving potential.

TABLE 6

Summary of one non-limiting example of dynamic goal algorithm.
Algorithm 1 Dynamic Goal 1: procedure DYMAMIC GOAL
2:  $g_i = g_{default} - (\alpha (h_i - g_{default}))$
3: end procedure Regarding the actuating circuitry 2660 of the GRAPE architecture 2600, the model is built to include a set of actions. For example, an action can be an array consists of speedups, cost, and identification. Additionally, a model of frequency and voltage action can be used to model the dynamic power and performance tradeoff, for example. In certain implementations, a set of core model and warps can be active in each core.

Further regarding an actuator model of the GRAPE architecture 2600, in certain implementations, a set of core actuator ($S_a$) are used together with a set of frequency actuators ($s_b$) and wavefront actuators. Core actuators can have 16 members covering operation from idle to 15 cores in use. It is assumed that the GPGPU has 7 P-states, ranging from a peak of 700 MHz to a minimum 100 MHz, with step of 100 MHz. These settings align with GTX 480's existing DVFS settings. In certain implementations, a 45 nm predictive technology models can be used to scale the voltage with frequency (from 1 V to 0.55 V). Frequency actuators are used under the constraint that frequency cannot be changed more than once in one decision period τ. The scheduler's wavefront limiting can be used as actuators which limiting the wavefront in CTA from 4 to 32 by factor of 4. Extending these actuators to future architectures with more cores, DVFS settings, or scheduling options is can be performed as would be understood by a person of ordinary skill in the art as a process of increasing bounds on the data structures storing these models.

Now an independent model relationship is described. As the number of actuators grows, the number of configurations (which is a setting for each actuator) increases exponentially. To avoid this exponential explosion, the GRAPE architecture 2600 can model the actuators as independent and links the models computationally using the equation:

$$s_i = s_a s_b,$$
$$\tau_1 = \frac{s_i - s_b s_{a_2}}{(s_{a_1} - s_{a_2})s_b}, \text{ and}$$
$$\tau = \tau_1 + \tau_2.$$

Now the wavefront action is described. The GRAPE architecture 2600 determines whether a kernel is a memory bound kernel or computation bound kernel by monitoring the stall threshold $t_{stall}$. GRAPE implements wavefront action using the algorithm summarized in Table 7.

TABLE 7 algorithm for implementing the wavefront action.
Algorithm 2 Wavefront Action

1: procedure WAVEFRONT ACTION
2:  if stall$_{dram}$ ≥ t$_{stall}$ and stall$_{interconnect}$ ≥ t$_{stall}$
    then
3:      N$_i$ = N$_i$−1
4:  else
5:      N$_i$ = N$_i$+1
6:  end if
7: end procedure The values of γ, limit$_{upper}$, and limit$_{lower}$ can be subjective. For example, γ can be set to 4, limit$_{upper}$ to 48 and limit$_{lower}$ to 4. Memory bound kernels tend to exhibit non-linear behavior during runtime. By finding best wavefront numbers using the algorithm in Table 7, it can be expected that the memory bound kernel's appears to behave more linearly and therefore is easier to control.

Regarding the decision circuitry 2655 of the GRAPE architecture 2600, according to certain implementations, a runtime system of the GRAPE architecture 2600 automatically and dynamically selects actions to meet the goals with minimal cost. In certain implementations, the decision circuitry 2655 includes a controller, an optimizer, and a learning engine that adapts the optimizer. Regarding the controller, the GRAPE architecture 2600 augments a model-based feedback control system. The controller reads the performance goal ($g_i$) for application (i), collects the throughput rate hi and average throughput rate ($\bar{h}$) at time t, and computes speedup $s_i(t)$. Average throughput rate is a latency goal that corresponds to a prediction of when the application will finish.

In certain implementations, the control system uses difference models to eliminate the error $e_i(t)$ between the performance goal $g_i$ and the speed $h_i(t)$ where $e_i(t)=g_i-h_i(t)$. Given this error estimate, the speedup required to meet the goal can be calculated as:

$$s_i(t) = s_i(t-1) + w_i(t) \cdot e_i(t),$$

wherein $w_i(t)$ represents the application's workload, or the time it would take to complete application i using minimum resources. Treating the value of workload as a time-variant parameter allows the GRAPE architecture 2600 to tailor control to individual applications and even different kernels within the application. In practice, this value could be measured, but the measurement would disrupt the application performance because the measurement includes executing in a minimal resource configuration. Therefore, the GRAPE architecture 2600 can estimate the application workload online. Workload is estimated using a on dimensional Kalman filter as $w_i(t) \in \Re$ and models this workload as:

$$w_i(t) = w_i(t-1) + \delta w_i(t),$$

wherein $\delta w_i(t)$ represent time varying noise in the true workload. The GRAPE architecture 2600 recursively estimates the workload for application i at time t as $\hat{w}^i(t)$ using the following Kalman filter formulation, which is given by $$\hat{x}_i^-(t) = \hat{x}_i^-(t-1),$$

$$p_i^-(t) = p_i(t-1) + q_i(t),$$

$$k_i(t) = \frac{p_i^-(t)s_i(t-1)}{[s_i(t)]^2 p_i^-(t) + o_i},$$

$$\hat{x}_i(t) = \hat{x}_i^-(t) + k_i(t)h_i(t) - s_i(t-1)\hat{x}_i^-(t)],$$

$$p_i(t) = [1 - k_i(t)s_i(t-1)]p_i^-(t), \text{ and}$$

$$\hat{w}_i(t) = \frac{1}{\hat{x}_i(t)},$$

wherein $q_i(t)$ and $o_i$ represent application variance and measurement variance; $\hat{x}_i(t)$ and $\hat{x}_i(t)$ represent the a posteriori and a priori estimate error variance; and $k_i(t)$ is the Kalman filter gain.

Regarding the optimizer of the decision circuitry 2655, the adaptive control system of the GRAPE architecture 2600 produces a general speedup signal $s_i(t)$, which the runtime translates into the minimal energy configuration that will actually meet this goal (e.g., this can be achieved using a performance hash table (PHT)). The GRAPE architecture 2600 can do this by scheduling resource usage over a decision time period window of $\tau$ seconds. Given a set A={a} of core actions with speedup $s_a$ and costs $c_a$ and B={b} of frequency actions with speedup $s_b$ and costs $c_b$, the GRAPE architecture 2600 would like to schedule each of the actions for $\tau_a \leq \tau$ time and $\tau_b = \tau$ units in such a way that the desired speedup is met and the total cost (energy) is minimized. In other words, system tries to solve the following optimization problem $$\frac{1}{\tau}\sum_{a \in A}\tau_a s_a s_b = s_i(t)$$

The idle action corresponds to the system paying a cost of $c_{idle}$ and achieving no speedup $s_{idle}=0$). The values $\tau_a$ and $\tau_b$ can have different values because core actuator can change in 1 cycle and frequency actuators can wait 500 cycles to change due overhead delay.

Regarding the learning actuator models of the GRAPE architecture 2600, adaptive control can be used to flexible control the performance goal. The GRAPE architecture 2600 an increase flexibility by implementing an update in the actuator model. For example, initially the actuator model can assume that cost and performance between actions is linear after several decision periods. Then, the GRAPE architecture 2600 adaptively updates the model to reflect actual behavior of kernel application.

Adaptation of the workload can be done using a Kalman filter. In certain implementation, two more Kalman filter can be used to estimate the speedup and cost. Alternatively, in certain implementations, to decrease the area overhead and cost the control computation, the number of Kalman filters can be reduced. For example, the GRAPE architecture 2600 can implement a simple machine learning approach that costs less than an adaptive Kalman filter. That is, the GRAPE architecture 2600 can estimate the new model using an algorithm such as the algorithm shown in, wherein $k_1$ and $k_2$ is the learning rate, that the value is according to user. For example, herein the values are set as $k_1=0.85$ and $k_2=0.15$.

Table 8, wherein $k_1$ and $k_2$ is the learning rate, that the value is according to user. For example, herein the values are set as $k_1=0.85$ and $k_2=0.15$.

TABLE 8

A summary of an algorithm for adaptive control using machine learning, rather than Kalman filtering.

Algorithm 3 Update Actuator Model

| | |
|---|---|
| 1: | procedure ADAPTING TRANSLATION |
| 2: | $s_{core} = \frac{w_i}{s_{freq}}h_i k_1 + k_2 \cdot s_{core}$ |
| 3: | $c_{core} = \frac{k_1 c_i}{c_{freq}} + k_2 c_{core}$ |
| 4: | end procedure |

Figure 29:
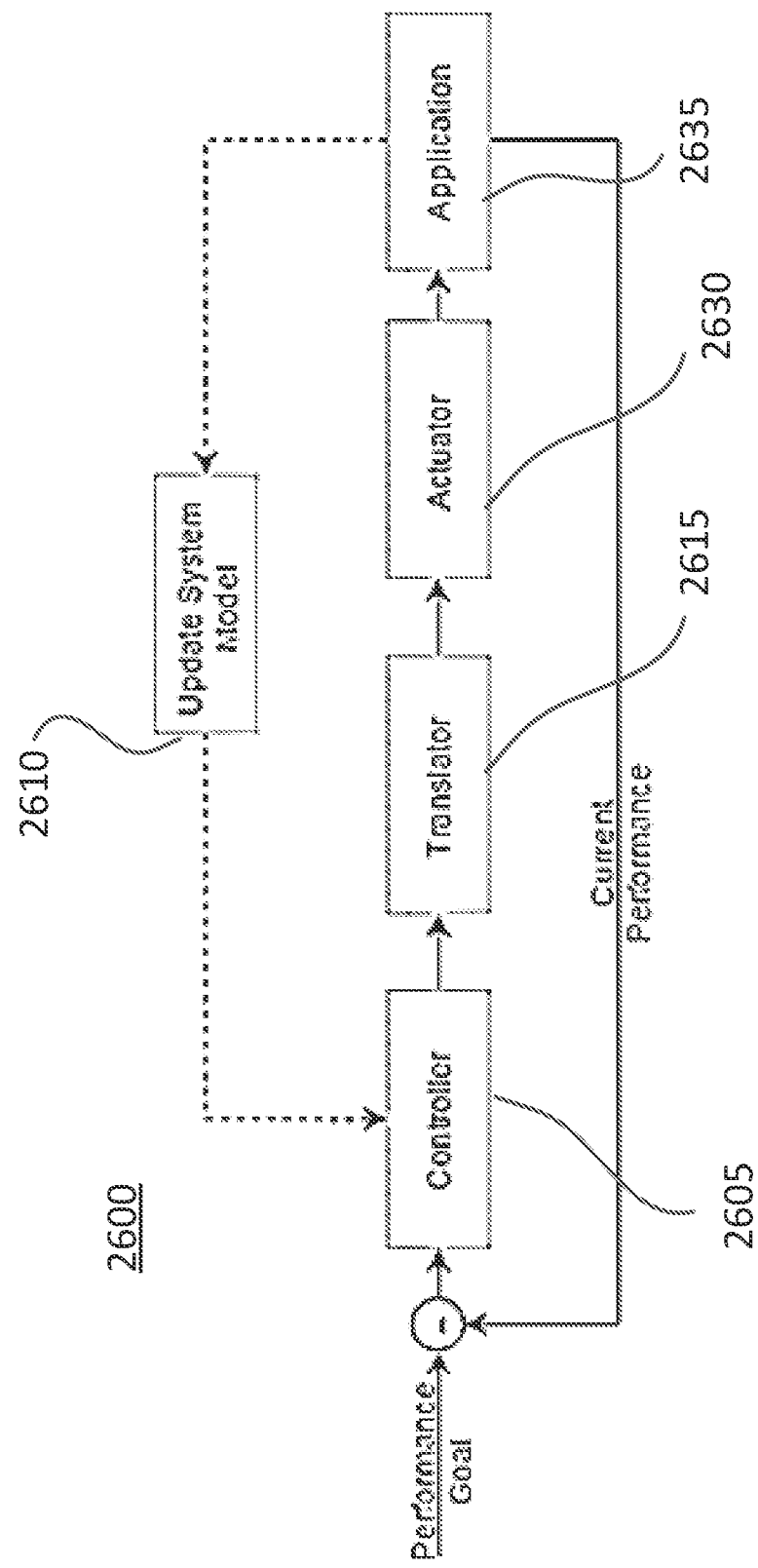
FIG. 29 shows a schematic diagram of a GPU Resource Adaptation for Performance and Energy (GRAPE) architecture, according to a third implementation.

FIG. 29 shows an implementation of the GRAPE architecture 2600 including a controller 2605, a translator 2615, an actuator 2630, an application 2635, and an update system model 2610.

Figure 30:
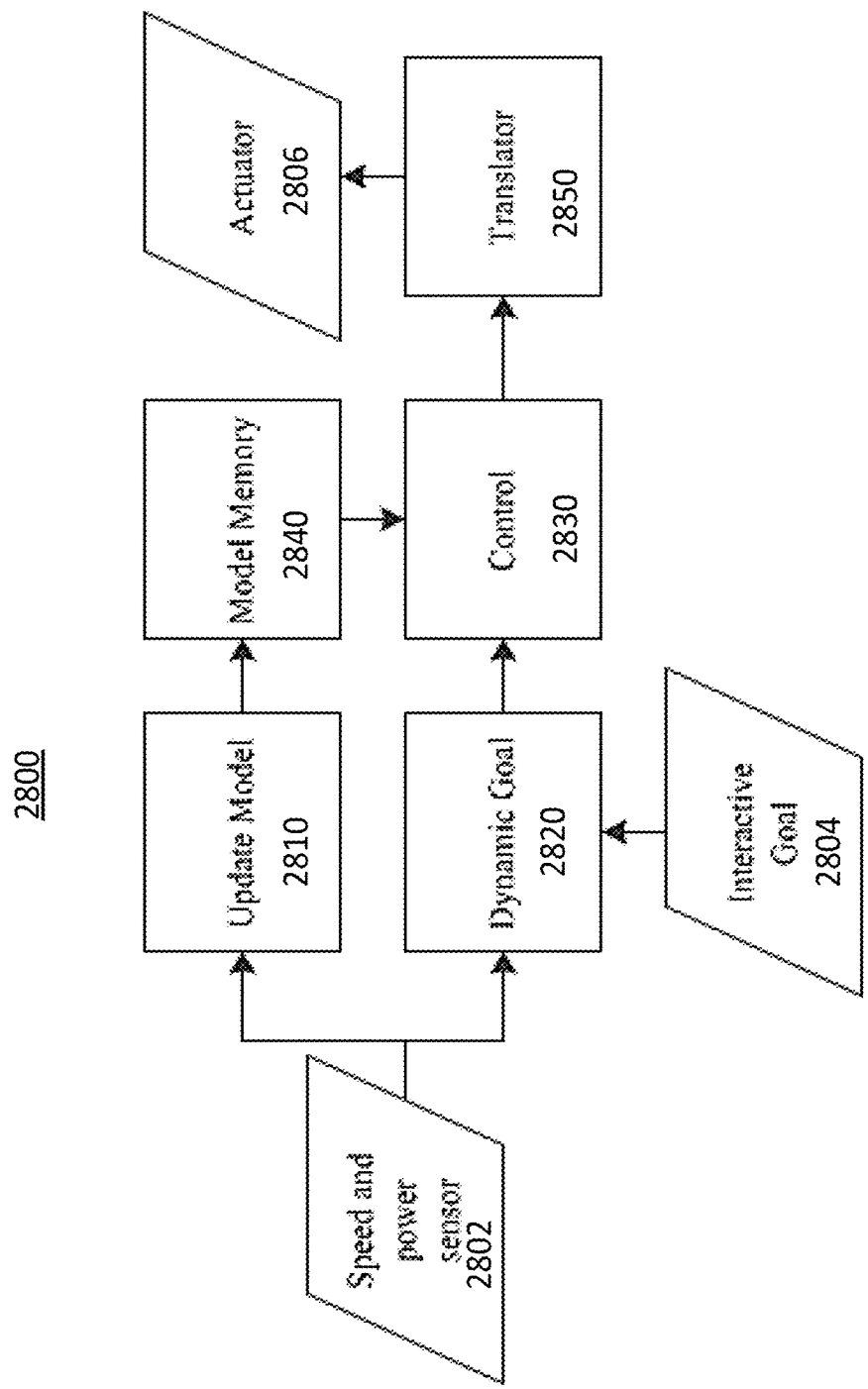
FIG. 30 shows a schematic diagram of a GRAPE datapath, according to one implementation.
Figure 31:
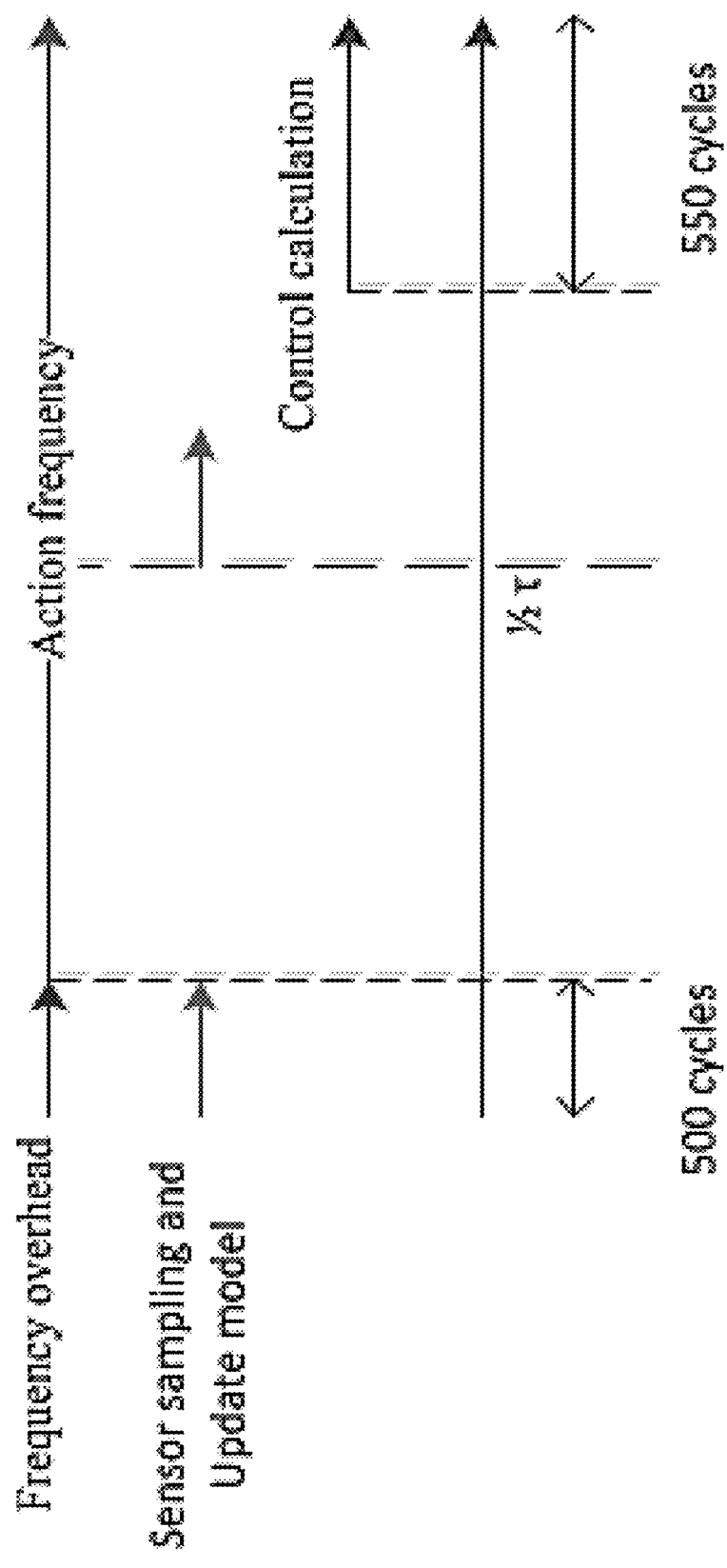
FIG. 31 shows a timing diagram of an overhead count according to one implementation of a GRAPE architecture using VHDL.

FIG. 30 shows an exemplary implementation of a GRAPE datapath 2800. Now a description is provided of a non-limiting examples of an implementation of the GRAPE architecture 2600 using the GRAPE datapath 2800. The non-limiting examples include implementations in both hardware and software. The GRAPE datapath 2800 includes input data from a speed and power sensor 2802 and input data of an interactive goal 2804, as well as output data for an actuator 2806. The input data from the speed and power sensors can be provided to circuitry determining an update model 2810 and to circuitry determining a dynamic goal 2820. The circuitry determining a dynamic goal 2820 can also receive the input data of the interactive goal 2804. The output of the circuitry determining a dynamic goal 2820 can be provided to a control 2830, which also receives results from a model memory 2840, which is determined using results of the update model 2810. Then, a translator 2850 provides the actuator output 2806 based in part on results of the control 2830.

In certain implementations, the GRAPE architecture 2600 can be implemented in FPGA technology using Quartus II software using VHDL to count power and cycle overhead. For example, a fixed point package can be implemented to perform a floating point multiplication and division in VHDL. In one implementation, the design can be synthesized such that the GRAPE architecture 2600 occupies 15,376 logic elements. In this implementation, a TimeQuest timing analyzer shows that GRAPE $f_{max}$ is 1.35 MHz or 519 cycles overhead in GPU Core frequency. Also, PowerPlay Early Power Estimator shows that this implementation of the GRAPE architecture 2600 uses 0.667 Watts to operate. The dynamic frequency and core actuator can be implemented by masking the clock in GPGPU-Sim. The wavefront actuator can be implemented using a swl scheduler. The GPUWattch can be edited to count the dynamic voltage and leakage static power. Further, a GTX480 model can be provided by those simulator. Then, the DVFS overhead can be modeled as 500 cycles and the core gating overhead can be modeled as 1 cycle. These actuators increases the GPU power consumption by 0.3 W. In this implementation, one decision period for GRAPE is 3000 cycles.

FIG. 30 shows the GRAPE datapath 2800 in a VHDL implementation. The implementation of the GRAPE datapath 2800 shown in FIG. 30 includes 5 main components, the update model 2810 to update the actuator model, the model memory 2840 including actuator model arrays, the control 2830, which counts the general speedup, the dynamic goal 2820 to dynamically adjust the goal and translator to find the least cost actuator. In certain implementations, the speed and power sensor 2802 uses a vector logic of 24 bits.

Figure 33:
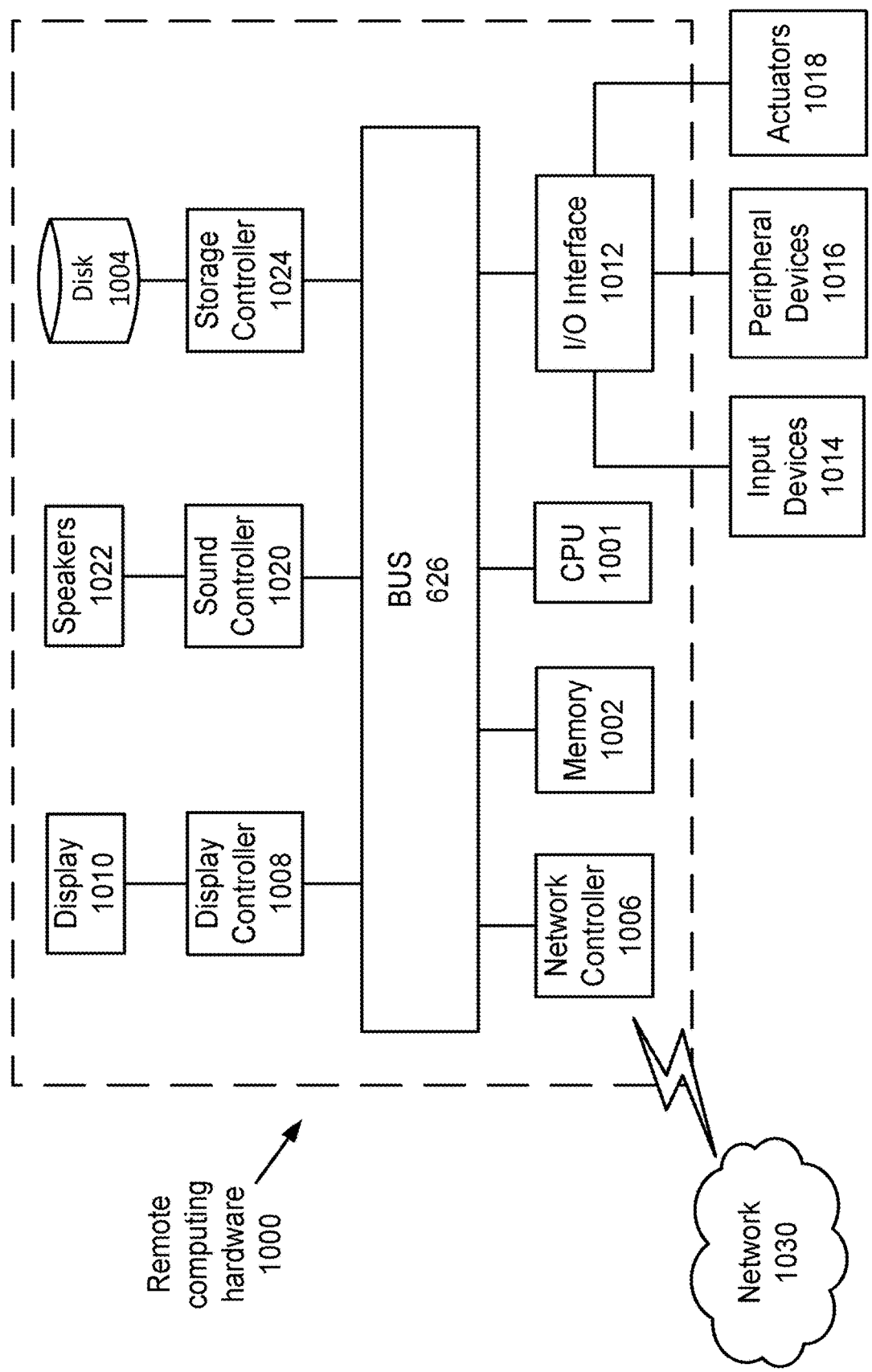
FIG. 33 shows a schematic diagram of remote computing hardware, according to one implementation.

FIG. 33 shows an implementation of counting the overhead timing, in which sampling the sensor is performed every 1500 cycles. It is assumed that there is no overhead in sampling the data. The control calculation can be called early at cycles 2450 to reduce the error in calculation. Frequency overhead is 500 cycles, and during this overhead period the simulator runs the application in previous frequency action.

Next, a description of various implementations of the device 120 and device 2005 and the server 2015 and server 110 are provided.

Figure 32:
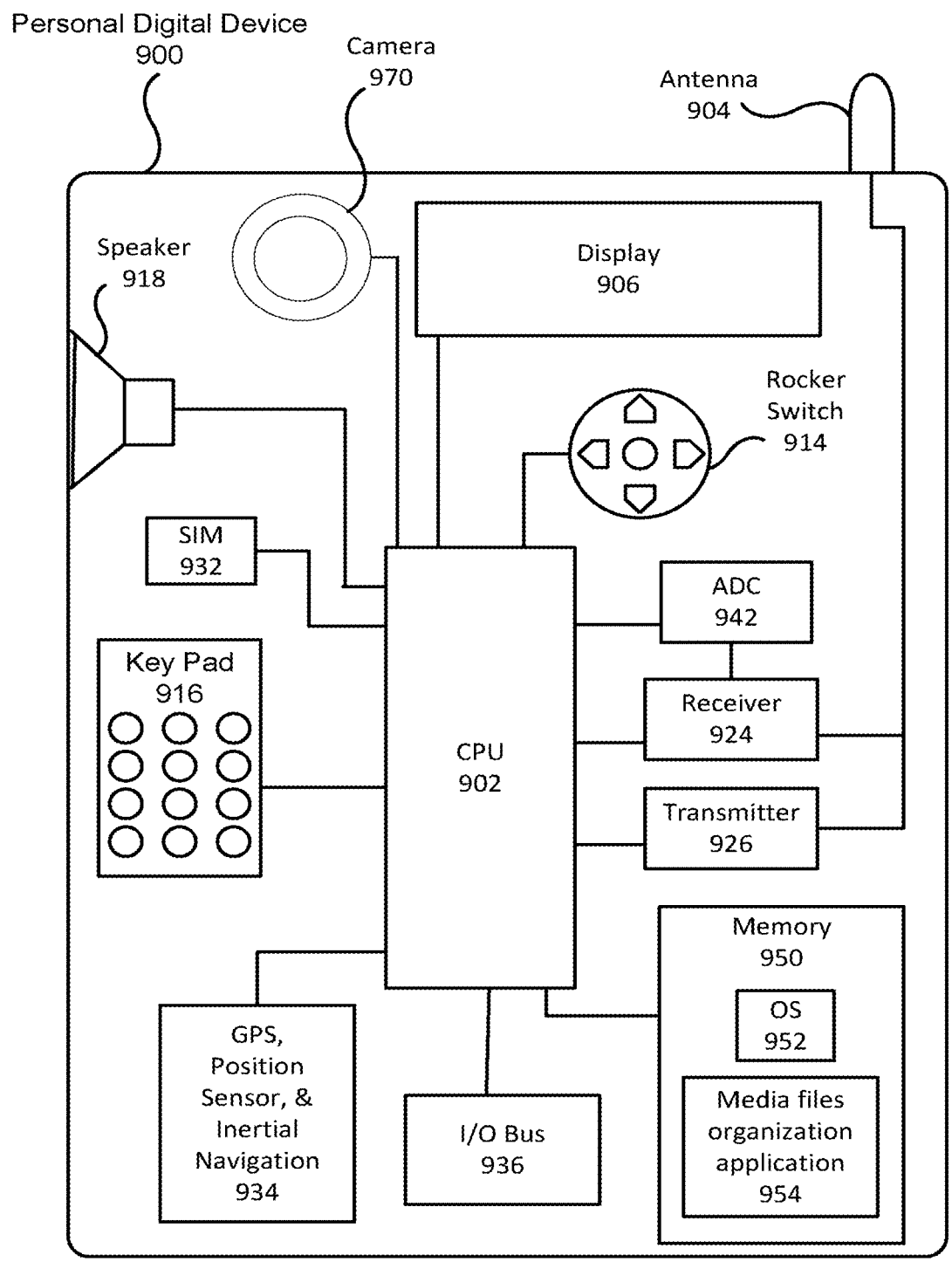
FIG. 32 shows a schematic diagram of a personal digital device, according to one implementation.

In certain implementations, the device 120 and device 2015 can respectively be a personal digital device (PDD). The PDD 900 shown in FIG. 32 is used to perform various steps of method 200 and can be a smartphone, cellular phone, tablet computer, digital camera, a video camera, a personal or desktop computer, etc FIG. 32 shows a block diagram illustrating one implementation of a personal digital device (PDD) 900. The PDD 900 can perform the method 200 of optimizing energy. The PDD 900 includes processing circuitry configured to perform the methods described herein. For example, the PDD 900 can include a processor 902 coupled to an internal memory 950, to a display 906 and to a subscriber identity module (SIM) 932 or similar removable memory unit. A processor 902 can be, for example, an ARM architecture CPU such as the Cortex A53 by ARM Inc. or a Snapdragon 810 by Qualcomm, Inc. The processor 902 can also be an Intel Atom CPU by Intel Corporation.

The PDD 900 can have an antenna 904 that is connected to a transmitter 926 and a receiver 924 coupled to the processor 902. The receiver 924 and portions of the processor 902 and the internal memory 950 can be used for network communications. The PDD 900 can further have multiple antennas 904, receivers 924, and/or transmitters 926. The PDD 900 can also include a key pad 916 or miniature keyboard and menu selection buttons or rocker switch 914 for receiving user inputs. The PDD 900 can also include a GPS device 934 for position sensing and/or inertial navigation. The GPS device 934 can be coupled to the processor and used for determining time and location coordinates of the PDD 900. Additionally, the display 906 can be a touch-sensitive device that can be configured to receive user inputs. The PDD 900 can include a digital camera to acquire images, as well as functionality for receiving and sharing images and media files via social media and functionality for capturing image displayed on the display 906.

The processor 902 can be any programmable microprocessor, microcomputer or multiple processor chip or chips that can be configured by software instructions (applications) to perform a variety of functions, including functions of various embodiments described herein. The PDD 900 can include multiple processors 902.

Software applications can be stored in the internal memory 950 before they are accessed and loaded into the processor 902. The processor 902 can include or have access to the internal memory 950 sufficient to store the software instructions. The internal memory 950 can also include an operating system (OS) 952. The internal memory 950 can also include an energy optimization application 954 that preforms, among other things, parts of the method 200 as described in the foregoing, thus providing additional functionality to the PDD 900.

Additionally, the internal memory 950 can be a volatile or nonvolatile memory, such as flash memory, or a mixture of both. For the purposes of this description, a general reference to memory refers to all memory accessible by the processor 902, including internal memory 950, removable memory plugged into the PDD 900, and memory within the processor 902 itself, including a secure memory.

The PDD 900 can also include an input/output (I/O) bus 936 to receive and transmit signal to peripheral devices and sensors, or to communicate with embedded processors of the motor vehicle.

In certain implementations, various steps of method 200 are performed using remote computing hardware, while some less computational intensive and memory intensive tasks of method 200 are performed on the PDD 900. FIG. 30 illustrates a block diagram of the remote computing hardware 1000, which performs the methods and processes described herein including method 200. The server 110 and server 2015 can respectively be the remote computing hardware 1000, Process data and instructions may be stored in a memory 1002. The process data and instructions may also be stored on a storage medium disk 1004 such as a hard drive (HDD) or portable storage medium or may be stored remotely. Further, the instructions may be stored on CDs, DVDs, in FLASH memory, RAM, ROM, PROM, EPROM, EEPROM, hard disk or any other information processing device with which the remote computing hardware 1000 communicates, such as a server, computer, or any non-transitory computer readable medium.

Further, functions of the remote computing hardware 1000 may be performed using a utility application, background daemon, or component of an operating system, or combination thereof, executing in conjunction with CPU 1001 and an operating system such as Microsoft Windows 7, UNIX, Solaris, LINUX, Apple MAC-OS and other systems known to those skilled in the art.

CPU 1001 may be a Xenon or Core processor from Intel of America or an Opteron processor from AMD of America, or may be other processor types that would be recognized by one of ordinary skill in the art. Alternatively, the CPU 1001 may be implemented on an FPGA, ASIC, PLD or using discrete logic circuits, as one of ordinary skill in the art would recognize. Further, CPU 1001 may be implemented as multiple processors cooperatively working in parallel to perform the instructions of the inventive processes described above.

The remote computing hardware 1000 in FIG. 33 also includes a network controller 1006, such as an Intel Ethernet PRO network interface card from Intel Corporation of America, for interfacing with a network 1030. The network 1030 can be a public network, such as the Internet, or a private network such as an LAN or WAN network, or any combination thereof and can also include PSTN or ISDN sub-networks. The network 1030 can also be wired, such as an Ethernet network, or can be wireless such as a cellular network including EDGE, 3G and 4G wireless cellular systems. The network 1030 can also be Wi-Fi, Bluetooth, or any other wireless form of a communication that is known.

The remote computing hardware 1000 further includes a display controller 1008 for interfacing with a display 1010. A general purpose I/O interface 1012 interfaces with input devices 1014 as well as peripheral devices 1016. The general purpose I/O interface also can connect to a variety of actuators 1018.

A sound controller 1020 may also be provided in the remote computing hardware 1000 to interface with speakers/microphone 1022 thereby providing sounds and/or music.

A general purpose storage controller 1024 connects the storage medium disk 1004 with a communication bus 1026, which may be an ISA, EISA, VESA, PCI, or similar, for interconnecting all of the components of the remote computing hardware 1000. Descriptions of general features and functionality of the display 1010, input devices 1014 (e.g., a keyboard and/or mouse), as well as the display controller 1008, storage controller 1024, network controller 1006, sound controller 1020, and general purpose I/O interface 1012 are omitted herein for brevity as these features are known.

Functions and features of the energy optimization methods as described herein can be executed using cloud computing. For example, one or more processors can execute the functions of optimizing the relevancy algorithm and calculating the relevancy values. The one or more processors can be distributed across one or more cloud computing centers that communicate with the PDD 900 via a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized processing locations and accessible to multiple users who interact with the centralized processing locations through individual terminals.

Figure 34:
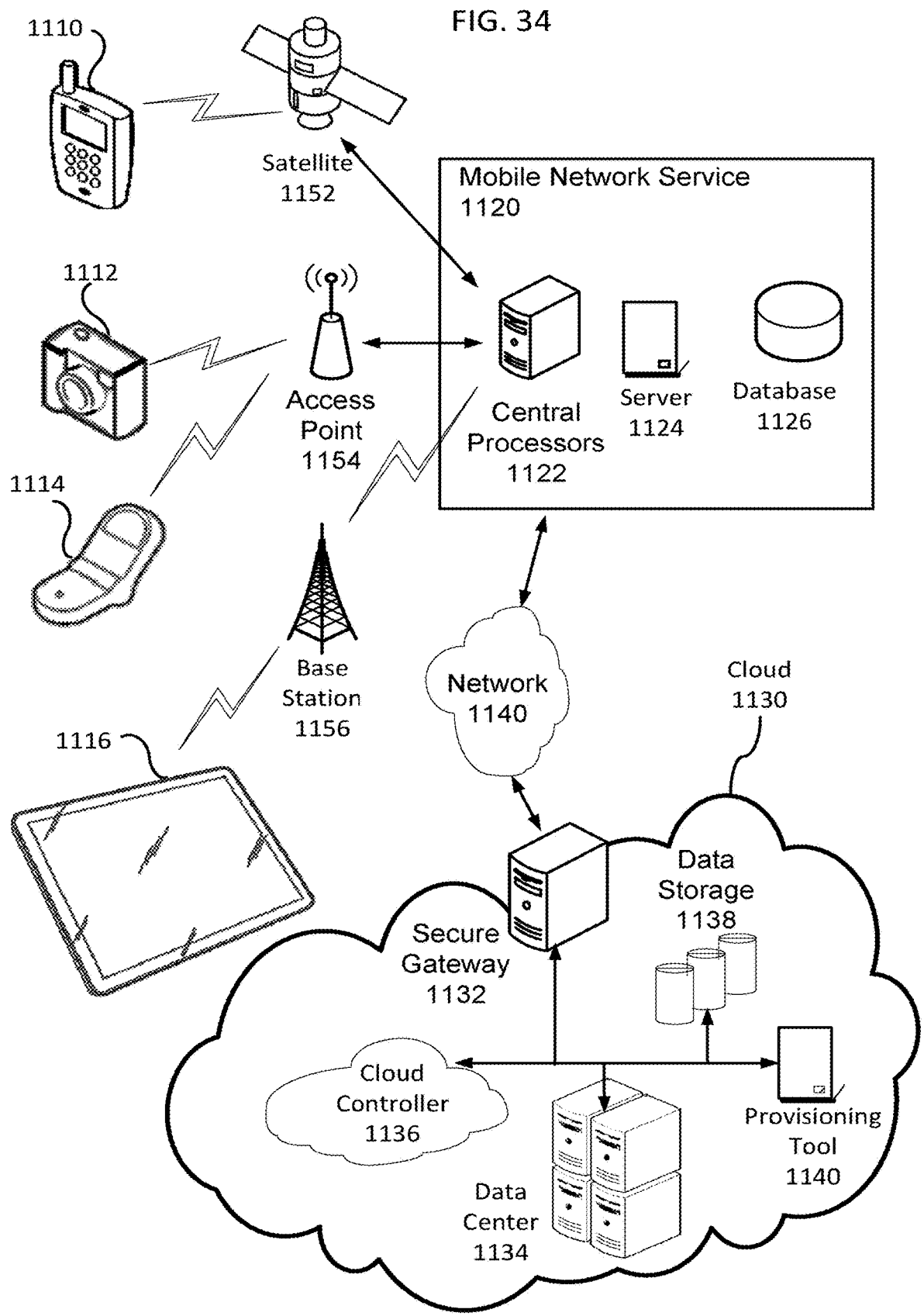
FIG. 34 shows a schematic diagram of a networked cloud computing system, according to one implementation.

FIG. 34 shows an example of cloud computing, wherein various types of PDDs 900 can connect to a network 1140 using either a mobile device terminal or a fixed terminal. For example, FIG. 34 shows a PDD 900 that is a smart phone 1110 connecting to a mobile network service 1120 through a satellite connection 1152. Similarly, FIG. 34 shows a PDD 900 that is a digital camera 1112 and another PDD 900 that is a cellular phone 1114 connected to the mobile network service 1120 through a wireless access point 1154, such as a femto cell or Wi-Fi network. Further, FIG. 34 shows a PDD 900 that is a tablet computer 1116 connected to the mobile network service 1120 through a wireless channel using a base station 1156, such as an Edge, 3G, 4G, or LTE Network, for example. Various other permutations of communications between the types of PDDs 900 and the mobile network service 1120 are also possible, as would be understood to one of ordinary skill in the art. The various types of PDDs 900, such as the cellular phone 1114, tablet computer 1116, or a desktop computer, can also access the network 1140 and the cloud 1130 through a fixed/wired connection, such as through a USB connection to a desktop or laptop computer or workstation that is connected to the network 1140 via a network controller, such as an Intel Ethernet PRO network interface card from Intel Corporation of America, for interfacing with a network.

Signals from the wireless interfaces (e.g., the base station 1156, the wireless access point 1154, and the satellite connection 1152) are transmitted to the mobile network service 1120, such as an EnodeB and radio network controller, UMTS, or HSDPA/HSUPA. Requests from mobile users and their corresponding information are transmitted to central processors 1122 that are connected to servers 1124 providing mobile network services, for example. Further, mobile network operators can provide services to the various types of PDDs 900. For example, these services can include authentication, authorization, and accounting based on home agent and subscribers' data stored in databases 1126, for example. The subscribers' requests can be delivered to the cloud 1130 through a network 1140.

As can be appreciated, the network 1140 can be a public network, such as the Internet, or a private network such as an LAN or WAN network, or any combination thereof and can also include PSTN or ISDN sub-networks. The network 1140 can also be a wired network, such as an Ethernet network, or can be a wireless network such as a cellular network including EDGE, 3G and 4G wireless cellular systems. The wireless network can also be Wi-Fi, Bluetooth, or any other wireless form of a communication that is known.

The various types of PDDs 900 can each connect via the network 1140 to the cloud 1130, receive inputs from the cloud 1130 and transmit data to the cloud 1130. In the cloud 1130, a cloud controller 1136 processes a request to provide users with corresponding cloud services. These cloud services are provided using concepts of utility computing, virtualization, and service-oriented architecture.

The cloud 1130 can be accessed via a user interface such as a secure gateway 1132. The secure gateway 1132 can, for example, provide security policy enforcement points placed between cloud service consumers and cloud service providers to interject enterprise security policies as the cloud-based resources are accessed. Further, the secure gateway 1132 can consolidate multiple types of a security policy enforcement, including, for example, authentication, single sign-on, authorization, security token mapping, encryption, tokenization, logging, alerting, and API control. The cloud 1130 can provide, to users, computational resources using a system of virtualization, wherein processing and memory requirements can be dynamically allocated and dispersed among a combination of processors and memories such that the provisioning of computational resources is hidden from the users and making the provisioning appear seamless as though performed on a single machine. Thus, a virtual machine is created that dynamically allocates resources and is therefore more efficient at utilizing available resources. A system of virtualization using virtual machines creates an appearance of using a single seamless computer even though multiple computational resources and memories can be utilized according increases or decreases in demand. The virtual machines can be achieved using a provisioning tool 1140 that prepares and equips the cloud-based resources such as a processing center 1134 and a data storage 1138 to provide services to the users of the cloud 1130. The processing center 1134 can be a computer cluster, a data center, a main frame computer, or a server farm. The processing center 1134 and data storage 1138 can also be collocated.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A system, comprising:
an apparatus having at least one constrained property and at least one other property to be optimized, the apparatus including
a plurality of components, which are configurable in real-time, such that the apparatus can be configured in a plurality of configurations, and
detection circuitry configured to detect values of the at least one constrained property and values of the at least one other property when the apparatus is configured in each of a first subset of configurations of the plurality of configurations;
learning circuitry configured to
learn, using a machine learning method and based on the detected values of the at least one constrained property and the detected values of the at least one other property, which were detected for the first subset, a model that predicts values of the at least one constrained property and the at least one other property when the apparatus is configured in each configuration of the plurality of configurations; and
control circuitry configured to
select, using the learned model, a particular configuration of the plurality of configurations that optimizes the at least one other property, subject to a constraint of the at least one constrained property compared to other configurations of the plurality of configurations,
wherein the learning circuitry is further configured to learn the model by comparing the detected values of the at least one constrained property and the at least one other property for the first subset of the plurality of configurations to a database of measurements of other apparatuses also having the at least one constrained property and the at least one other property, the measurements of the other apparatuses representing values of the at least one constrained property and values of the at least one other property of respective other apparatuses when components of the other apparatuses are configured in a plurality of other-apparatus configurations.

2. The system according to claim 1, wherein the learning circuitry is further configured to encode the learned model as a data structure storing configurations of the apparatus that optimize the at least one other property subject to the constraint of the at least one constrained property.

3. The system according to claim 1, wherein the learning circuitry is further configured to learn the model using a hierarchical Bayesian method.

4. The system according to claim 1, wherein
the apparatus is a mobile computing device executing an application,
the plurality of configurations include computational configurations of the mobile computing device,
the control circuitry is included on the mobile computing device, and
the learning circuitry is included on a server, which transmits and receives communications to and from the mobile computing device, and the server stores the database of measurements of other mobile computing devices on a non-transitory computer readable medium, wherein
the database includes measurements of the at least one constrained property and the at least one other property for the other mobile computing devices when the other mobile computing devices are configured in various computational configurations, and
the database is used to learn the model by inference using similarities between the measurements of other mobile computing devices when configured in the various computational configurations and the detected values of the apparatus when configured in the first subset of the plurality of configurations.

5. The system according to claim 1, wherein
the learning circuitry is further configured to learn the model, wherein the model is represented using performance-frontier configurations of the plurality of configurations, and the performance-frontier configurations correspond to values of the at least one constrained property and values of the at least one other property that are on a convex hull of a tradeoff space between the at least one constrained property and the at least one other property, and
the control circuitry is further configured to select a configuration of the performance-frontier configurations or a combination of configurations of the performance-frontier configurations to be the particular configuration of the plurality of configurations that optimizes the at least one other property.

6. The system according to claim 1, wherein the control circuitry is further configured to
update the constraint of the at least one constrained property to minimize an error value, wherein the error value represents a difference between a desired value and an observed value of the apparatus, and
update, using the model, the particular configuration of the plurality of configurations that optimizes the at least one other property subject to the updated constraint of the at least one constrained property.

7. The system according to claim 6, wherein the control circuitry is further configured to
detect updated values of the at least one constrained property and updated values of the at least one other property when the apparatus is configured in the particular configuration of the plurality of configurations;
update the model based on the particular configuration of the plurality of configurations and on the updated values of the at least one constrained property and the updated values of the at least one other property, and
perform the updating of the configuration of the plurality of configurations using the updated model together with the updated constraint of the at least one constrained property.

8. The system according to claim 4, wherein the control circuitry is further configured to select the particular configuration of the plurality of configurations, wherein
the at least one other property includes one of an energy-consumption rate and a computational-performance rate,
when the at least one other property includes the computational-performance rate, the at least one constrained property includes the energy-consumption rate,
when the at least one other property includes the energy-consumption rate, the at least one constrained property includes the computational-performance rate, and the energy-consumption rate is a rate at which the mobile computing device consumes energy while executing the application, and the computational-performance rate is a rate at which the mobile computing device performs computational tasks of the application.

9. The system according to claim 8, wherein, when the at least one constrained property includes the computational-performance rate, the control circuitry is further configured to select the configuration of the plurality of configurations to be a schedule that minimizes the energy consumed over a predefined time period subject to a constraint that a predefined number of the computational tasks of the application are completed within the predefined time period, wherein the schedule includes that
the apparatus is configured in a first configuration of the plurality of configurations during a period corresponding to a duty cycle of the schedule,
the apparatus is configured in a second configuration of the plurality of configurations, which is different from the first configuration, for a period corresponding to a complement of the duty cycle, and
the first configuration and the second configuration respectively correspond to the values of the at least one constrained property and the values of the at least one other property of the model that are on a convex hull of a trade-off space between the at least one constrained property and the at least one other property.

10. The system according to claim 2, wherein
the learning circuitry is further configured to
learn the model using the machine learning method, which is one of a hierarchical Bayesian model method, a matrix completion method, a low rank matrix completion with noise method, a high rank matrix completion method, a collaborative filtering method, a recommender system method, a matrix completion with side information method, a Bayesian matrix completion method, a nonparametric matrix completion method, a multi-tasking algorithm method, a transfer learning based algorithm method, a regression algorithm method, a random forest algorithm method, a polynomial regression method, a gradient boosting method, a Bandit-based learning method, a multi-armed bandit learner method, a multi-armed bandit learner with correlated arms method, a genetic algorithm method, and an evolutionary algorithm method,
encode the learned model as the data structure, the data structure being one of a hash table, a sorted list, a list, a binary search tree, a binary heap, a btree, and a skip list, and
the control circuitry is further configured to select the particular configuration of the plurality of configurations that optimizes the at least one other property using a control method that is one of a proportional-integral control method, a proportional control method, an integral control method, a proportional integral derivative control method, a state-space control method, a stochastic control method, an adaptive control method, an optimal control method, a model predictive control method, a switching control method, a gain scheduling method, a self-tuning regulator method, a minimum variance control method, and a fuzzy control method.

11. The system according to claim 1, wherein the learning circuitry is located remotely from the apparatus and communicates with the apparatus via a communication channel, and the learning circuitry is configured to learn the model by determining similarities between the apparatus and the other apparatuses by comparing the database of measurements of the other apparatuses with the detected values of the at least one constrained property and the detected values of the at least one other property when the apparatus is configured in the first subset of the plurality of configurations,
learning, for all configurations of the apparatus, a complete model including estimates of the at least one other property, uncertainties of the estimates of the at least one other property, estimates of the at least one constrained property, and uncertainties of the estimates of the at least one constrained property, wherein the complete model is learned using the similarities between the apparatus and the other apparatuses, and the complete model represents the values of the at least one other property and the values of the at least one constrained property for all configurations of the apparatus,
learning, using the complete model, a convex-hull model, wherein the convex-hull model represents a second subset of the plurality of configurations having values of the at least one other property and values of the at least one constrained property that are on a convex hull of a tradeoff space between the at least one other property and the at least one constrained property, and the convex-hull model represents the estimates of the at least one other property and the estimates of the at least one constrained property corresponding the second subset of the plurality of configurations, and
transmitting, over the communication channel, the learned convex-hull model from the learning circuitry to the apparatus.

12. The system according to claim 1, wherein learning circuitry is further configured to estimate uncertainties of the learned model to generate uncertainty estimates, wherein the learned model includes the uncertainty estimates.

13. An apparatus having at least one constrained property and at least one other property to be optimized, the apparatus communicating over a communication channel with learning circuitry, the apparatus comprising:

a plurality of components, which are configurable in real-time, such that the apparatus can be configured in a plurality of configurations;
detection circuitry configured to detect values of the at least one constrained property and values of the at least one other property when the apparatus is configured in a first subset of the plurality of configurations;
a transmitter configured to transmit the detected values of the at least one constrained property and values of the at least one other property corresponding to the first subset of the plurality of configurations to the learning circuitry;
a receiver configured to receive, from the learning circuitry, a model representing values of the at least one constrained property and values of the at least one other property, when the apparatus is configured in respective configurations of the plurality of configurations, the learning circuitry learning the model by comparing the detected values of the at least one constrained property and the at least one other property corresponding to the first subset of the plurality of configurations to a database of measurements of other apparatuses also having the at least one constrained property and the at least one other property, the measurements of the other apparatuses representing values of the at least one constrained property and values of the at least one other property of respective other apparatuses when components of the other apparatuses are configured in a plurality of other-apparatus configurations; and control circuitry configured to select, using the received model, a particular configuration of the plurality of configurations that optimizes the at least one other property subject to a constraint of the at least one constrained property.

14. A server communicating with an apparatus, wherein the apparatus has at least one constrained property and at least one other property to be optimized, and the apparatus can be configured in a plurality of configurations, the server comprising:

a receiver configured to receive, from the apparatus, values of the at least one constrained property and values of the at least one other property, which are detected when the apparatus is in each of a first subset of configurations of the plurality of configurations, learning circuitry configured to learn, using a machine learning method and based on the received values of the at least one constrained property and the detected values of the at least one other property, which were detected for the first subset, a model that predicts values of the at least one constrained property and the at least one other property when the apparatus is configured in each configuration of the plurality of configurations; and a transmitter configured to transmit, to the apparatus, the determined model, wherein the learned model is learned by comparing the received values of the at least one constrained property and the received values of the at least one other property with measurements of the at least one constrained property and the at least one other property for other apparatuses when the other apparatuses are configured in a plurality of other-apparatus configurations to determine similarities between the apparatus and the other apparatuses, and determining estimates of the at least one other property and estimates of the at least one constrained property using the similarities between the apparatus and the other apparatuses to generate a complete model of the apparatus representing the at least one other property and the at least one constrained property for all configurations of the apparatus, and the learned model is based on the complete model.

15. The server according to claim 14, wherein
the learning circuitry is further configured to learn a convex-hull model representing estimates of the at least one other property and estimates of the at least one constrained property of a second subset of the plurality of configurations corresponding to the estimates of the at least one other property and the estimates of the at least one constrained property of the complete model located on a convex hull of a tradeoff space between the at least one other property and the at least one constrained property; and the learned model transmitted to the apparatus is the convex-hull model.

16. A method of optimizing an apparatus, the apparatus having at least one constrained property, at least one other property to be optimized, and a plurality of components, which are configurable in real-time, such that the apparatus can be configured in a plurality of configurations, the method comprising:

detecting values of the at least one constrained property and values of the at least one other property when the apparatus is configured in each of a first subset of configurations of the plurality of configurations;

learning, using a machine learning method and based on the detected values of the at least one constrained property and the detected values of the at least one other property, which were detected for the first subset, a model that predicts values of the at least one constrained property and the at least one other property when the apparatus is configured in each configuration of the plurality of configurations; and selecting, using the learned model, a particular configuration of the plurality of configurations that optimizes the at least one other property, subject to a constraint of the at least one constrained property compared to other configurations of the plurality of configurations, wherein the learning step further includes learning the model by comparing the detected values of the at least one constrained property and the at least one other property for the first subset of the plurality of configurations to a database of measurements of other apparatuses also having the at least one constrained property and the at least one other property, the measurements of the other apparatuses representing values of the at least one constrained property and values of the at least one other property of respective other apparatuses when components of the other apparatuses are configured in a plurality of other-apparatus configurations.

17. The method according to claim 16, further comprising;

estimating uncertainties of the values of the at least one constrained property and the values of the at least one other property of the learned model to generate uncertainty estimates, and including the uncertainty estimates in the learned model; and encoding the model as a data structure to lookup configurations of the apparatus to optimize the at least one other property subject to the constraint of the at least one constrained property.

18. The method according to claim 17, wherein
the learning of the model is performed using the machine learning method, which is one of a hierarchical Bayesian model method, a matrix completion method, a low rank matrix completion with noise method, a high rank matrix completion method, a collaborative filtering method, a recommender system method, a matrix completion with side information method, a Bayesian matrix completion method, a nonparametric matrix completion method, a multi-tasking algorithm method, a transfer learning based algorithm method, a regression algorithm method, a random forest algorithm method, a polynomial regression method, a gradient boosting method, a Bandit-based learning method, a multi-armed bandit learner method, a multi-armed bandit learner with correlated arms method, a genetic algorithm method, and an evolutionary algorithm method, the encoding of the learned model is performed, wherein the data structure is one of a hash table, a sorted list, a list, a binary search tree, a binary heap, a btree, and a skip list, and the selecting of the particular configuration of the plurality of configurations to optimize the at least one other property is performed using a control method that is one of a proportional-integral control method, a proportional control method, an integral control method, a proportional integral derivative control method, a state-space control method, a stochastic control method, an adaptive control method, an optimal control method, a model predictive control method, a switching control method, a gain scheduling method, a self-tuning regulator method, a minimum variance control method, and a fuzzy control method.

19. The method according to claim 16, further comprising:
    detecting values of the at least one constrained property and values of the at least one other property when the apparatus is configured in the particular configuration of the plurality of configurations;
    updating the learned model using the detected values of the at least one constrained property and the detected values of the at least one other property when the apparatus is configured in the particular configuration of the plurality of configurations;
    updating the constraint of the at least one constrained property to minimize an error value, wherein the error value represents a difference between a desired value and an observed value of the apparatus, which is determined from values detected when the apparatus is configured in the particular configuration of the plurality of configurations; and
    updating, using the updated model, the particular configuration of the plurality of configurations to optimize the at least one other property subject to the updated constraint of the at least one constrained property.

20. The method according to claim 16, wherein
    the apparatus is a mobile computing device executing an application, and the mobile computing device performs the detecting of the values and the selecting of the particular configuration of the plurality of configurations to optimize the at least one other property,
    the learning of the model is performed by a server that communicates with the mobile computing device using a communication channel,
    the at least one other property includes one of an energy-consumption rate at which the mobile computing device consumes energy while executing the application and a computational-performance rate at which the mobile computing device performs computational tasks of the application,
    the at least one constrained property includes another of the energy-consumption rate application and the computational-performance rate, and
    the method includes
        updating a speed-up factor to minimize a difference between a desired latency and a measured latency of the mobile computing device when executing the application, and
    updating the constraint of the at least one constrained property according to the updated speed-up factor.

* * * * *